United States Patent [19]
Maeda et al.

[11] Patent Number: 6,072,759
[45] Date of Patent: *Jun. 6, 2000

[54] RECORDING MEDIUM WITH FORMAT FOR PREVENTING UNAUTHORIZED COPYING, AND REPRODUCING APPARATUS FOR SAME

[75] Inventors: Muneyasu Maeda, Kanagawa; Tadao Suzuki, Tokyo, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/882,815

[22] Filed: Jun. 26, 1997

[30] Foreign Application Priority Data

Jul. 4, 1996 [JP] Japan .................. 8-192712

[51] Int. Cl.[7] ........................... G11B 7/00
[52] U.S. Cl. ................ 369/59; 369/275.3; 369/58
[58] Field of Search .................. 369/275.3, 48, 369/59, 60, 47, 58, 54

[56] References Cited

U.S. PATENT DOCUMENTS

| | | | |
|---|---|---|---|
| 5,506,821 | 4/1996 | Burton et al. | 369/32 |
| 5,592,450 | 1/1997 | Yonemitsu et al. | 369/59 |
| 5,642,346 | 6/1997 | Taira et al. | 369/275.3 |
| 5,650,991 | 7/1997 | Fujii | 369/48 |
| 5,687,160 | 11/1997 | Aotake et al. | 369/275.3 |
| 5,691,972 | 11/1997 | Tsuga et al. | 369/275.3 |
| 5,694,381 | 12/1997 | Sako | 369/58 |
| 5,696,757 | 12/1997 | Ozaki et al. | 369/58 |
| 5,706,269 | 1/1998 | Ogura et al. | 369/275.3 |
| 5,708,650 | 1/1998 | Nakashima et al. | 369/275.3 |
| 5,721,720 | 2/1998 | Kikuchi et al. | 369/275.3 |
| 5,734,787 | 3/1998 | Yonemitsu et al. | 369/48 |
| 5,737,308 | 4/1998 | Nakai et al. | 369/59 |
| 5,737,639 | 4/1998 | Ohmori | 369/275.3 |
| 5,754,521 | 5/1998 | Yokota | 369/275.3 |
| 5,757,752 | 5/1998 | Sako | 369/275.3 |
| 5,761,301 | 11/1995 | Oshima et al. | 369/272 |
| 5,774,439 | 9/1994 | Aoki et al. | 369/275.3 |

FOREIGN PATENT DOCUMENTS

| | | | |
|---|---|---|---|
| 448378 | 9/1991 | European Pat. Off. | 369/59 |

*Primary Examiner*—Nabil Hindi
*Attorney, Agent, or Firm*—Jay H. Maioli

[57] ABSTRACT

A recording medium conforming with a specific physical format of Digital Video Disc/Digital Versatile Disc (DVD) or the like is contrived to achieve superior sound quality in audio data recording and reproduction, common usability of data, and enhanced interchangeability of an apparatus. In this recording medium, identification data signifying the existence of recorded data of a second data format such as Direct Stream Digital Disc (DSD) different from a first data format such as DVD is included in physical format management information recorded in a lead-in area. The data of such second data format is recorded in a data area in conformity with the physical format management information. And second data management information of a Table of Contents (TOC) is recorded at a predetermined position to manage an operation of reproducing the data of the second data format.

22 Claims, 40 Drawing Sheets

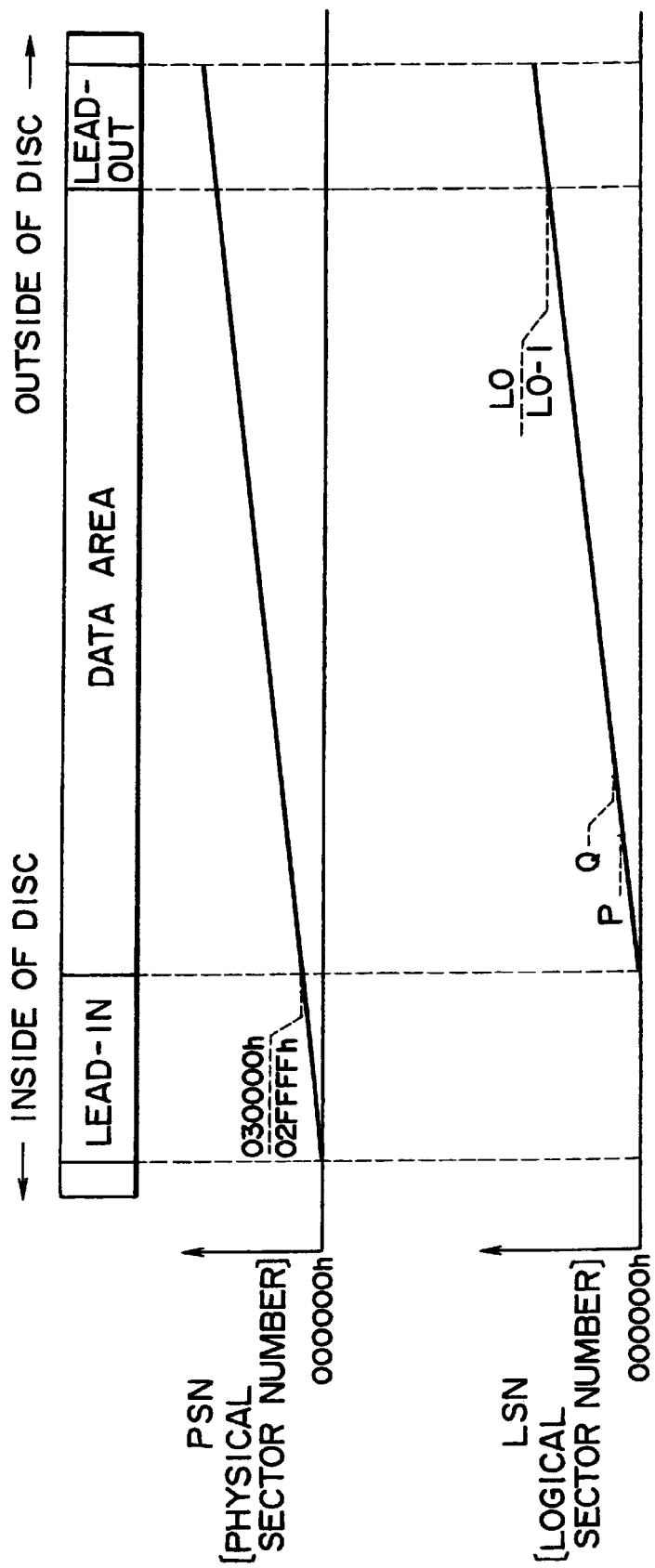

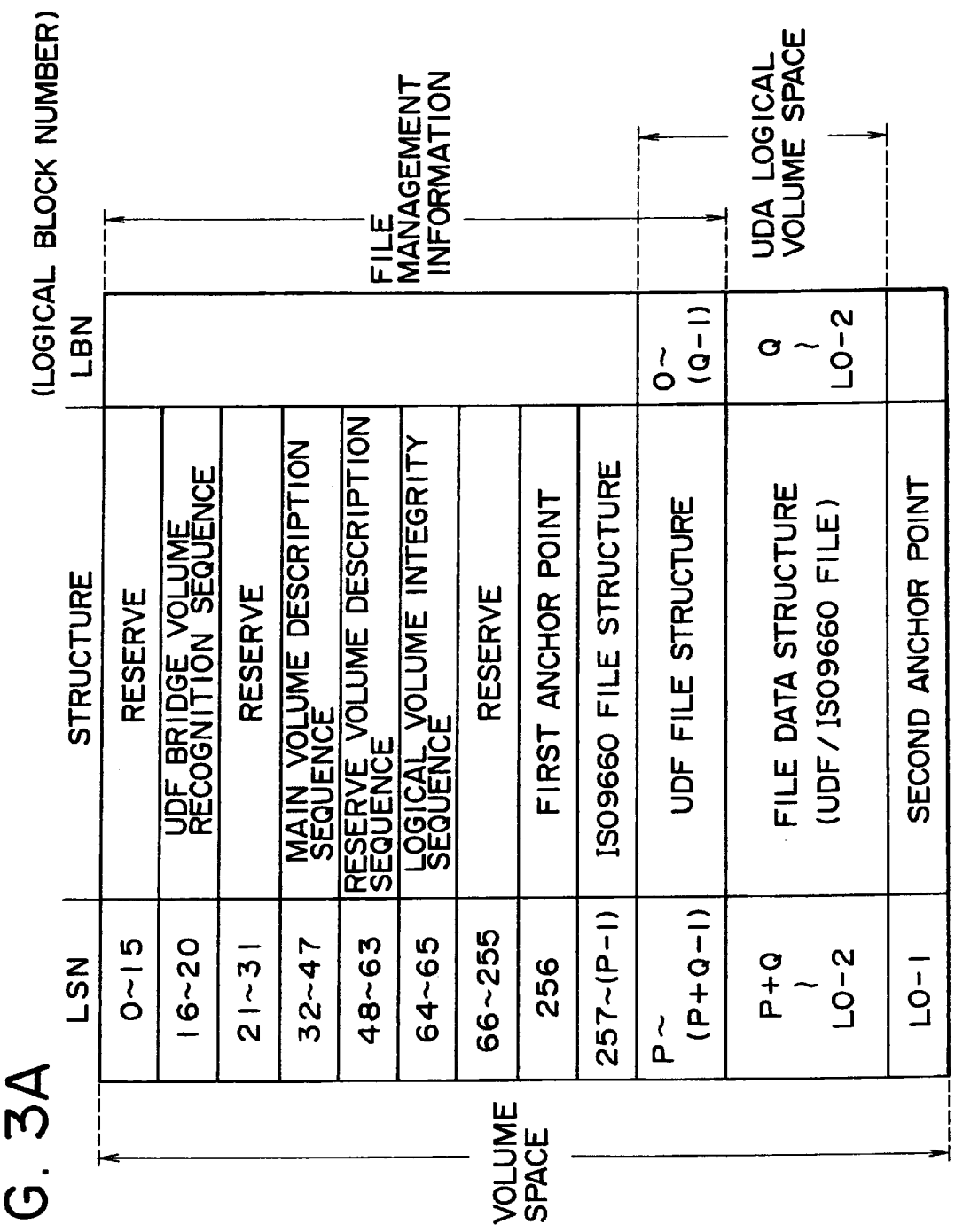

FIG. 3B

IDENTIFIER DATA

| PVD (PRIMARY VOLUME DESCRIPTOR) |
|---|
| VOLUME DESCRIPTOR SET TERMINATOR |
| EXTEND AREA START DESCRIPTOR |
| NSR DESCRIPTOR |
| EXTEND AREA END DESCRIPTOR |

[SINGLE LAYER]

[DUAL LAYER / PARALLEL TRACK PATHS]

[DUAL LAYER / OPPOSITE TRACK PATHS]

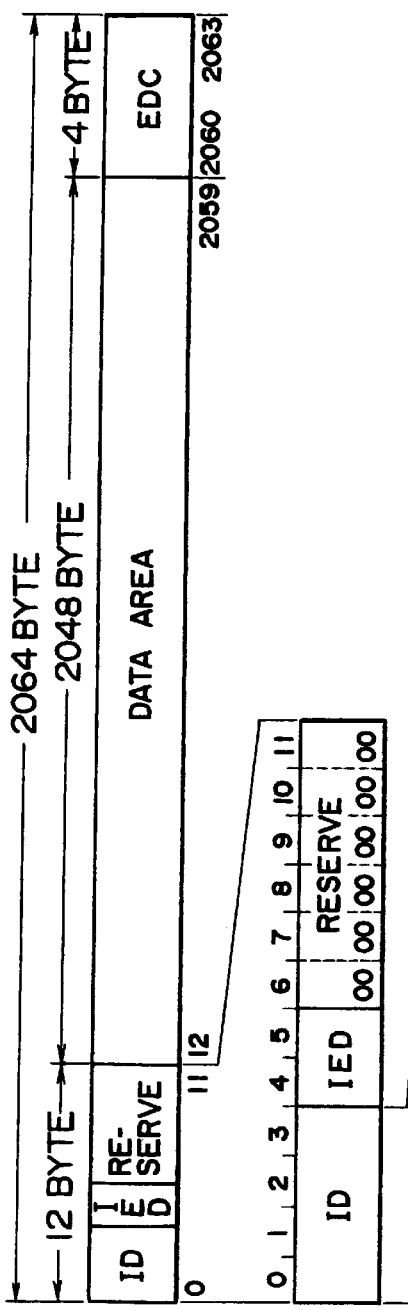
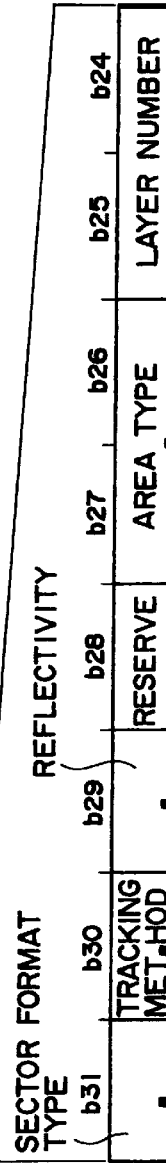
F I G. 6A
F I G. 6B
F I G. 6C
F I G. 6D

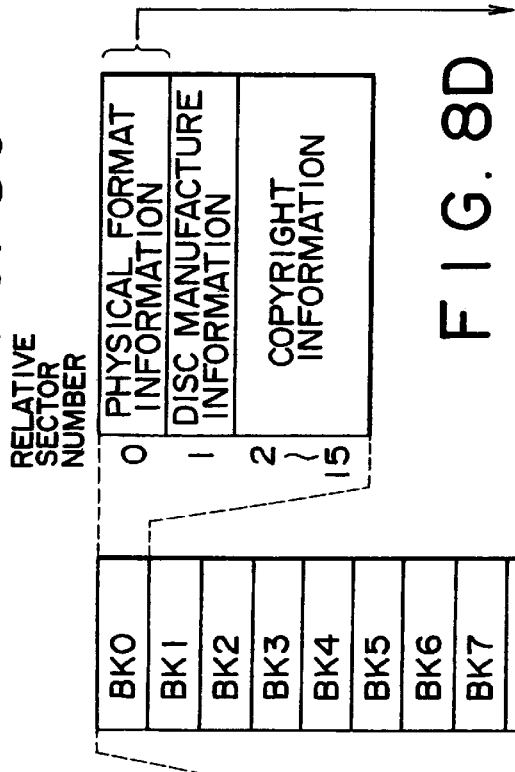
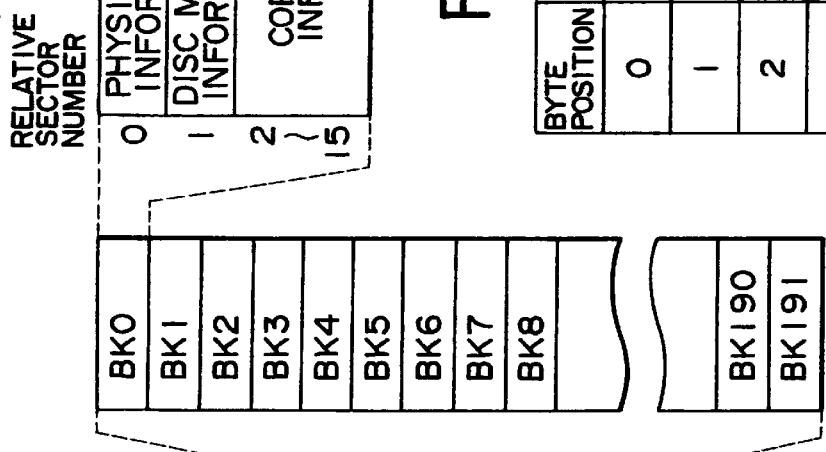
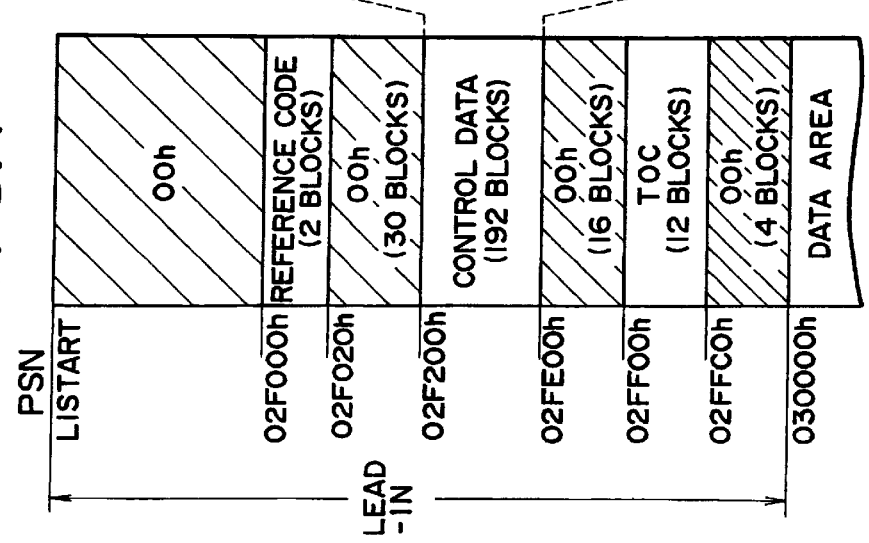

FIG. 9

| | [BIT POSITION] | | | | | | | |
|---|---|---|---|---|---|---|---|---|
| | b7 | b6 | b5 | b4 | b3 | b2 | b1 | b0 |
| 0 | BOOK TYPE ||||PART VERSION||||
| 1 | DISK SIZE |||| MINIMUM LEAD-OUT RATE ||||
| 2 | RESERVE || NUMBER OF LAYERS || TRACK PATH | LAYER TYPE |||
| 3 | LINEAR DENSITY |||| TRACK DENSITY ||||
| 4–5 | DATA AREA ALLOCATION ||||||||
| 15–18 | RESERVE [ALL 00h] ||||||||
| 2047 | ||||||||

(BYTE POSITION)

FIG. 11

| | +0 | +1 | +2 | +3 |
|---|---|---|---|---|
| | MSB      LSB | MSB      LSB | MSB      LSB | MSB      LSB |
| 0 | "S" | "A" | "C" | "D" |
| 1 | 00000000 | 00000000 | First TNO | Last TNO |
| 2 | EDSA (EXTRA | DATA START | ADDRESS) | Used Sectors |
| 3 | 00000000 | 00000000 | 00000000 | 00000000 |
| 4 | P-TN01 | P-TN02 | P-TN03 | P-TN04 |
| 5 | P-TN05 | P-TN06 | P-TN07 | P-TN08 |
| 6 | P-TN09 | P-TN010 | P-TN011 | P-TN012 |
| 7 | P-TN013 | P-TN014 | P-TN015 | P-TN016 |
| 8 | P-TN017 | P-TN018 | P-TN019 | P-TN020 |
| 26 | P-TN089 | P-TN090 | P-TN091 | P-TN092 |
| 27 | P-TN093 | P-TN094 | P-TN095 | P-TN096 |
| 28 | P-TN097 | P-TN098 | P-TN099 | P-TN0100 |
| 29 | 00000000 | 00000000 | 00000000 | 00000000 |
| 30 | 00000000 | 00000000 | 00000000 | 00000000 |
| AK1 { 31 | SA1 | (TRACK 1) | | TM1 |
| AK1 { 32 | EA1 | | | 00000000 |
| AK2 { 33 | SA2 | (TRACK 2) | | TM2 |
| AK2 { 34 | EA2 | | | 00000000 |
| AK3 { 35 | SA3 | (TRACK 3) | | TM3 |
| AK3 { 36 | EA3 | | | 00000000 |
| AK4 { 37 | SA4 | (TRACK 4) | | TM4 |
| AK4 { 38 | EA4 | | | 00000000 |
| AK5 { 39 | SA5 | (TRACK 5) | | TM5 |
| AK5 { 40 | EA5 | | | 00000000 |
| AK99 { 227 | SA99 | (TRACK 99) | | TM99 |
| AK99 { 228 | EA99 | | | 00000000 |
| AK100 { 229 | SA100 | (TRACK 100) | | TM100 |
| AK100 { 230 | EA100 | | | 00000000 |
| 231 | 00000000 | 00000000 | 00000000 | 00000000 |
| 232 | 00000000 | 00000000 | 00000000 | 00000000 |
| 233 | 00000000 | 00000000 | 00000000 | 00000000 |
| 234 | 00000000 | 00000000 | 00000000 | 00000000 |
| 510 | 00000000 | 00000000 | 00000000 | 00000000 |
| 511 | 00000000 | 00000000 | 00000000 | 00000000 |

FIG. 12

| | +0 MSB    LSB | +1 MSB    LSB | +2 MSB    LSB | +3 MSB    LSB |
|---|---|---|---|---|
| 0 | "S" | "A" | "C" | "D" |
| 1 | 00000000 | 00000000 | 00000000 | 00000000 |
| 2 | 00000000 | 00000000 | 00000000 | 00000000 |
| 3 | 00000000 | 00000000 | 00000000 | 00000000 |
| 4 | P-TNA1 | P-TNA2 | P-TNA3 | P-TNA4 |
| 5 | P-TNA5 | P-TNA6 | P-TNA7 | P-TNA8 |
| 6 | P-TNA9 | P-TNA10 | P-TNA11 | P-TNA12 |
| 7 | P-TNA13 | P-TNA14 | P-TNA15 | P-TNA16 |
| 8 | P-TNA17 | P-TNA18 | P-TNA19 | P-TNA20 |
| 26 | P-TNA89 | P-TNA90 | P-TNA91 | P-TNA92 |
| 27 | P-TNA93 | P-TNA94 | P-TNA95 | P-TNA96 |
| 28 | P-TNA97 | P-TNA98 | P-TNA99 | P-TNA100 |
| 29 | DISC NAME | | | |
| 30 | DISC NAME | | | |
| 31 | DISC NAME / TRACK NAME | | | |
| 32 | DISC NAME / TRACK NAME | | | |
| 33 | DISC NAME / TRACK NAME | | | |
| 34 | DISC NAME / TRACK NAME | | | |
| 35 | DISC NAME / TRACK NAME | | | |
| 36 | DISC NAME / TRACK NAME | | | |
| 37 | DISC NAME / TRACK NAME | | | |
| 38 | DISC NAME / TRACK NAME | | | |
| 39 | DISC NAME / TRACK NAME | | | |
| 40 | DISC NAME / TRACK NAME | | | |
| 510 | DISC NAME / TRACK NAME | | | |
| 511 | DISC NAME / TRACK NAME | | | |

FIG. 13

| | +0 | +1 | +2 | +3 |
|---|---|---|---|---|
| | MSB　　　LSB | MSB　　　LSB | MSB　　　LSB | MSB　　　LSB |
| 0 | "S" | "A" | "C" | "D" |
| 1 | 00000000 | 00000000 | 00000000 | 00000000 |
| 2 | 00000000 | 00000000 | 00000000 | 00000000 |
| 3 | 00000000 | 00000000 | 00000000 | 00000000 |
| 4 | P-TCD1 | P-TCD2 | P-TCD3 | P-TCD4 |
| 5 | P-TCD5 | P-TCD6 | P-TCD7 | P-TCD8 |
| 6 | P-TCD9 | P-TCD10 | P-TCD11 | P-TCD12 |
| 7 | P-TCD13 | P-TCD14 | P-TCD15 | P-TCD16 |
| 8 | P-TCD17 | P-TCD18 | P-TCD19 | P-TCD20 |
| 26 | P-TCD89 | P-TCD90 | P-TCD91 | P-TCD92 |
| 27 | P-TCD93 | P-TCD94 | P-TCD95 | P-TCD96 |
| 28 | P-TCD97 | P-TCD98 | P-TCD99 | P-TCD100 |
| 29 | CN (CATALOG NUMBER) | | | |
| 30 | | | | |
| 31 | ISRC1 (TRACK 1) | | | |
| 32 | | | | |
| 33 | ISRC2 (TRACK 2) | | | |
| 34 | | | | |
| 35 | ISRC3 (TRACK 3) | | | |
| 36 | | | | |
| 37 | ISRC4 (TRACK 4) | | | |
| 38 | | | | |
| 39 | ISRC5 (TRACK 5) | | | |
| 40 | | | | |
| 227 | ISRC99 (TRACK 99) | | | |
| 228 | | | | |
| 229 | ISRC100 (TRACK 100) | | | |
| 230 | | | | |
| 231 | 00000000 | 00000000 | 00000000 | 00000000 |
| 232 | 00000000 | 00000000 | 00000000 | 00000000 |
| 233 | 00000000 | 00000000 | 00000000 | 00000000 |
| 234 | 00000000 | 00000000 | 00000000 | 00000000 |
| 510 | 00000000 | 00000000 | 00000000 | 00000000 |
| 511 | 00000000 | 00000000 | 00000000 | 00000000 |

FIG. 14

|   | +0 | +1 | +2 | +3 |
|---|---|---|---|---|
|   | MSB       LSB | MSB       LSB | MSB       LSB | MSB       LSB |
| 0 | "S" | "A" | "C" | "D" |
| 1 | 00000000 | 00000000 | 00000000 | 00000000 |
| 2 | 00000000 | 00000000 | 00000000 | 00000000 |
| 3 | 00000000 | 00000000 | 00000000 | Char. code |
| 4 | P-TNA1 | P-TNA2 | P-TNA3 | P-TNA4 |
| 5 | P-TNA5 | P-TNA6 | P-TNA7 | P-TNA8 |
| 6 | P-TNA9 | P-TNA10 | P-TNA11 | P-TNA12 |
| 7 | P-TNA13 | P-TNA14 | P-TNA15 | P-TNA16 |
| 8 | P-TNA17 | P-TNA18 | P-TNA19 | P-TNA20 |
| 26 | P-TNA89 | P-TNA90 | P-TNA91 | P-TNA92 |
| 27 | P-TNA93 | P-TNA94 | P-TNA95 | P-TNA96 |
| 28 | P-TNA97 | P-TNA98 | P-TNA99 | P-TNA100 |
| 29 | DISC NAME ||||
| 30 | DISC NAME ||||
| 31 | DISC NAME / TRACK NAME ||||
| 32 | DISC NAME / TRACK NAME ||||
| 33 | DISC NAME / TRACK NAME ||||
| 34 | DISC NAME / TRACK NAME ||||
| 35 | DISC NAME / TRACK NAME ||||
| 36 | DISC NAME / TRACK NAME ||||
| 37 | DISC NAME / TRACK NAME ||||
| 38 | DISC NAME / TRACK NAME ||||
| 39 | DISC NAME / TRACK NAME ||||
| 40 | DISC NAME / TRACK NAME ||||
| 510 | DISC NAME / TRACK NAME ||||
| 511 | DISC NAME / TRACK NAME ||||

FIG. 15

| | +0 | +1 | +2 | +3 |
|---|---|---|---|---|
| | MSB    LSB | MSB    LSB | MSB    LSB | MSB    LSB |
| 0 | "S" | "A" | "C" | "D" |
| 1 | 00000000 | 00000000 | First TNO | Last TNO |
| 2 | 00000000 | 00000000 | 00000000 | 00000000 |
| 3 | 00000000 | 00000000 | 00000000 | 00000000 |
| 4 | P-TN01 | P-TN02 | P-TN03 | P-TN04 |
| 5 | P-TN05 | P-TN06 | P-TN07 | P-TN08 |
| 6 | P-TN09 | P-TN010 | P-TN011 | P-TN012 |
| 7 | P-TN013 | P-TN014 | P-TN015 | P-TN016 |
| 8 | P-TN017 | P-TN018 | P-TN019 | P-TN020 |
| 26 | P-TN089 | P-TN090 | P-TN091 | P-TN092 |
| 27 | P-TN093 | P-TN094 | P-TN095 | P-TN096 |
| 28 | P-TN097 | P-TN098 | P-TN099 | P-TN0100 |
| 29 | 00000000 | 00000000 | 00000000 | 00000000 |
| 30 | 00000000 | 00000000 | 00000000 | 00000000 |
| 31 | SSA1 (TRACK 1) | | | TM1 |
| 32 | SEA1 | | | 00000000 |
| 33 | SSA2 (TRACK 2) | | | TM2 |
| 34 | SEA2 | | | 00000000 |
| 35 | SSA3 (TRACK 3) | | | TM3 |
| 36 | SEA3 | | | 00000000 |
| 37 | SSA4 (TRACK 4) | | | TM4 |
| 38 | SEA4 | | | 00000000 |
| 39 | SSA5 (TRACK 5) | | | TM5 |
| 40 | SEA5 | | | 00000000 |
| 227 | SSA99 (TRACK 99) | | | TM99 |
| 228 | SEA99 | | | 00000000 |
| 229 | SSA100 (TRACK 100) | | | TM100 |
| 230 | SEA100 | | | 00000000 |
| 231 | 00000000 | 00000000 | 00000000 | 00000000 |
| 232 | 00000000 | 00000000 | 00000000 | 00000000 |
| 233 | 00000000 | 00000000 | 00000000 | 00000000 |
| 234 | 00000000 | 00000000 | 00000000 | 00000000 |
| 510 | 00000000 | 00000000 | 00000000 | 00000000 |
| 511 | 00000000 | 00000000 | 00000000 | 00000000 |

Rows 31–32: SAK1; 33–34: SAK2; 35–36: SAK3; 37–38: SAK4; 39–40: SAK5; 227–228: SAK99; 229–230: SAK100

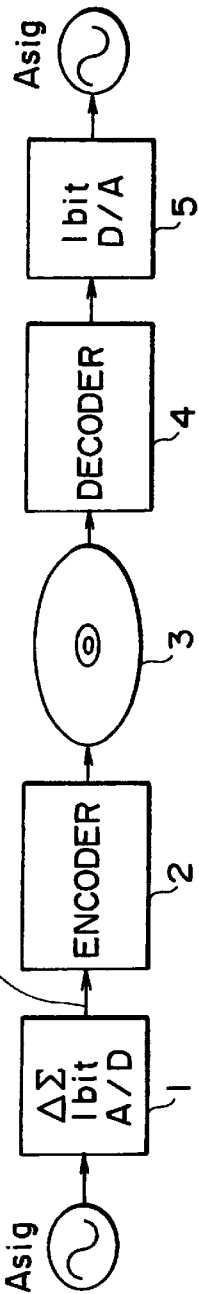
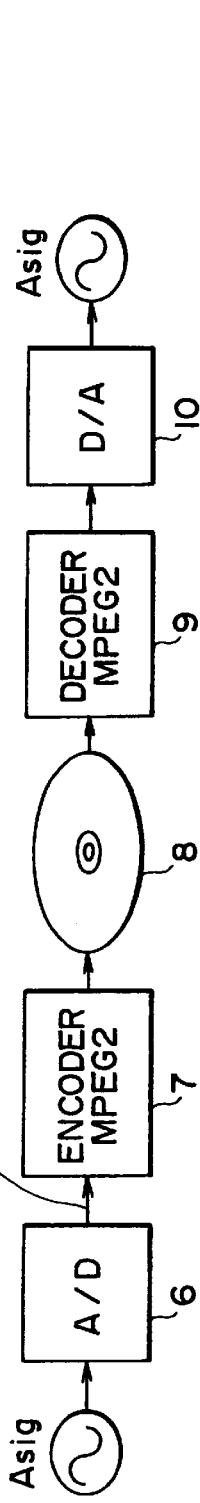
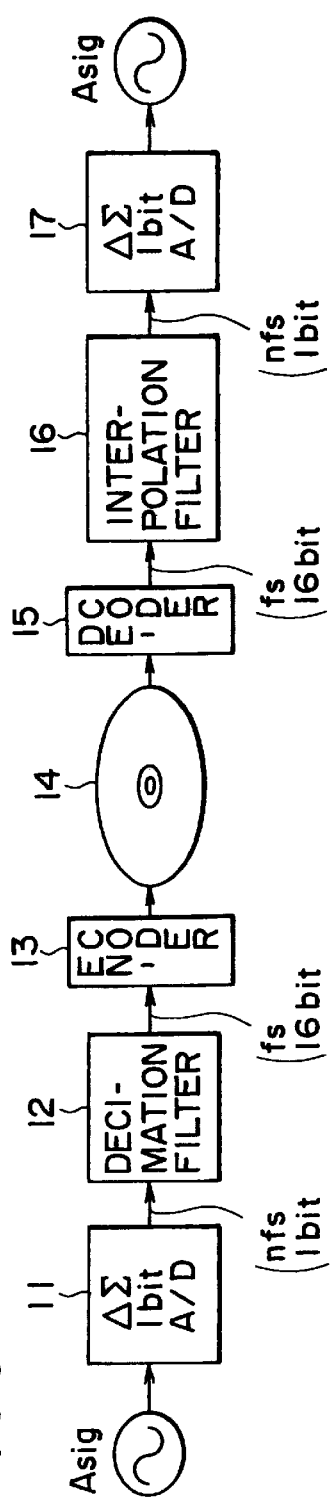
FIG. 16A DSD
FIG. 16B DVD
FIG. 16C CD-DA (OVER-SAMPLING)

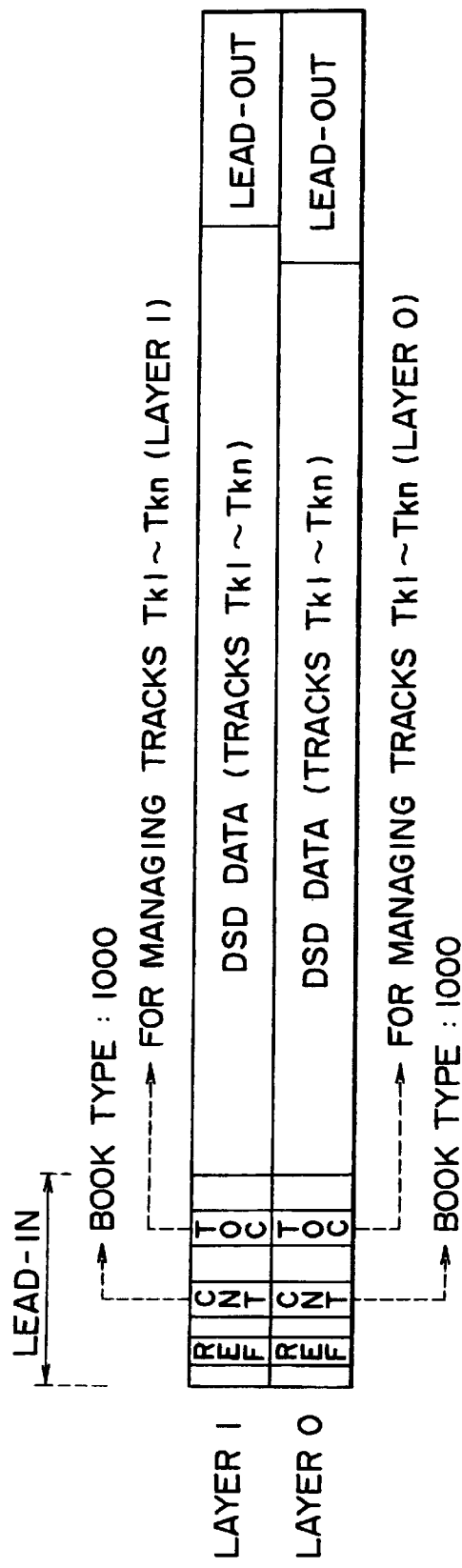
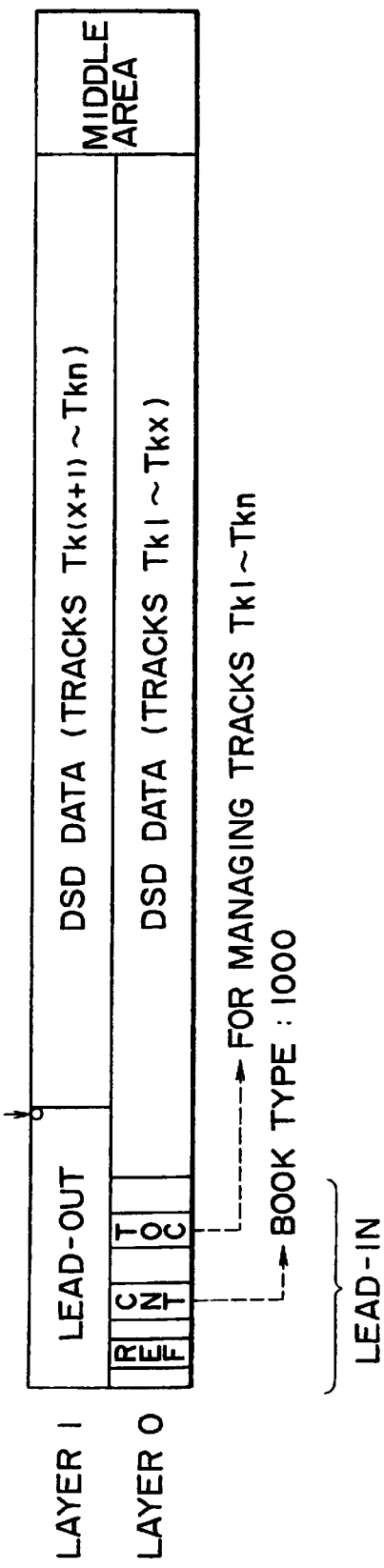
F I G. 18A PARALLEL TRACK PATHS
F I G. 18B OPPOSITE TRACK PATHS

FIG. 20

| | +0 | +1 | +2 | +3 | |
|---|---|---|---|---|---|
| | MSB  LSB | MSB  LSB | MSB  LSB | MSB  LSB | |
| 0 | L0 | R0 | L1 | R1 | |
| 1 | L2 | R2 | L3 | R3 | |
| 2 | L4 | R4 | L5 | R5 | |
| 3 | L6 | R6 | L7 | R7 | |
| 4 | L8 | R8 | L9 | R9 | |
| 5 | L10 | R10 | L11 | R11 | |
| 6 | L12 | R12 | L13 | R13 | |
| 7 | L14 | R14 | L15 | R15 | |
| 25 | L50 | R50 | L51 | R51 | |
| 26 | L52 | R52 | L53 | R53 | |
| 27 | L54 | R54 | L55 | R55 | |
| 28 | L56 | R56 | L57 | R57 | |
| 29 | L58 | R58 | L59 | R59 | |
| 30 | L60 | R60 | L61 | R61 | |
| 31 | L62 | R62 | L63 | R63 | |
| 32 | L64 | R64 | L65 | R65 | 2016 BYTES (MAIN DATA AREA) |
| 33 | L66 | R66 | L67 | R67 | |
| 34 | L68 | R68 | L69 | R69 | |
| 35 | L70 | R70 | L71 | R71 | |
| 36 | L72 | R72 | L73 | R73 | |
| 37 | L74 | R74 | L75 | R75 | |
| 38 | L76 | R76 | L77 | R77 | |
| 39 | L78 | R78 | L79 | R79 | |
| 40 | L80 | R80 | L81 | R81 | |
| 227 | L454 | R454 | L455 | R455 | |
| 228 | L456 | R456 | L457 | R457 | |
| 229 | L458 | R458 | L459 | R459 | |
| 230 | L460 | R460 | L461 | R461 | |
| 231 | L462 | R462 | L463 | R463 | |
| 232 | L464 | R464 | L465 | R465 | |
| 233 | L466 | R466 | L467 | R467 | |
| 234 | L468 | R468 | L469 | R469 | |
| 502 | L1004 | R1004 | L1005 | R1005 | |
| 503 | L1006 | R1006 | L1007 | R1007 | |

FIG. 21

| | +0 | +1 | +2 | +3 |
|---|---|---|---|---|
| | MSB    LSB | MSB    LSB | MSB    LSB | MSB    LSB |
| 0 | L0 | R0 | C0 | S0 |
| 1 | Lr0 | Rr0 | L1 | R1 |
| 2 | C1 | S1 | Lr1 | Rr1 |
| 3 | L2 | R2 | C2 | S2 |
| 4 | Lr2 | Rr2 | L3 | R3 |
| 5 | C3 | S3 | Lr3 | Rr3 |
| 6 | L4 | R4 | C4 | S4 |
| 7 | Lr4 | Rr4 | L5 | R5 |
| 8 | C5 | S5 | Lr5 | Rr5 |
| 25 | Lr16 | Rr16 | L17 | R17 |
| 26 | C17 | S17 | Lr17 | Rr17 |
| 27 | L18 | R18 | C18 | S18 |
| 28 | Lr18 | Rr18 | L19 | R19 |
| 29 | C19 | S19 | Lr19 | Rr19 |
| 30 | L20 | R20 | C20 | S20 |
| 31 | Lr20 | Rr20 | L21 | R21 |
| 32 | C21 | S21 | Lr21 | Rr21 |
| 33 | L22 | R22 | C22 | S22 |
| 34 | Lr22 | Rr22 | L23 | R23 |
| 35 | C23 | S23 | Lr23 | Rr23 |
| 36 | L24 | R24 | C24 | S24 |
| 37 | Lr24 | Rr24 | L25 | R25 |
| 38 | C25 | S25 | Lr25 | Rr25 |
| 39 | L26 | R26 | C26 | S26 |
| 40 | Lr26 | Rr26 | L27 | R27 |
| 227 | Lr151 | Rr151 | L151 | R151 |
| 228 | L152 | R152 | C152 | S152 |
| 229 | Lr152 | Rr152 | L153 | R153 |
| 230 | C153 | S153 | Lr153 | Rr153 |
| 231 | L154 | R154 | C154 | S154 |
| 232 | Lr154 | Rr154 | L155 | R155 |
| 233 | C155 | S155 | Lr155 | Rr155 |
| 234 | L156 | R156 | C156 | S156 |
| 502 | Lr334 | Rr334 | L335 | R335 |
| 503 | C335 | S335 | Lr335 | Rr335 |

2016 BYTES (MAIN DATA AREA)

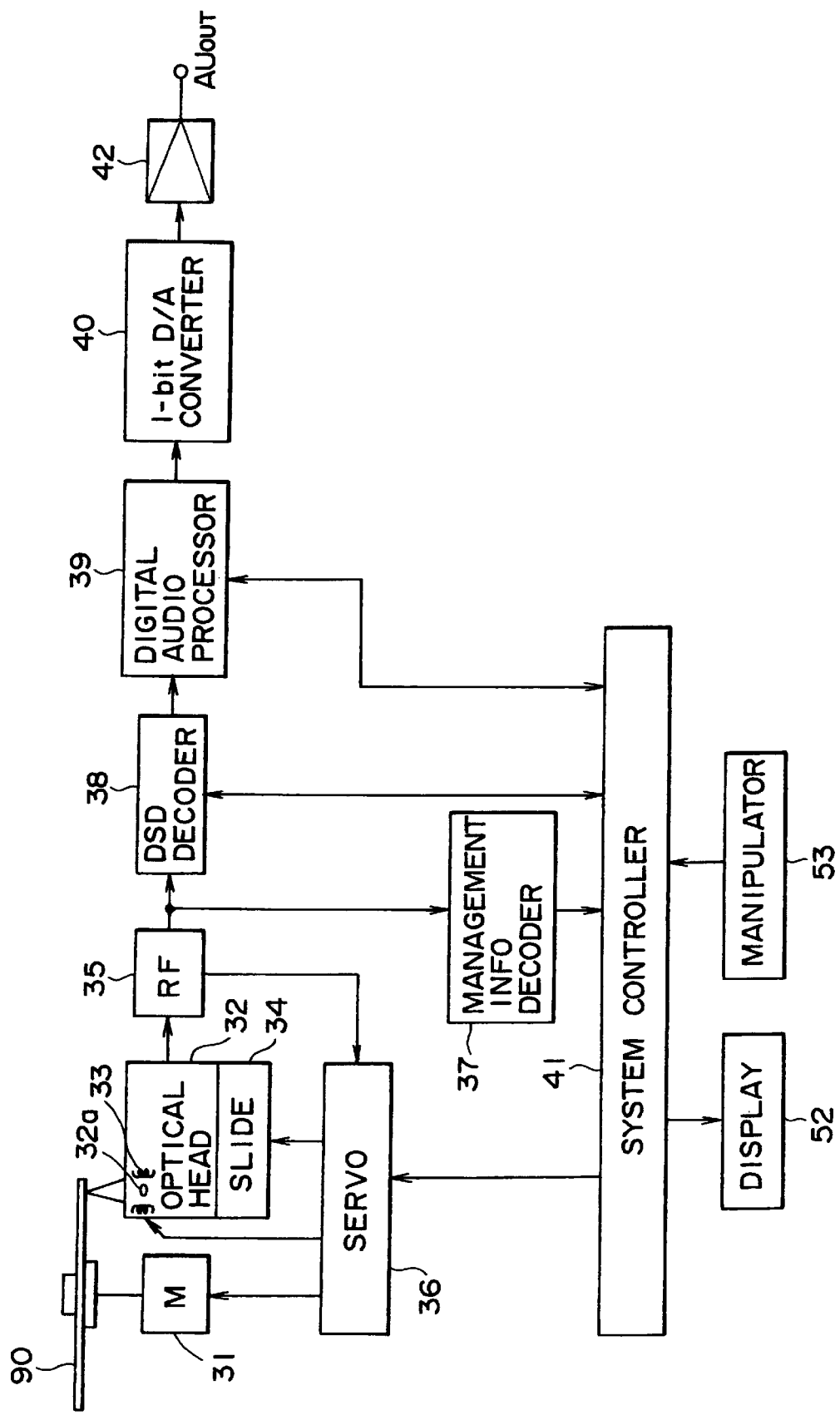

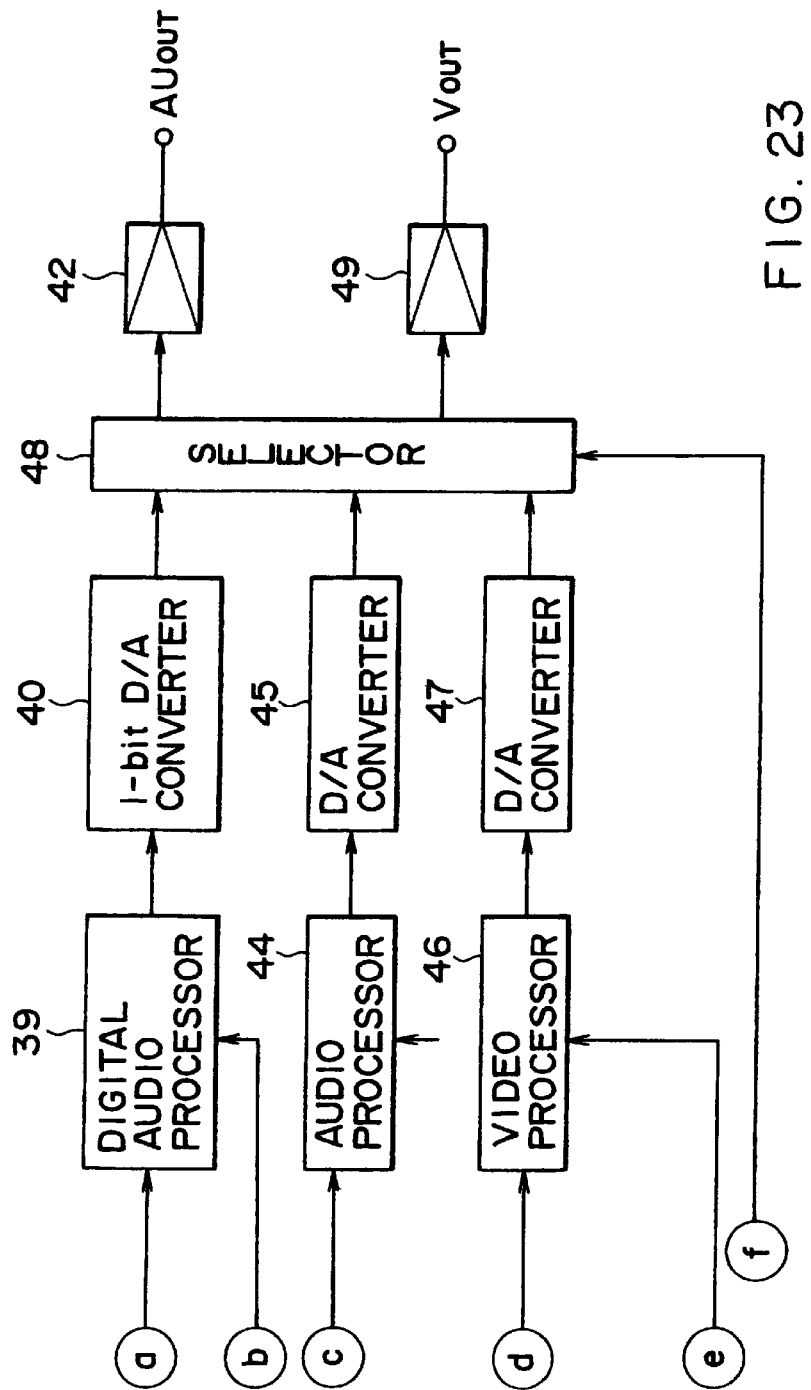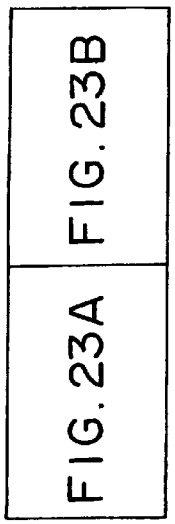

6-ch DATA RECORDING 6-ch DATA REPRODUCTION 6-ch DATA REPRODUCTION IN 2-ch MODE

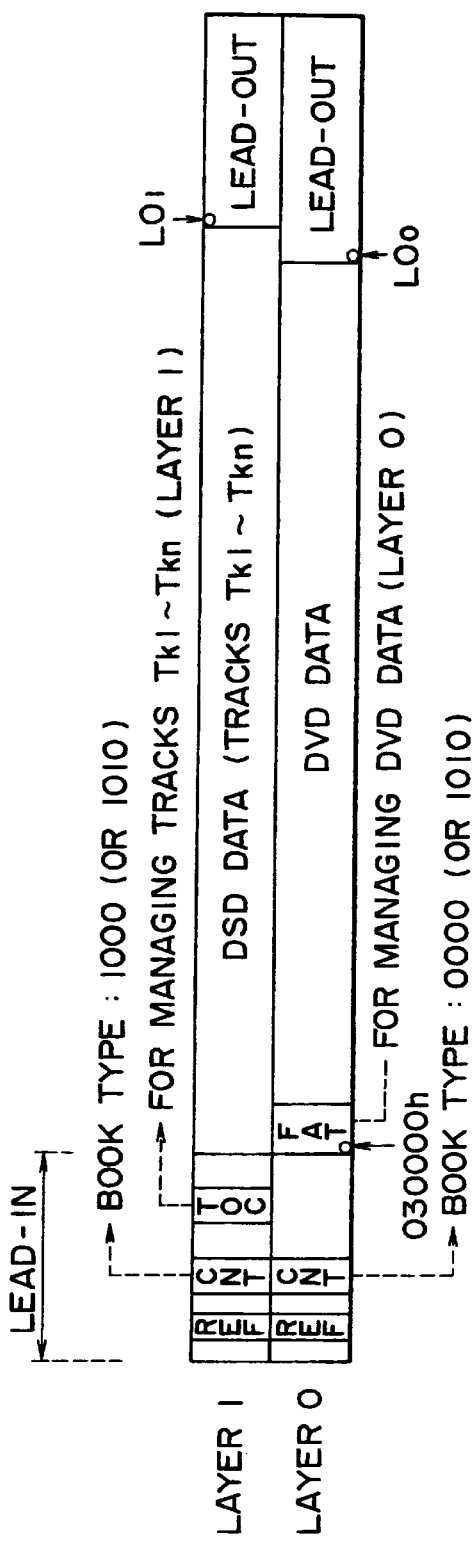
FIG. 28A PARALLEL TRACK PATHS
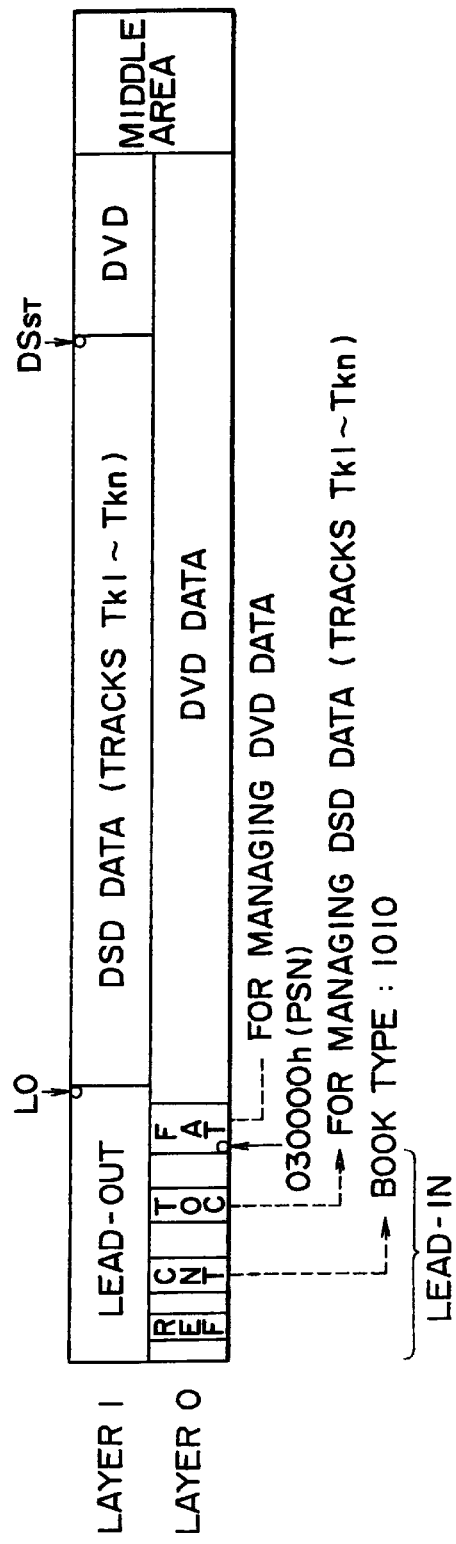
FIG. 28B OPPOSITE TRACK PATHS

CD EXTRA

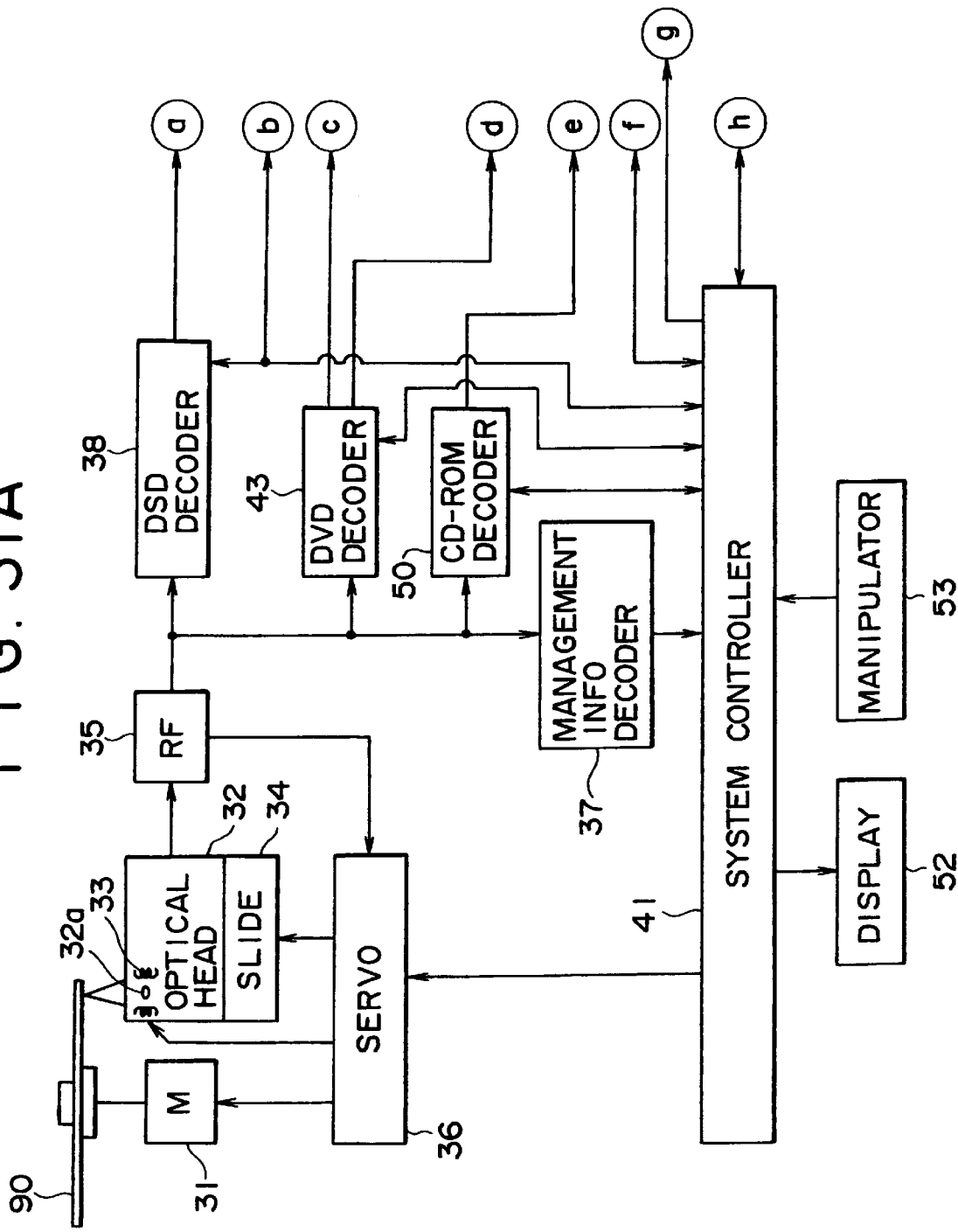

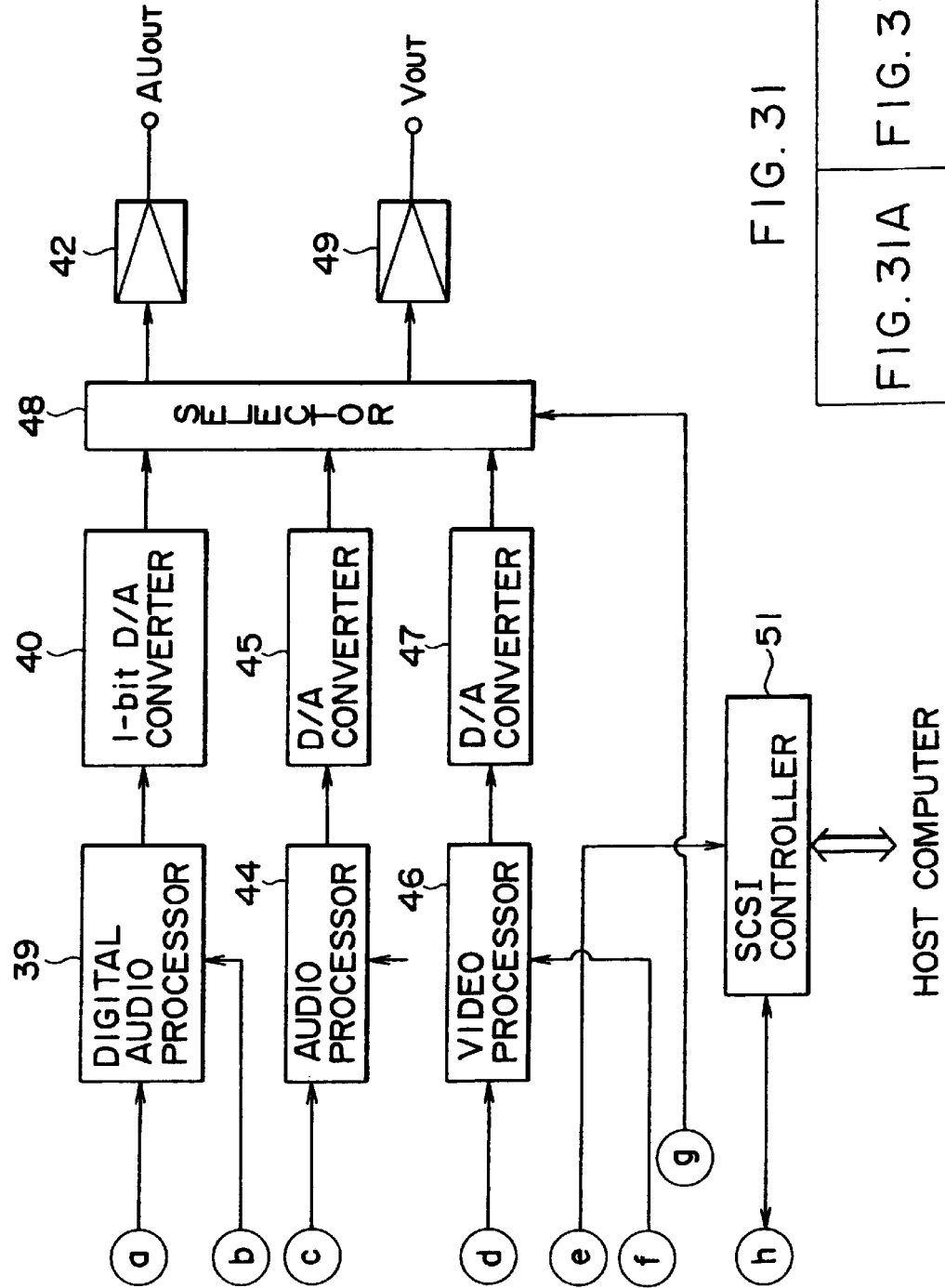

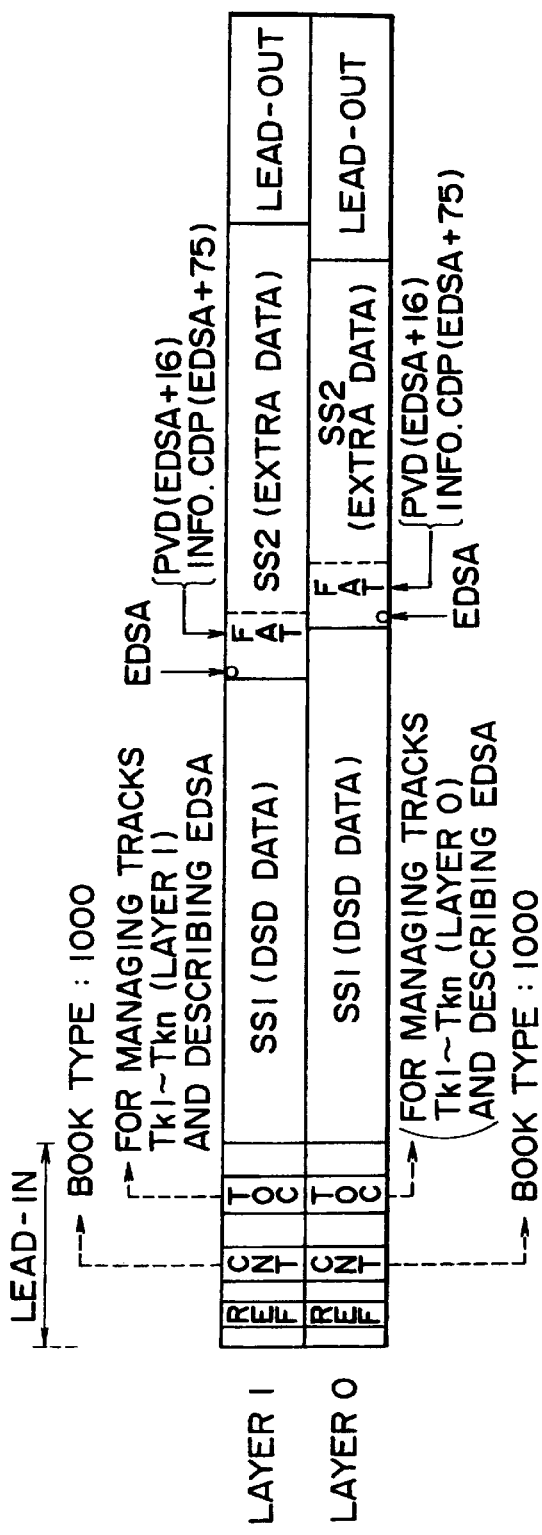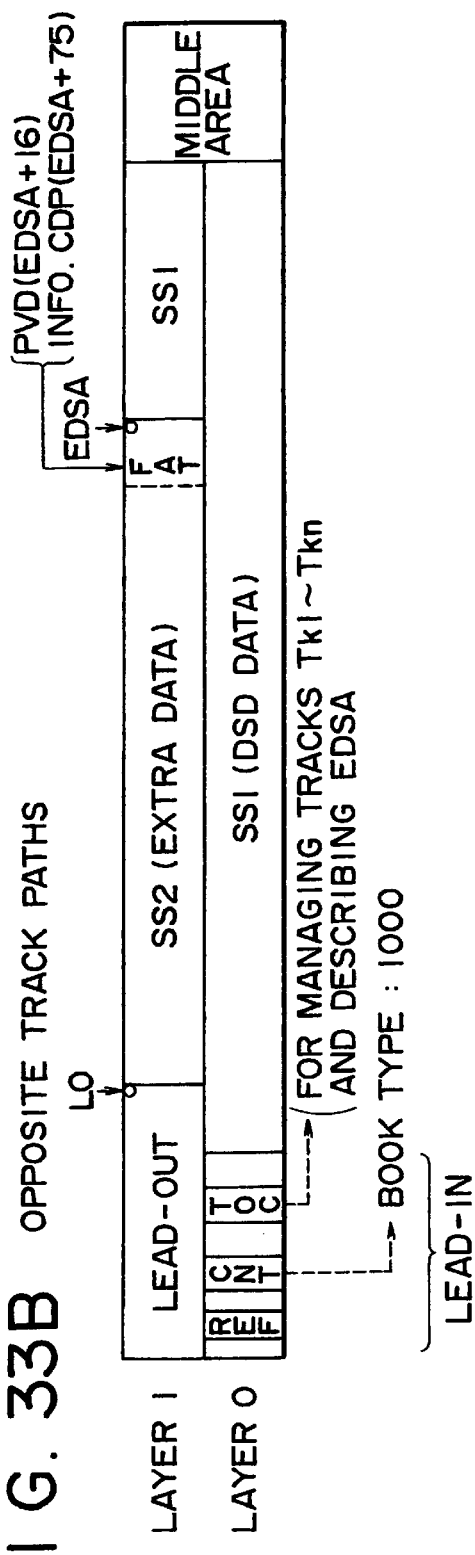
FIG. 33A PARALLEL TRACK PATHS
FIG. 33B OPPOSITE TRACK PATHS

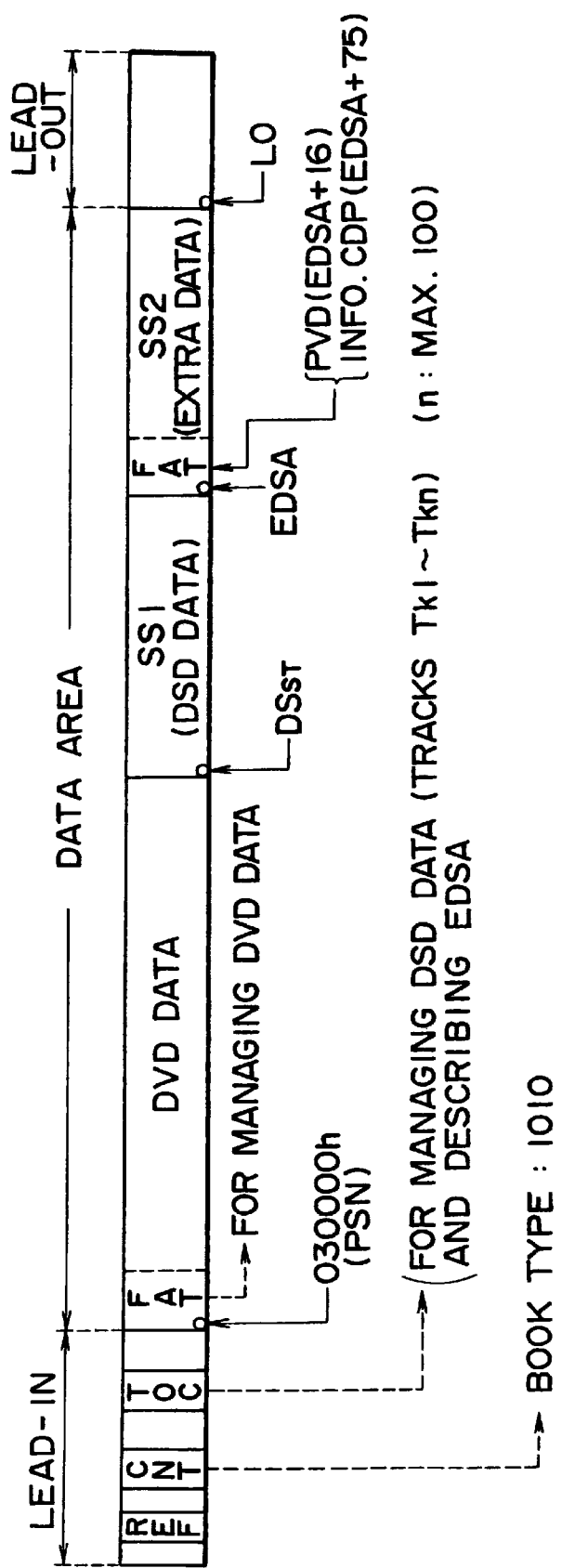
F I G. 34

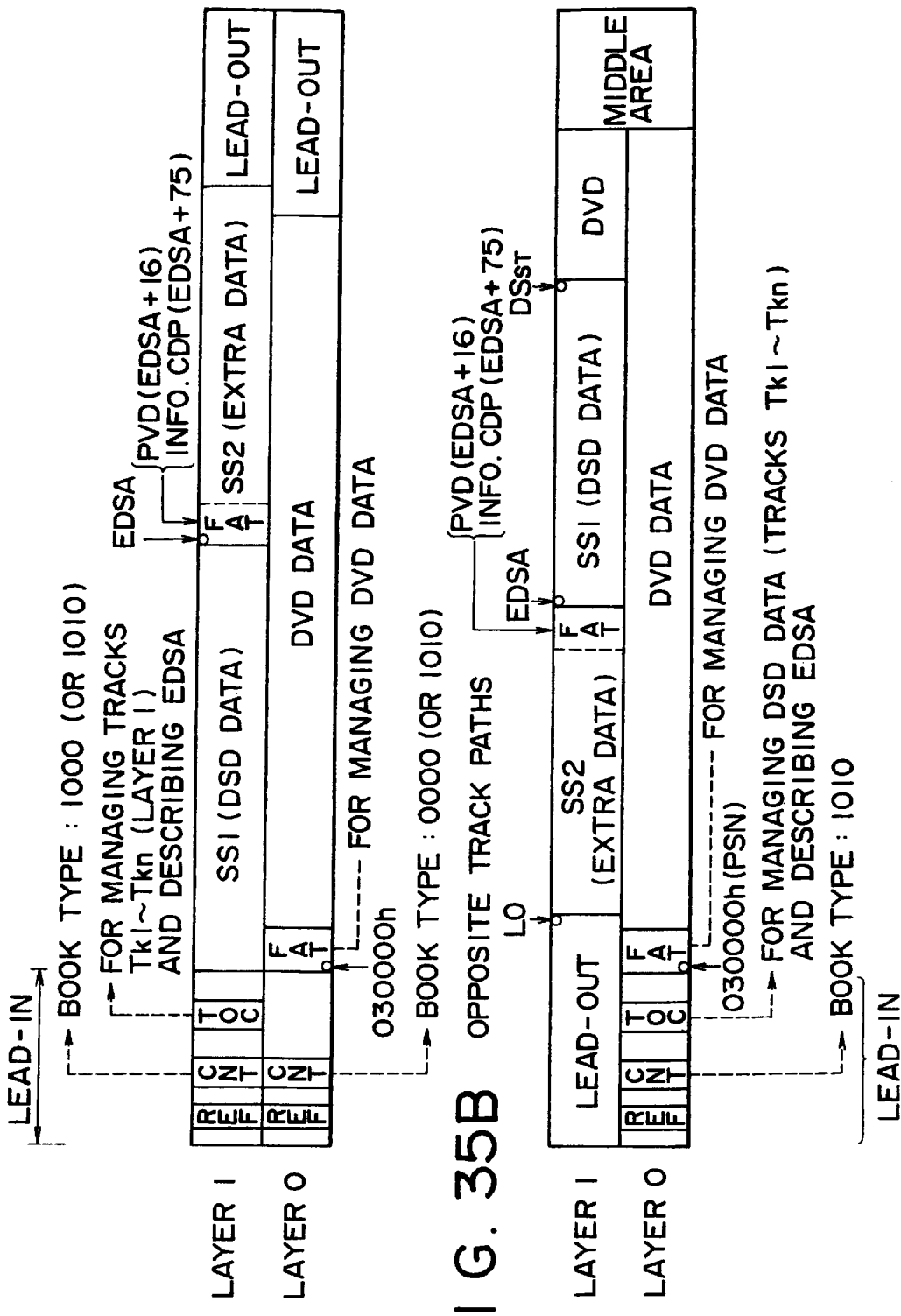

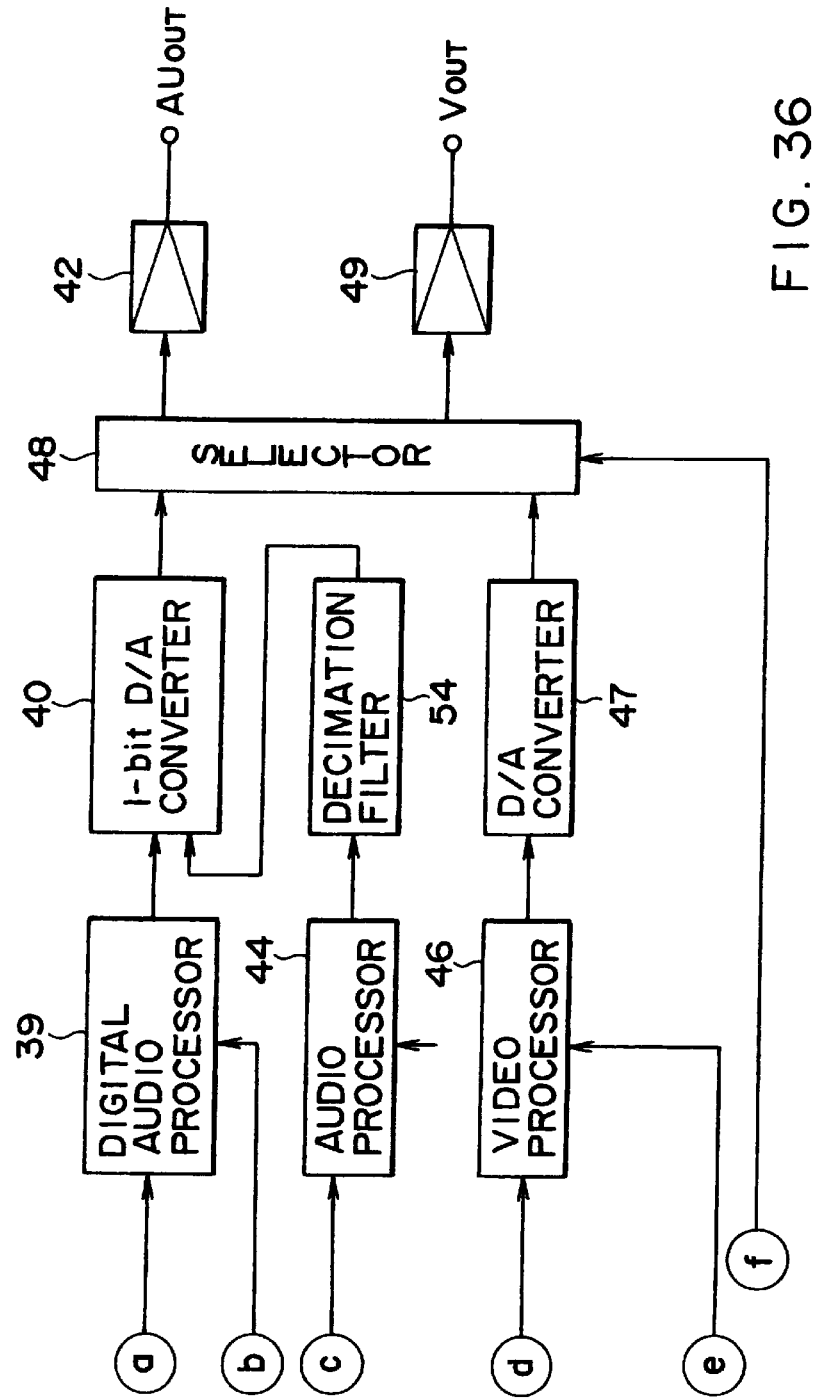
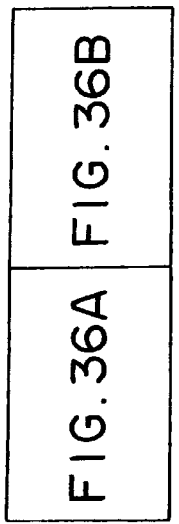

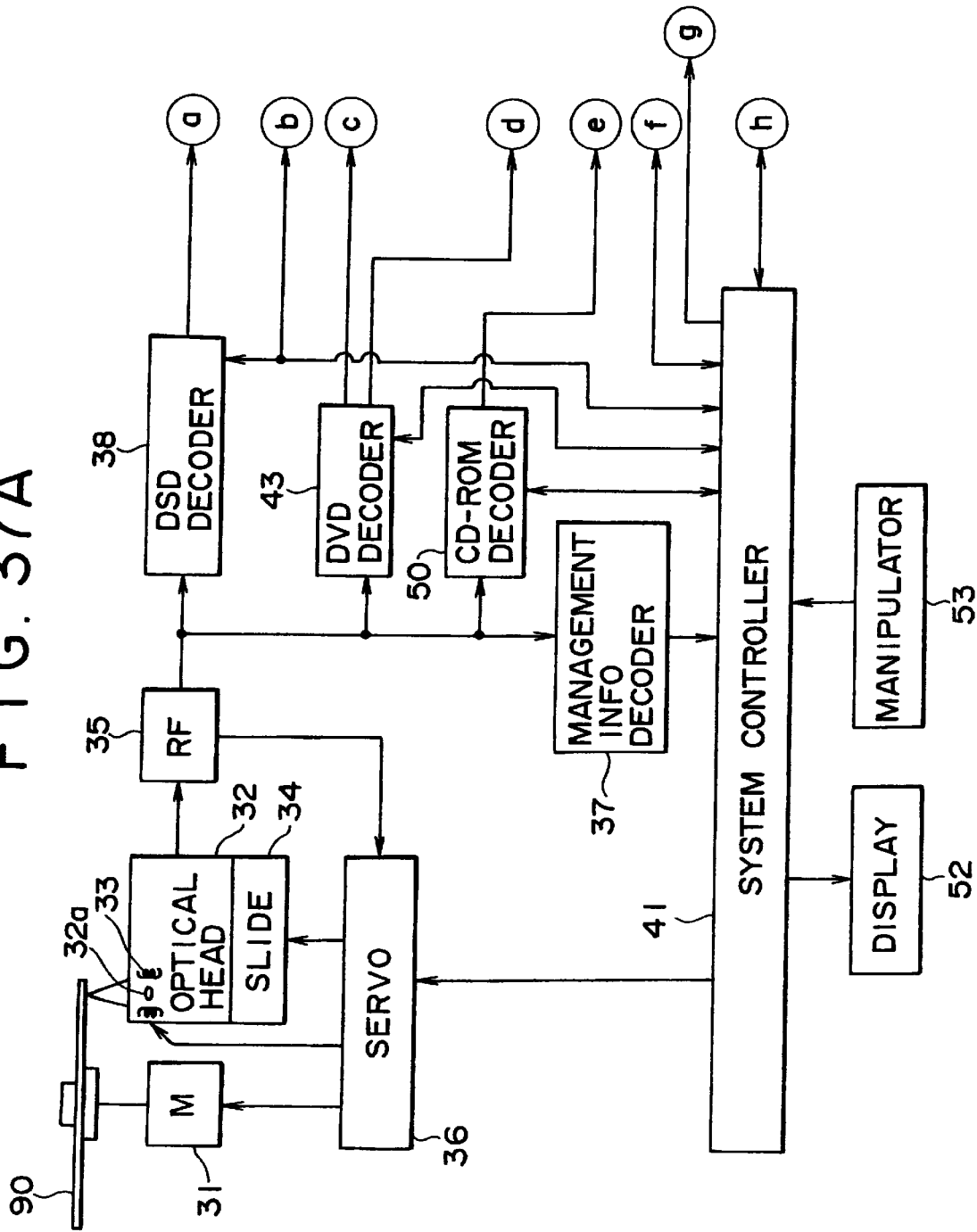

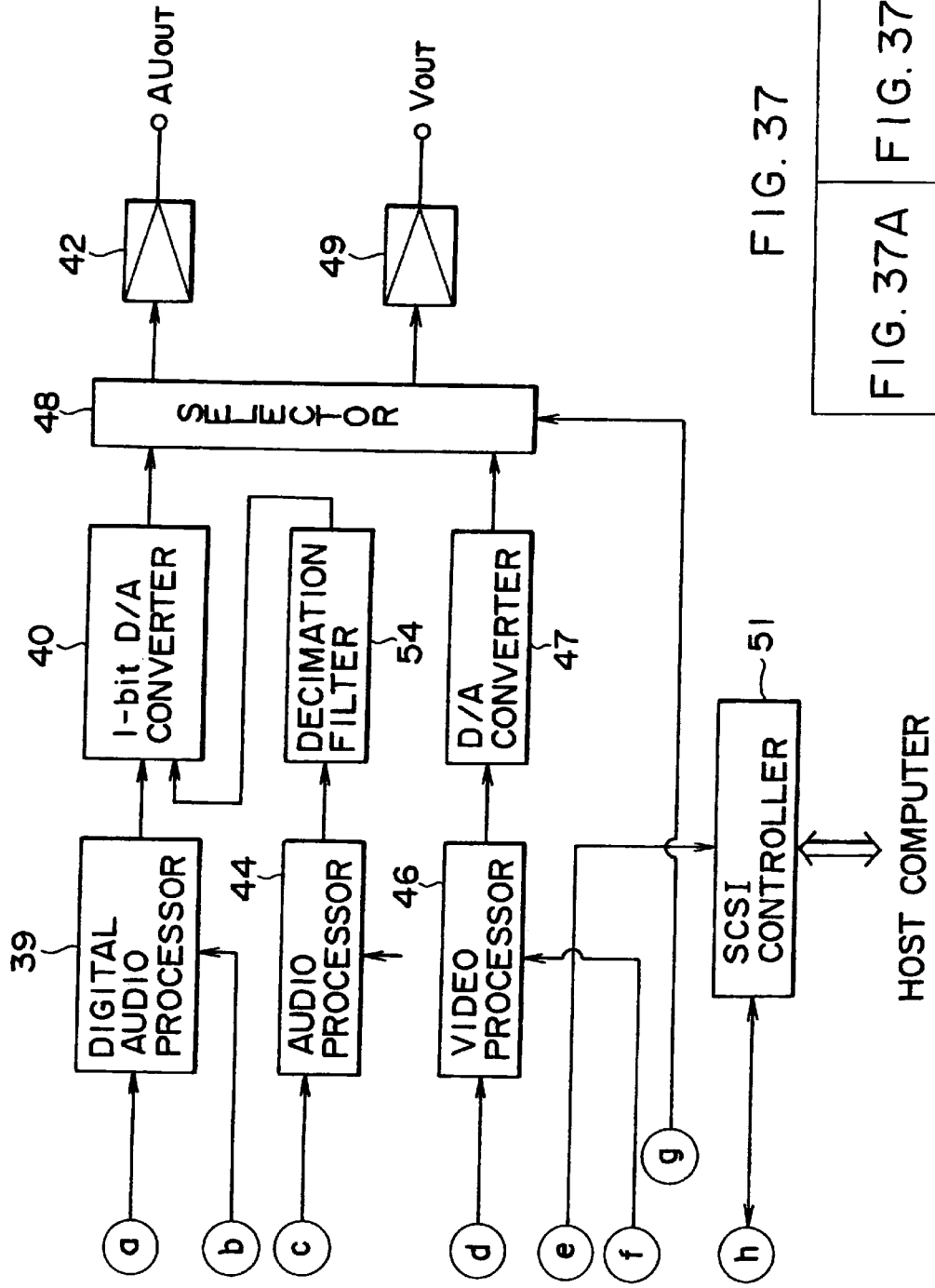

RECORDING MEDIUM WITH FORMAT FOR PREVENTING UNAUTHORIZED COPYING, AND REPRODUCING APPARATUS FOR SAME

BACKGROUND OF THE INVENTION

The present invention relates to a disc recording medium where a specific physical format is prescribed, and also to a reproducing apparatus adapted for playing such a recording medium.

Recently, a variety of recording media and recording/reproducing apparatus are in practical use to meet requirements with advanced high-density recording media inclusive of discs and tapes, and further due to diversified data usage of audio, video and computer data.

As for disc media, there are known, relative to the CD (Compact Disc) type, CD-DA (CD Digital Audio), CD-G, CD-I, CD-WO, video CD, CD-ROM and so forth. Further, as termed CD extra, there is known a type where a CD-DA data area and a CD-ROM data area are set separately.

In addition, MD (Mini Disc) and MD data are also diffused as magneto-optical disc media which are suited for users to record and/or reproduce audio or computer data with facility.

Besides the above, DVD (Digital Video Disc/Digital Versatile Disc) is also developed as a multimedia disc which deals with video data, audio data, computer data and so forth.

In developing any novel media system such as DVD, it is demanded to solve the problems of the existing media systems already in practical use and further to inherit and extend the advantages thereof.

Out of many problems currently observed in the conventional systems known heretofore, some examples are as follows.

First with regard to digital audio data recording/reproducing systems, in comparison with the current CD-DA standards inclusive of 44.1 kHz sampling and 16-bit quantization, various higher-bit and higher-sampling digital audio recording/reproducing systems are developed in accordance with the recent trend of realizing greater capacities of media and higher transfer rates thereof. However, each of them fails to satisfy the conditions required as a next-generation audio system.

In the CD-DA standard for example, any frequency band above 22 kHz is filtered due to the limit of a sampling rate, so that higher harmonics included originally in an audio signal are cut in the data, whereby the sound quality is somewhat deteriorated with a lack of natural feeling. For this reason, an improved standard is proposed with 96 kHz sampling and 24-bit quantization, but it is still impossible to eliminate deterioration of the sound quality that results from a limit of higher harmonics.

There is also known another CD-DA system where an analog audio signal is converted by a 1-bit $\Delta\Sigma$ modulation A/D converter into a signal of sampling frequency 64 fs/1 bit (fs=44.1 kHz). However, for recording in CD-DA, such a 64 fs/1 bit signal needs to be converted into data of 44.1 kHz/16 bits through decimation (down-sampling) by a digital filter. And in a reproducing mode, the data of 44.1 kHz/16 bits is turned into, e.g., 64 fs/1 bit signal through over-sampling by a digital filter and then is returned to an analog audio signal by a 1-bit $\Delta\Sigma$ modulation D/A converter. In this system, some calculation error is generated during the passage of data via the digital filter to consequently cause deterioration of the sound quality.

Although a variety of package media are existent with diverse development of CD media inclusive of CD-DA, the current situation relative to common use of data and interchangeability thereof is considered unsatisfactory.

SUMMARY OF THE INVENTION

It is a principal object of the present invention to provide a media system capable of solving the problems mentioned above, and a particular object thereof resides in realizing a novel recording medium which conforms with a specific physical format of, e.g., DVD inclusive of superior sound quality in audio data recording and reproduction, common usability of data, and interchangeability of an apparatus.

According to one aspect of the present invention, there is provided a recording medium where physical format management information including data relative to a physical format is recorded in a lead-in area, and data of a specific first data format and first data management information for managing reproduction of such data can be recorded in a data area in conformity with the physical format management information. In this recording medium, identification data signifying the existence of recorded data of a second data format different from the first data format is included in the physical format management information. And data of the second data format is recorded in the data area in conformity with the physical format management information, and further second data management information is recorded at a predetermined position to manage reproduction of the data of the second data format.

In the above recording medium, the second data management information includes recording position information per unit data of, e.g., the second data format, additional information, and recording position information for partial reproduction.

Also in the recording medium, the data of the second data format is composed of a $\Delta\Sigma$ modulated 1-bit audio signal.

In case the data area has a region where the data of the first data format and the first data management information are recorded and another region where at least the data of the second data format is recorded, identification data is included in the physical format management information to signify that the data of both the first and second data formats are recorded.

The second data management information includes position information of the region where data of a third data format different from the first and second data formats is recorded, and data of the third data format and third data management information for managing reproduction of such data are recorded in the region indicated in the data area by the above position information.

According to another aspect of the present invention, there is provided a reproducing apparatus adapted for playing the above recording medium. The apparatus comprises a read means capable of executing an operation to read out information from the loaded recording medium; a decision means for making a decision as to whether the data of the second data format is recorded or not, on the basis of the physical format management information read out from the loaded recording medium; a reproduction control means for enabling the read means to read out the second data management information when the result of the decision signifies that the data of the second data format is recorded, then acquiring the second data management information thus read out, and enabling the read means to read out the data of the second data format on the basis of the second data management information; and a second-format decode means for decoding the data of the second data format thus read out.

In the above apparatus, the reproduction control means has a first format decode means for enabling the read means to read out the data of the first data format on the basis of the first data management information read out by the read means when the output of the decision means signifies that the data of the first data format is recorded, and then decoding the data of the first data format thus read out.

Also in the apparatus, the reproduction control means further has a third-format decode means. When position information of a region, where data of a third data format different from the first and second data formats is recorded, is included in the acquired second data management information, the third-format decode means enables the read means, in response to such position information, to read out third data management information to manage reproduction of the data of the third data format, subsequently enables the read means to read out the data of the third data format on the basis of the third data management information, and then decodes the data of the third data format thus read out.

The above and other features and advantages of the present invention will become apparent from the following description which will be given with reference to the illustrative accompanying drawings.

BRIEF DESCRIPTION OF THE DRAWINGS

FIG. 2 is an explanatory diagram showing a sector structure in the DVD of the embodiment;

FIGS. 3A and 3B are explanatory diagrams showing a volume space in the DVD of the embodiment;

FIGS. 6A to 6D are explanatory diagrams each showing a sector format in the embodiment;

FIGS. 8A to 8D are explanatory diagrams showing control data in the embodiment;

FIG. 9 is an explanatory diagram showing physical format information of control data in the embodiment;

FIG. 11 is an explanatory diagram showing a TOC sector 0 in the embodiment;

FIG. 12 is an explanatory diagram showing a TOC sector 1 in the embodiment;

FIG. 13 is an explanatory diagram showing a TOC sector 2 in the embodiment;

FIG. 14 is an explanatory diagram showing a TOC sector 3 in the embodiment;

FIG. 15 is an explanatory diagram showing a TOC sector 4 in the embodiment;

FIGS. 16A to 16C are explanatory diagrams showing DSD data in the embodiment;

FIGS. 18A and 18B are explanatory diagrams each showing a DSD disc with dual layers in the embodiment;

FIG. 20 is an explanatory diagram showing a data sector in a 2-channel mode in the embodiment;

FIG. 21 is an explanatory diagram showing a data sector in a 6-channel mode in the embodiment;

FIG. 22 is a block diagram showing a reproducing apparatus of an embodiment adapted for a DSD disc;

FIGS. 23A and 23B are block diagrams showing a reproducing apparatus of another embodiment adapted for DSD and DVD discs;

FIGS. 28A and 28B are explanatory diagrams showing DSD/DVD composite discs with dual layers of the embodiments;

FIGS. 31A and 31B are block diagrams showing a reproducing apparatus of the embodiment adapted for a DSD/CDEX composite disc;

FIGS. 33A and 33B are explanatory diagrams showing DSD/CDEX composite discs with dual layers of the embodiments;

FIG. 34 is an explanatory diagram showing a DSD/CDEX/DVD composite disc with a single layer of the embodiment;

FIGS. 35A and 35B are explanatory diagrams showing DSD/CDEX/DVD composite discs with dual layers of the embodiments;

FIGS. 36A and 36B are block diagrams showing a modified reproducing apparatus of the embodiment adapted for DSD and DVD discs; and FIGS. 37A and 37B are block diagrams showing another modified reproducing apparatus of the embodiment adapted for a DSD/CDEX composite disc.

DESCRIPTION OF THE PREFERRED EMBODIMENTS

Figure 1A:
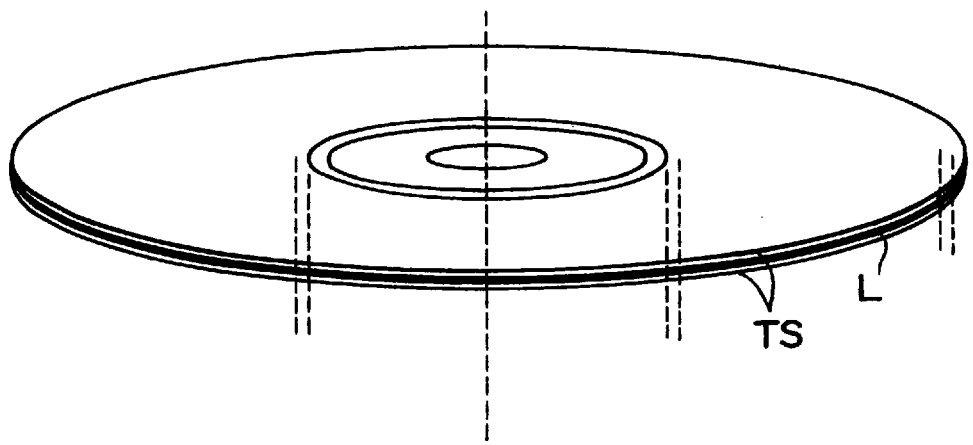
FIGS. 1A and 1B are explanatory diagrams each illustrating the structure of a DVD used in preferred embodiments of the present invention.

Hereinafter some preferred embodiments of the present invention will be described in the following order. The embodiments represent a novel recording medium based on the physical format in a DVD (Digital Video Disc/Digital Versatile Disc) system, and a reproducing apparatus adapted for playing such a recording medium.

[1] DVD structure
[2] DVD sector format
[3] Lead-in area
   (3-A) DVD control data
   (3-B) DSD-TOC data
      (3-B-1) TOC structure
      (3-B-2) TOC sector 0
      (3-B-3) TOC sector 1
      (3-B-4) TOC sector 2

(3-B-5) TOC sector 3
(3-B-6) TOC sector 4
[4] DSD
  (4-A) DSD disc
  (4-B) DSD data
    (4-B-1) DSD data sector
    (4-B-2) 2-ch audio DSD data sector
    (4-B-3) 6-ch audio DSD data sector
  (4-C) DSD disc reproducing apparatus
  (4-D) 6-ch data recording/reproduction
[5] DSD/DVD composite disc
[6] DSD/CDEX composite disc
  (6-A) CDEX
  (6-B) Example of DSD/CDEX composite disc
  (6-C) DSD/CDEX composite disc reproducing apparatus
[7] Modifications

[1] DVD Structure

Figure 1B:
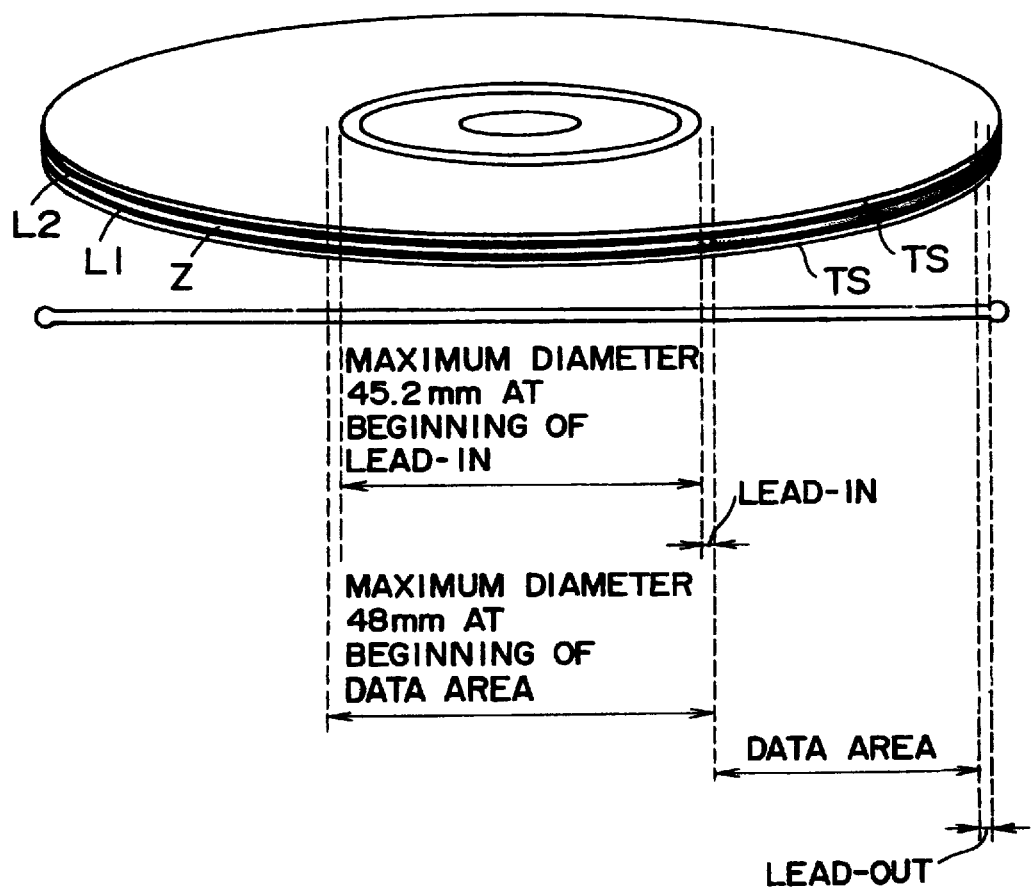

Each of FIGS. 1A and 1B shows the structure of a DVD. A DVD, which is a disc-shaped recording medium for multimedia use, is either a type where, as shown in FIG. 1A, upper and lower planes serve as transmitting substrates TS to a recording layer L on which pits of recorded data are formed, or another type where, as shown in FIG. 1B, first recording layer L1 and a second recording layer L2 each having pits of recorded data thereon are formed via a bonding layer Z, and upper and lower planes serve as transmitting substrates TS to the first and second recording layers L1 and L2.

The type of FIG. 1A having merely one recording layer L is termed a single layer disc, while the type of FIG. 1B having two recording layers L1 and L2 is termed a dual layer disc.

Adequate sizes of both a single layer disc and a dual layer disc may be 12 cm or 8 cm in diameter.

On each disc, there are formed three areas which are termed a lead-in, a data area and a lead-out in this order from the inside of the disc.

The maximum diameter at the beginning position of the lead-in is prescribed to be 45.2 mm, and the maximum diameter at the beginning position of the data area is prescribed to be 48 mm.

Data is recorded on such a DVD with setting of addresses (sector numbers) where each sector is composed of 2064 bytes. (A sector format will be described later in detail.)

FIG. 2 is an expanded band-like view of a lead-in area, a data area and a lead-out area formed in this order on an exemplary single layer disc from the innermost to the outermost thereof, and sectors are formed in all the areas.

As shown in FIG. 2, there are physical sectors and logical sectors conceptually. Physical sectors are numbered physically from the first sector. That is, as denoted by physical sector numbers PSN, the first sector at the beginning of the lead-in area is given a physical sector number "000000h". (In this specification, any numerical value with "h" is in hexadecimal notation.)

Normally the physical sector number PSN of the last sector in the lead-in area is set to "02FFFFh", and the sector having a physical sector number PSN of "030000h" is the first sector in the data area.

Each of such physical sector numbers PSN functions as an absolute address on the disc.

Meanwhile in logical sectors, the top sector in the data area, i.e., the sector having a physical sector number PSN of "030000h", is regarded as a first sector whose logical sector number LSN is "000000h".

The beginning of the lead-out area is positionally varied in accordance with the quantity of the data recorded in the data area. In FIG. 2, the sector having a logical sector number LSN of "L0" is a first sector in the lead-out area.

A volume space is formed of an area denoted by logical sector numbers LSN, i.e., of data-area sectors posterior to the sector having a physical sector number PSN of "030000h". This volume space is so formed as shown in FIG. 3A.

In the logical sectors, those numbered 0 to 15, 21 to 31 and 66 to 255 are reserved (undetermined), and a UDF (universal disc format) bridge volume identification sequence is recorded in sectors numbered 16 to 20.

In such a UDF bridge volume identification sequence in the five sectors, there are described a PVD (primary volume descriptor), a volume descriptor set terminator, an extend area start descriptor, an NSR descriptor, and an extend area end descriptor.

Also in the logical sectors, a main volume description sequence is described in sectors 32 to 47, a reserve volume description sequence is described in subsequent sectors 48–63, and a logical volume integrity sequence is described in sectors 64–65. And sector 256 is used as a first anchor point.

Sectors 257 to (P−1) are in an ISO9660 file structure, and sectors (P) to (P+Q−1) are in a UDF file structure. The data ranging from the UDF bridge volume identification sequence to the UDF file structure are used as file management information. The actual data and the data (file data structure) such as video data or audio data based on the UDF or ISO9660 are recorded in a range from sector (P+Q) to sector (logical sector number LSN="L0-2") which is positionally anterior by two sectors to the top sector in the lead-out area. Sector having a logical sector number LSN of "L0-1" is used as a second anchor point.

The volume space is used in the manner mentioned above, and package media, where video, audio and computer data are recorded, are produced from the file data structure and the file management information ranging from the UDF bridge volume identification sequence to the UDF file structure.

Figure 4:
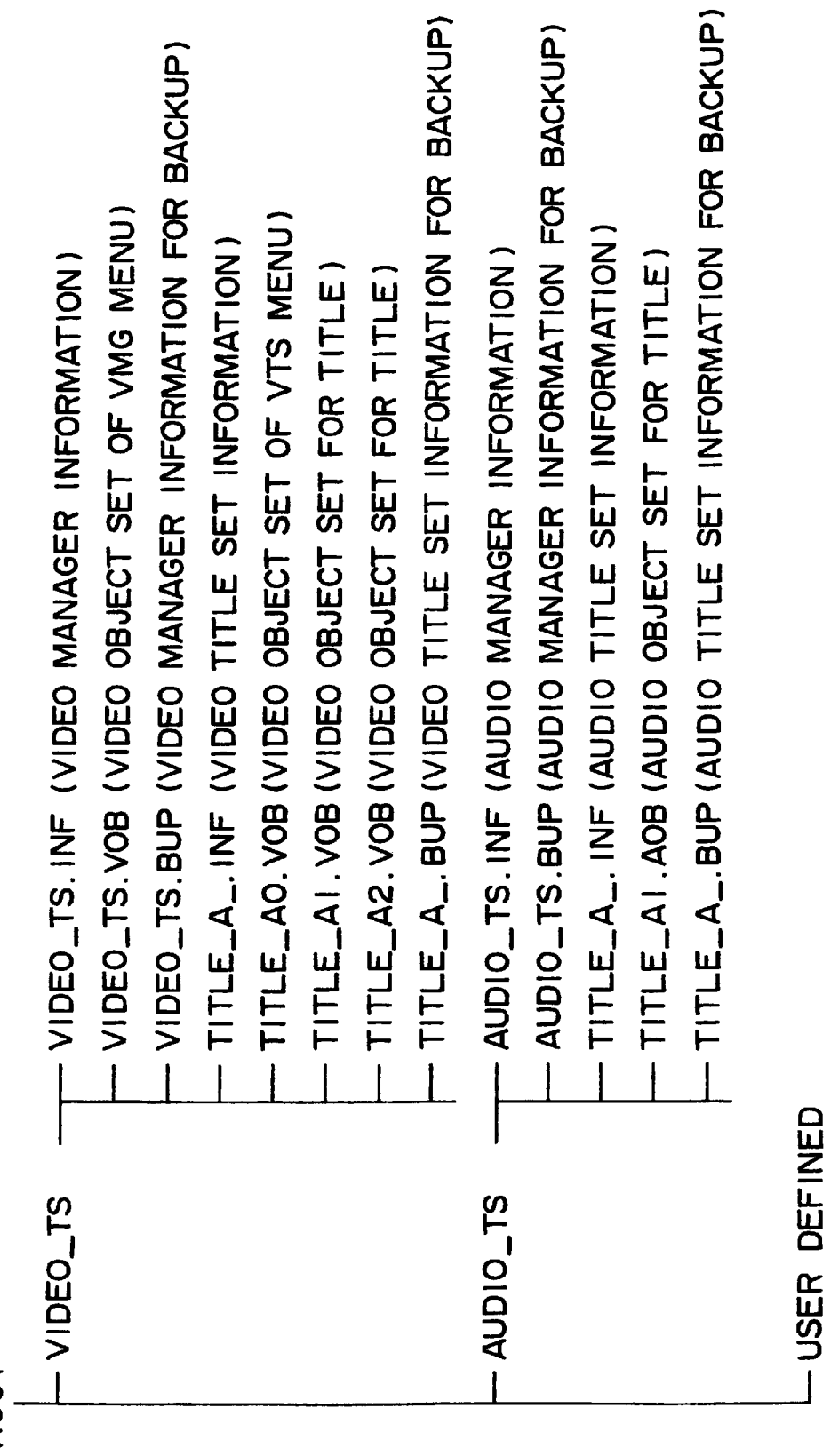
FIG. 4 is an explanatory diagram showing a directory structure in the DVD of the embodiment.

A directory structure is such as shown in FIG. 4.

As mentioned, DVDs are classified into two kinds, i.e., single layer disc and dual layer disc. Further, depending on track paths (scanning paths for reproduction), dual layer disks are classified into two kinds with parallel track paths and opposite track paths. Consequently, DVDs are classified broadly into three physical types, which are shown in FIGS. 5A, 5B and 5C.

Figure 5A:
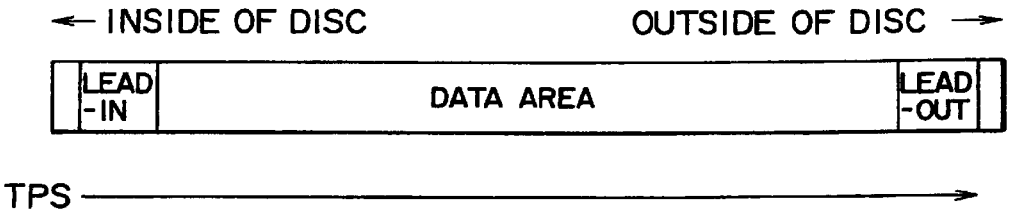
FIGS. 5A to 5C are explanatory diagrams each showing a layer structure and track paths in the embodiment.

FIG. 5A shows a single layer disc, where its track path TPS is merely one kind extending from an innermost lead-in area of the disc toward an outermost lead-out area thereof.

Figure 5B:
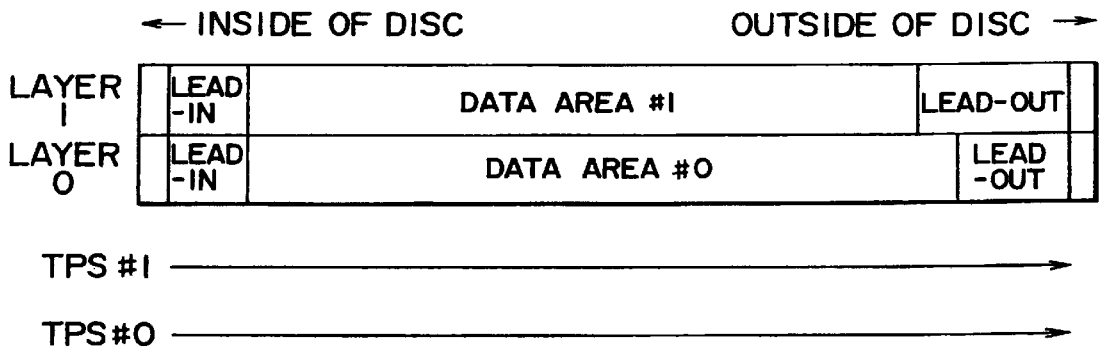
Figure 5C:
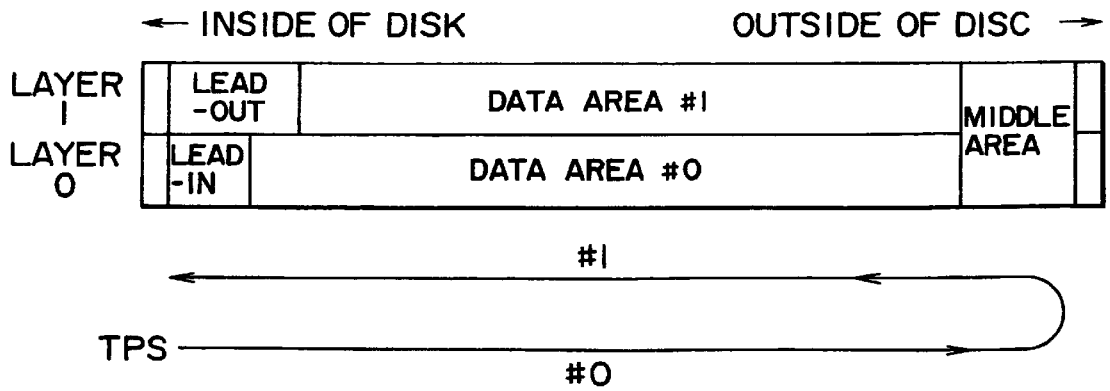

FIG. 5B shows a dual layer disc with parallel track paths. In a dual layer disc, there are formed a layer 0 corresponding to the first recording layer L1 in FIG. 1B and a layer 1 corresponding to the second recording layer L2. In the case of parallel track paths, the two layers 0 and 1 are regarded as mutually independent ones.

More specifically, there are formed a lead-in area, a data area and a lead-out area in each of the layers 0 and 1. In a data area #0 of the layer 0 and a data area #1 of the layer 1, it is possible to record data of the same contents in different formats or data of mutually different contents.

A track path TPS#0 relative to the layer 0 extends from the innermost lead-in area of the layer 0 toward the outermost lead-out area through scanning the data area #0, while a track path TPS#1 relative to the layer 1 extends from the innermost lead-in area of the layer 1 toward the outermost lead-out area through scanning the data area #1.

Thus, scanning is executed along the two same track paths independent of each other in the layers.

FIG. 5C shows a dual layer disc with opposite track paths. In this case, a layer 0 and a layer 1 are regarded as one continuous layer.

More specifically, a lead-in area is formed in the innermost portion of the layer 0, and a data area #0 is formed adjacently thereto, and further a region termed a middle area is formed in the outermost portion of the layer 0.

Meanwhile in the layer 1, a data area #1 is formed inward adjacently to the middle area in the outermost portion, and a lead-out area is formed in the innermost portion.

A track path TPS extends from the innermost lead-in area of the layer 0 toward the outermost middle area through scanning the data area #0, then extends inward after arrival at the middle area, and subsequently toward the innermost lead-out area through scanning the data area #1.

Thus, in this case, the two layers 0 and 1 are handled as one continuous layer.

[2] DVD Sector Format

Each sector has a structure of FIG. 6.

FIG. 6A shows the entirety of one sector. Each sector (prior to being encoded as an actual record sector) is composed of 2064 bytes. The top 12 bytes constitute a sector header where, as shown in an enlarged view of FIG. 6B, an ID of 4 bytes and an IED (ID Error Detection Code) of 2 bytes are recorded. The remaining 6 bytes are reserved.

Next to such 12-byte sector header, 2048 bytes constitute a data area. And the last 4 bytes are assigned to an EDC (Error Detection Code).

The error detection code EDC is used for error detection relative to the header and the data in the data area, and its generating polynominal is expressed as $G_p(x)=X^{32}+X^{31}+X^4+1$.

Meanwhile the ID error detection code IED used for error detection is added to the ID of the top 4 bytes in the header, and its generating polynominal is expressed as $G_p(x)=X^8+X^4+X^3+X2+1$.

FIG. 6C is an enlarged view of the top 4 bytes constituting the ID in the header. In the area of such 4 bytes, i.e., 32 bits from b0 to b31, sector information and a sector number are recorded as the content of the ID. The sector information is recorded in bits b24–b31, i.e., in the top 1 byte, and the sector number is recorded in a 3-byte area of bits b0–b23. The sector number is recorded as an absolute address which corresponds to the aforementioned physical sector number PSN.

The 1-byte sector information of bits b24–b31 includes, as shown in FIG. 6D, a sector format type, a tracking method, a reflectivity, an area type and a layer number. One bit b28 is reserved.

The sector format type is described by the use of one bit b31, and "0" stands for a ROM type, while "1" for a reserve.

The tracking method is described by the use of one bit b30, and "0" stands for pit tracking, while "1" for a reserve.

The reflectivity is described by the use of one bit b29, and "0" stands for a value above 50%, while "1" for a value below 50%.

The area type described by the use of two bits b27 and b26 signifies the area where the relevant sector is included. Bits "00" stand for a sector in the data area, "01" for a sector in the lead-in area, "10" for a sector in the lead-out area, and "11" for a sector in the middle area.

The layer number described by the use of two bits b25 and b24 signifies the layer where the relevant sector is included. Bits "00" stand for a sector in a single layer disc or a sector in a layer 0 of a dual layer disc, "01" stand for a sector in a layer 1 of a dual layer disc, and each of "10" and "11" for a reserve.

Since such a sector format is formed, the absolute address (physical sector number PSN) can be discriminated in a reproducing apparatus by reading the data of each sector, and similarly the layer and the area can also be discriminated.

Figure 7:
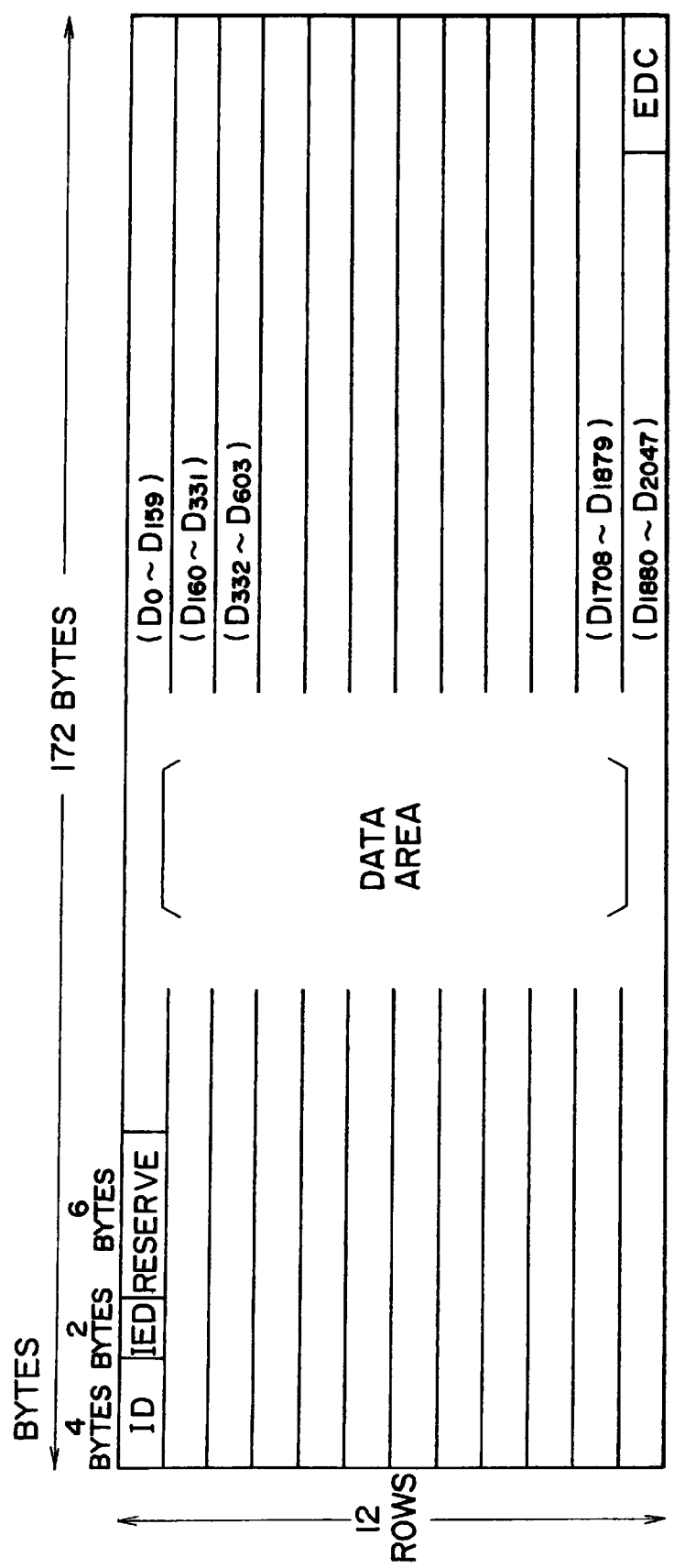
FIG. 7 is an explanatory diagram showing the sector format in the embodiment.

FIG. 7 typically shows a sector of the above structure as a data space which is composed of 172 bytes by 12 rows. Data D0 to D2047 of individual bytes are recorded to constitute a data area of 2048 bytes, wherein, as will be described later, management data such as TOC data and main data such as audio data correspond to the data D0–D2047 in each sector.

In a sector data generating process, first an ID error detection code IED is added to an ID. Subsequently, dummy data of "00h" is added to a reserve area of 6 bytes, and then data constituting a data is are added. Further an error detection code EDC is added to the whole consisting of the ID, the ID error detection code IED, the reserve area and the data area thus generated, whereby one sector is completely constituted.

[3] Lead-in Area (3-A) DVD control data

FIG. 8A shows the structure of a lead-in area.

As shown in FIG. 8A, addresses (physical sector number PSN) of the lead-in area range from a certain lead-in start address "LISTART" to a physical sector number "02FFFFh", where a reference code is recorded in two blocks (1 block=16 sectors) of physical sector numbers "02F00h"–"02FDFFh".

Control data is recorded in 192 blocks of physical sector numbers "02F200h"–"02FDFFh".

Fundamentally in the lead-in area of a DVD, a reference code of 2 blocks and control data of 192 blocks mentioned above are recorded, while all other areas are reserved.

It is to be noted that in FIG. 8A, TOC is shown in 12 blocks of physical sector numbers "02FF00h"–"02FFBFh". Although this TOC is not provided in an ordinary DVD, it is provided in the disc of this embodiment (undermentioned DSD disk) which is based on a DVD physical format.

As shown in FIG. 8B, data of 192 blocks from BK0 to BK191 is recorded as control data of physical sector numbers "02F200h"–"02FDFFh", where the data of each of such 192 blocks from BK0 to BK191 is mutually the same. In other words, control data of one block is recorded 192 times repeatedly.

The control data of 1 block (=16 sectors) is set as shown in FIG. 8C. Supposing that 16 sectors are numbered 0 to 15, physical format information is recorded in the top sector 0, disc manufacture information in the next sector 1, and copyright information in the sectors 2–15, respectively.

The physical format information recorded in the sector 0 is so set as shown in FIG. 8D. As explained with reference to FIG. 6, the data area of 2048 bytes in 1 sector is used for recording the actual data. The 1st byte (=byte 0) of this data area is used for recording a book type/part version, the 2nd byte (=byte 1) for a disc size/minimum lead-out rate, the 3rd byte (byte 2) for a disc structure, and the 4th byte (byte 3) for a recorded density, respectively.

The 5th–16th bytes (bytes 4–15) are used for recording data area allocation. And the 2032 bytes (bytes 16–2047) are reserved.

FIG. 9 is a detailed view of one sector with byte positions and bit positions for physical format information.

First, four bits b4–b7 of byte 0 are used for recording a book type.

The book type serves as a disc identification code based on the DVD physical format. In an ordinary ROM type DVD, bits b4–b7 are "0000".

As will be described later, a DSD disc and a DSD/DVD composite disc different from an ordinary ROM type DVD are presented in this embodiment. And in accordance with this book type, any disc can be identified as a DVD, a DSD disc or a DSD/DVD composite disc.

Therefore, in the case of a DSD disc or a DSD/DVD composite disc, bits b4–b7 take some other values than "0000". In this embodiment, an explanation will be given on an example where bits b4–b7 become "1000" in a DSD disc or "1010" in a DSD/DVD composite disc.

The next four bits b0–b3 of byte 0 signify a part version (version number). Bits b0–b3 become "0001" for version 1.x, 0010 for version 2.x, or "0011" for version 3.x. Any other values thereof indicate a reserve.

Four bits b4–b7 of byte 1 are used for recording a disc size. These bits b4–b7 become "0000" in the case of a 12-cm disc or "0001" in the case of an 8-cm disc. Any other values thereof indicate a reserve.

Four bits b0–b3 of byte 1 are used for recording a minimum lead-out rate. These bits b0–b3 become "0000" for 2.52 Mbps, "0001" for 5.04 Mbps, or "0010" for 10.08 Mbps. Any other values thereof indicate a reserve.

In byte 2 for recording a disc structure, the first two bits b4 and b5 signify the number of a layer or layers. These bits become "00" to represent a single layer disc, or "01" to represent a dual layer disc. Any other values thereof indicate a reserve.

Bit b3 of byte 2 signifies the kind of track path. This bit b3 becomes "0" in a dual layer disc with parallel track paths, or "1" in a dual layer disc with opposite track paths.

Bits b0–b2 of byte 2 signify a layer type. These bits b0–b2 become "000" when the layer (recording layer) is a read only type. Any other values thereof indicate a reserve.

Four bits b4–b7 of byte 3 signify a linear density. These bits b4–b7 indicate 0.267 μm/bit when being "0000" or 0.293 μm/bit when being "0001". Any other values thereof indicate a reserve.

Four bits b0–b3 of byte 3 are used for recording a track density. These bits b0–b3 indicate 0.74 μm/track when being "0000", and any other values thereof indicate a reserve.

Since the information described above is recorded as physical format information, a disc (DVD or undermentioned DSD disc) loaded in a reproducing apparatus can be discriminated with respect to its physical kind and type. For example, discrimination is possible relative to its track paths and single/dual layers to consequently enable proper control of a reproducing operation. And further a DVD, a DSD disc and a DSD/DVD composite disc can be exactly discriminated.

(3-B) DSD-TOC Data (3-B-1) TOC structure

As described, in an undermentioned DSD disc (inclusive of DSD/DVD composite disc) in this embodiment, data of TOC (Table of Contents) is recorded in 12 blocks of physical sector numbers "02FF00h"–"02FFBFh" in the lead-in area. The TOC need not be provided exactly at the above positions, and may be set at some other adequate positions in the lead-in area.

Figure 10:
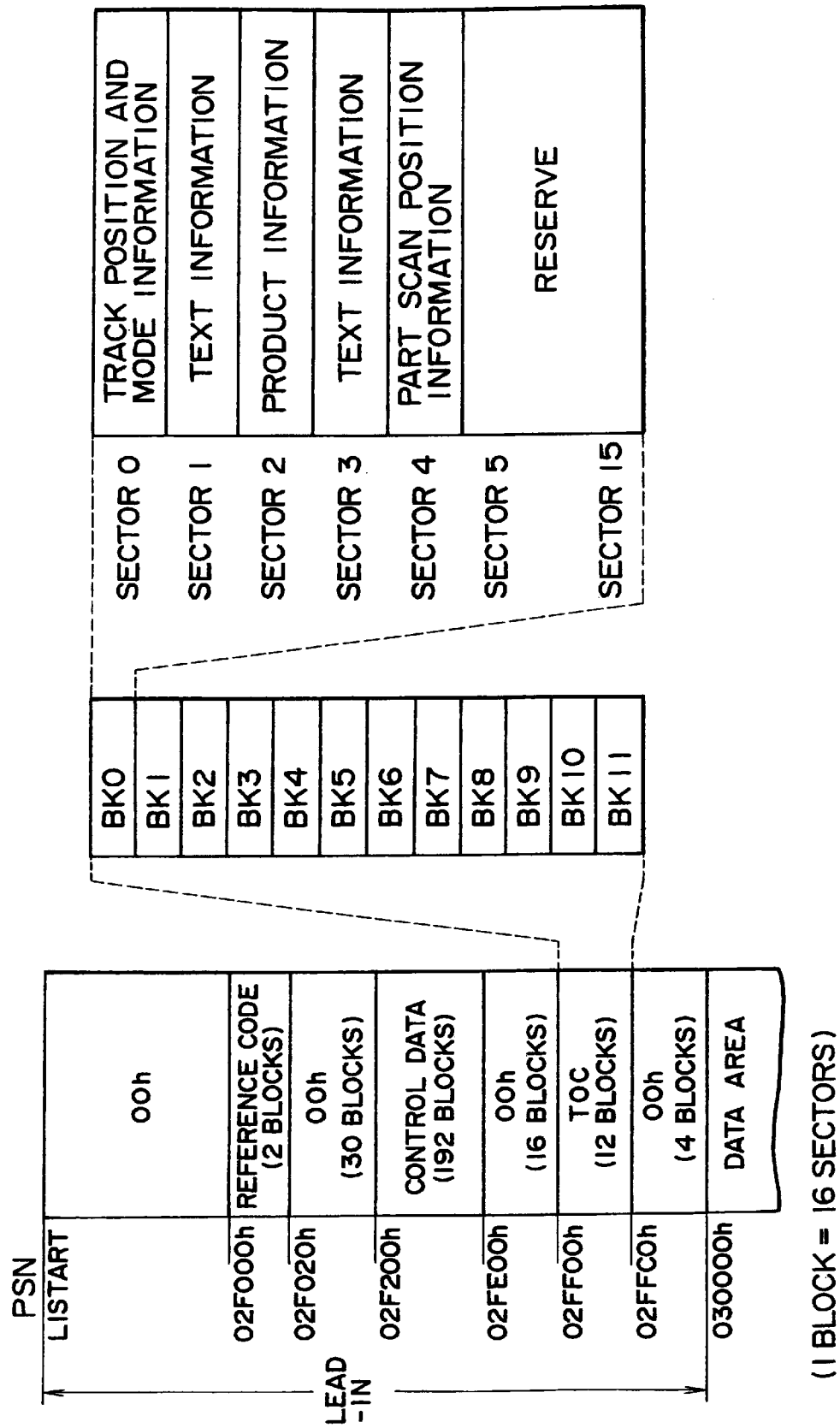
FIGS. 10A to 10C are explanatory diagrams showing TOC in a DSD disc of the embodiment.

As shown in FIGS. 10A and 10B, data of 12 blocks BK0–BK11 is recorded in the TOC, where the data in each of the 12 blocks BK0–BK11 is the same. In other words, the TOC of one block is recorded 12 times repeatedly.

The TOC contents of 1 block (=16 sectors) are so set as shown in FIG. 10C. supposing that 16 sectors are numbered 0 to 15, track position and mode information are recorded in the first sector 0, text information in sector 1, product information in sector 2, text information in sector 3, and part scan position information in sector 4, respectively. Sectors 5 to 15 are reserved.

In a DSD disc (Direct Stream Digital disc) for recording digital audio data principally, such TOC sectors 0–4 are provided, per track (unit of music program or the like as audio data), for managing additional information such as address and text information, product information and so forth. Although a detailed description will be given later, a direct stream digital disc has such TOC in conformity with the DVD physical format, and audio data is recorded in units of tracks as "direct stream digital" data managed by the TOC. Therefore, each data track recorded in the data area of the disc is not formed to be a data file of a directory structure as a DVD, but is managed by the TOC alone independently of the DVD directory.

The contents of the TOC sectors 0 to 4 will be explained in detail below.

(3-B-2) TOC Sector 0

TOC sector 0 is used as an area for track position and mode information. More specifically, this sector relates to each track recorded principally as DSD data, and serves as a management information area which presents the address of each track and the attribute (track mode) thereof.

FIG. 11 shows the format of the data area (see FIG. 6) composed of 2048 bytes in TOC sector 0.

The top 4 bytes in the data area of 2048 bytes are recorded to be "S" "A" "C" "D" as a system ID according to the ASCII code.

Subsequently the first track number (First TNO) is recorded in byte 7, and then the last track number (Last TNO) is recorded in byte 8. The tracks are those of the DSD data.

An extra data start address EDSA is recorded in 3 bytes numbered 9 to 11. The extra data will be described in detail later. In case a DSD disc is substantially equal to a multi-session disc known as CD EXTRA or the like, when an extra data area is formed correspondingly to session 2 in such a multi-session disc, its start point is indicated as an extra data start address EDSA. A physical sector number PSN is recorded as such extra data start address EDSA.

Used sectors are recorded in byte 12. This one byte serves to indicate the TOC sectors used for recording any management information.

In an area of 100 bytes ranging from byte 17, there are recorded table pointers (P-TNO1–P-TNO100) corresponding to the tracks contained.

The table pointers are used for enabling the contained tracks to correspond to an address management table recorded from byte 125, and the actual address and attribute (track mode) of each track are denoted by the address management table (AK1–AK100) formed in units of 8 bytes.

The address management table AK(x) of each unit is composed of a total of 8 bytes which include 3 bytes for a start address SA(x), 1 byte for a track mode TM(x), 3 bytes for an end address EA(x), and 1 undefined byte. A physical sector number PSN is recorded as each of the start address SA(x) and the end address EA(x).

And a total of 100 units of such address management tables (AK1–AK100) are provided correspondingly to the table pointers (P-TNO1–P-TNO100).

The table pointers P-TNO1–P-TNO100 are provided correspondingly to tracks 1 to 100. For example, track 1 contained in the data area is managed by the table pointer P-TNO1 which indicates the address management table AK1 where the address and the track mode relative to track 1 are recorded.

More specifically, when the value recorded as a table pointer P-TNO(x) is "Px", a byte position of the address management table AK(x) corresponding to such value is indicated through a calculation of 29×4+(Px)×8.

For example, when "1" is recorded in the table pointer P-TNO1, a byte position "124" is indicated to signify the position of byte 1 in the start address SA1 at the top of the address management table AK1.

And in the address management table AK1, the top address of track 1 is recorded by a physical sector number PSN as the start address SA1 of 3 bytes, and the attribute of track 1 is recorded as the track mode TM1. Further the end address of track 1 is recorded by a physical sector number PSN as the end address EA1 of 3 bytes.

Similarly to the above, an address management table AK2 consisting of a start address SA2, a track mode TM2 and an end address EA2 are designated by a table pointer P-TNO2 corresponding to track 2. The top address of track 2 is recorded by a physical sector number PSN in the start address SA2, then the attribute of track 2 is recorded as the track mode TM2, and the end address of track 2 is recorded by a physical sector number PSN as the end address EA1.

Thereafter an address and a track mode relative to each of the entire contained tracks are recorded by the use of a relevant table pointer and a relevant address management table similarly to the above.

Any table pointer or address management table corresponding to none of the tracks is recorded as "00h". In a disc containing a total of 10 tracks for example, each byte of the table pointers P-TNO11–P-TNO100 and the address management tables AK11–AK100 is recorded as "00h".

Such address and mode management per track are executed according to the corresponding table pointer P-TNO(x) and the address management table AK(x) (=start address SA(x), track mode TM(x) and end address EA(x)) indicated by the table pointer. Therefore, after the data of TOC sector 0 is read from the disc loaded in a reproducing apparatus for example, an access for reproduction can be performed, relative to the (x)th track, with reference to the start address SA(x) and the end address EA(x). It is also possible, according to the track mode TM(x), to execute required control for reproduction of the (x)th track.

As shown in FIG. 11, 100 units of table pointers P-TNO1–P-TNO100 are prepared, and further 100 units of address management tables (A1–AK100) are prepared, so that a maximum of 100 DSD data tracks (e.g., 100 programs in the case of audio) to be managed by the TOC sector 0 can be contained in a single DVD.

Regarding each of the track modes TM1–TM100 provided in the address management tables (AK1–AK100) respectively, each bit of one byte thereof is allocated to represent a predetermined attribute. For example, each bit is so set as to represent on/off state of copyright protect, type of data, monaural/stereo (2 channels/6 channels), or emphasis information.

(3-B-3) TOC Sector 1

TOC sector 1 is used as a data area for recording track names (program names, etc) correspondingly to the tracks recorded as DSD data, or for recording a disc name (album title, etc.) corresponding to the disc itself.

FIG. 12 shows the format of the data area (see FIG. 6) composed of 2048 bytes in TOC sector 1.

The top 4 bytes in the data area of 2048 bytes are recorded to be "S" "A" "C" "D" as a system ID according to the ASCII code.

In the TOC sector 1, slot pointers P-TNA1–P-TNA100 are prepared correspondingly to the contained tracks a maximum of 100 tracks), and character slots to be designated by the slot pointers P-TNA1–P-TNA100 respectively are provided in and after byte 121 (rows 29–511 in FIG. 12).

And character data is managed substantially in the same manner as in the TOC sector 0 mentioned above.

In the character slots, character information including a disc name and track names is recorded according to the ASCII code for example. The top 8 bytes of the character slot are used as an exclusive area for a disc name. Any other bytes may be used for either a disc name or track names.

A track name corresponding to the (x)th track is recorded at a byte position in the character slot designated by a slot pointer P-TNA(x). For example, a track name corresponding to track 1 is recorded at the byte position designated by the slot pointer P-TNA1.

Supposing that the value recorded as a slot pointer P-TNA (x) is "Px", the byte position of the slot, where corresponding character information is recorded, is indicated through a calculation of 29×4+(Px)×8.

Such text data management per track is executed according to the corresponding slot pointer P-TNO(x) and the slot (byte position) indicated by the slot pointer. Therefore, after the data of TOC sector 1 is read from the disc loaded in a reproducing apparatus for example, it is possible, relative to any (x)th track, to execute required control for displaying a track name such as a program title or a disc name to the user.

(3-B-4) TOC Sector 2

TOC sector 2 formed to be a product information region is used as a data area for recording copyright information correspondingly to the tracks recorded as DSD data.

FIG. 13 shows the format of the data area (see FIG. 6) composed of 2048 bytes in TOC sector 2. The top 4 bytes in this data area are recorded to be "S" "A" "C" "D" as a system ID according to the ASCII code.

In TOC sector 2, slot pointers P-TCD1–P-TCD100 are prepared correspondingly to the contained tracks a maximum of 100 tracks), and copyright data slots ISRC1–ISRC100 in units of 100 to be designated by the slot pointers P-TCD1–P-TCD100 respectively are provided in and after byte 129 (rows 31–230 in FIG. 13).

And the copyright information is managed substantially in the same manner as in the aforementioned TOC sector 0.

Each of the copyright data slots ISRC1–ISRC100 is composed of 8 bytes. In the copyright data slots ISRC1–ISRC100, copyright codes are recorded correspondingly to the tracks contained therein. More specifically, data of country, rightful organization, copyright registration year, registration number and so forth are coded and recorded in these slots.

The copyright code corresponding to track 1 is recorded at the byte position of a copyright data slot ISRC(x) designated by a slot pointer P-TCD(x). For example, the copyright code corresponding to track 1 is recorded at the byte position of the copyright data slot ISRC1 designated by the slot pointer P-TCD1.

Supposing that the value recorded as a slot pointer P-TCD (x) is "Px", the byte position of the corresponding copyright data slot ISRC(X) is indicated through a calculation of 29×4+(Px)×8.

The 8 bytes ranging from byte 121 to byte 128 (rows 29 and 30 in FIG. 13) are allocated for recording a catalog number CN.

Such copyright management per track is executed according to the corresponding slot pointer P-TCD(x) and the copyright data slot ISRC(x) indicated by the slot pointer. Therefore, when the data of TOC sector 2 is read from the disc loaded in a reproducing apparatus for example, it becomes possible to perform a reproducing operation and so forth conforming with the copyright per track, and further to utilize such data for management and restriction of digital copying of the track data to some other recordable disc or the like.

Although there are some CDs (compact discs) where copyright information has already been recorded, such copyright information is recorded merely as subcode Q data per track, so that it is necessary to reproduce the top portion of every track for reading out the copyright information relative to all the tracks. However, according to this embodiment so contrived as to manage the copyright information by the TOC, the copyright information of each track can be properly obtained only with an operation of reading out the TOC in the reproducing apparatus.

(3-B-5) TOC Sector 3

TOC sector 3 formed to be a text information area is used as a data area for recording, as in the aforementioned TOC sector 1, track names correspondingly to the tracks recorded as DSD data and also for recording a disc name.

FIG. 14 shows the format of the data area composed of 2048 bytes in TOC sector 3. Similarly to the foregoing TOC sector 1, the top 4 bytes in the data area are recorded to be "S" "A" "C" "D" as a system ID according to the ASCII code, and slot pointers P-TNA1–P-TNA100 are prepared, and also character slots to be designated by the slot pointers P-TNA1–P-TNA100 respectively are provided in and after byte 121 (rows 29–511 in FIG. 14). Further a track name corresponding to the (x)th track is recorded at the byte position of the character slot designated by the slot pointer P-TNA(x), as in the TOC sector 1. The top 8 bytes of the character slot are used as an exclusive area for a disc name.

In this manner, TOC sector 3 is used for managing the character information per track similarly to the TOC sector 1. In particular, TOC sector 3 serves as an area for recording code data which corresponds to special characters such as kanji or European characters. For this reason, the attributes of characters used as character code (Char code) are recorded in byte 16 as data signifying the kind of special characters.

(3-B-6) TOC Sector 4

TOC sector 4 is formed as an area for recording part scan position information. Part scan signifies an operation to reproduce merely part of a program or the like (e.g., introduction, motif or theme), i.e., to reproduce only the motif part of a program as a specific track, or to reproduce only the introductions of programs successively in the order of tracks.

In order to perform the above operation, it is preferred that a certain portion of each track corresponding to, e.g., the main motif be selected for part scan in advance, and that a start address and an end address relative to such a selected portion be managed.

Management of addresses relative to any selected portions of tracks is executed by TOC sector 4.

FIG. 15 shows the format of the data area (see FIG. 6) composed of 2048 bytes in TOC sector 4. The top 4 bytes in this sector also are recorded to be "S" "A" "C" "D" as a system ID according to the ASCII code. Subsequently, as in TOC sector 0, the first track number (First TNO) is recorded in byte 7, and then the last track number (Last TNO) is recorded in byte 8.

In an area of 100 bytes ranging from byte 17, there are recorded table pointers (P-TNO1–P-TNO100) which correspond to the tracks contained. And scan address management tables (SAK1–SAK100) corresponding to the table pointers (P-TNO1–P-TNO100) are prepared. In each of the address management tables (SAK1–SAK100), one unit is composed of a total of 8 bytes including 3 bytes for a scan start address SSA(x), 1 byte for a track mode TM(x), 3 bytes for a scan end address SEA(x), and 1 undefined byte. A physical sector number PSN is recorded as each of the scan start address SSA(x) and the scan end address SEA(x).

The scan address management tables (SAK1–SAK100) are designated respectively by the table pointers (P-TNO1–P-TNO100) in the same relationship as that between the address management tables (AK1–AK100) and the table pointers (P-TNO1–P-TNO100) in the aforementioned TOC sector 0. Supposing that the value recorded as a table pointer P-TNO(x) is "Px", the byte position of the corresponding scan address management table SAK(x) is indicated through a calculation of 29×4+(Px)×8.

The table pointers P-TNO1–P-TNO100 correspond respectively to tracks 1 to 100. And the track 1 contained in the data area is managed by the table pointer P-TNO1 which indicates the scan address management table SAK1 where the scan address relative to the track 1 is recorded.

For example, a byte position "124" is designated if "1" is recorded in the table pointer P-TNO1. This indicates the byte position of the first byte in the top scan start address SSA1 of the scan address management table SAK1.

In the scan address management table SAK1, an address corresponding to the start position of a specific portion such as a motif of track 1 is recorded by a physical sector number PSN as a 3-byte scan start address SSA1, and the attribute of track 1 (or attribute of merely one portion indicated by a scan address) is recorded as a track mode TM1. Further, an address corresponding to the end position of the specific portion in track 1 is recorded by a physical sector number PSN as a 3-byte scan end address SEA1.

Similarly, the address management table SAK2 consisting of a scan start address SSA2, a track mode TM2 and a scan end address SEA2 are designated by a table pointer P-TNO2 corresponding to track 2, whereby the address position of any specific portion such as a motif preset relative to track 2 is managed. Thereafter the addresses of only the specific portions of the tracks are recorded by using the table pointers and the scan address management tables similarly to the above with regard to the entire tracks contained.

Any table pointer or address management table corresponding to none of the tracks is recorded as "00h". In a disc containing a total of 10 tracks for example, each byte of the table pointers P-TNO11–P-TNO100 and the scan address management tables SAK11–SAK100 are recorded as "00h". Such scan address need not exactly be set for every track, and a scan address specifying a portion of a motif or the like may be managed with regard to only a partial one of all the tracks contained.

Such scan address management per track is executed according to the corresponding table pointer P-TNO(x) and the scan address management table SAK(x) indicated by the table pointer. Therefore, after the data of TOC sector 4 is read from the disc loaded in a reproducing apparatus for example, an operation to reproduce a portion of any desired (x)th track such as a motif, an introduction or the like can be performed easily on the basis of the scan address set by the disc maker and recorded in the TOC sector 4. And it is further possible to perform a controlled operation for reproducing only introductions of desired tracks successively.

[4] DSD

In a DSD disc, the TOC mentioned above is formed in its lead-in area. However, the provision of such TOC is merely in the DSD disc of this embodiment, and no TOC is provided in an ordinary DVD.

In a DSD (Direct Stream Digital) disc, as will be described below, there are formed tracks as DSD data. For explanation, discs are classified into (1) DVD, (2) DSD disc, (3) DSD/DVD composite disc, and (4) DSD/CDEX composite disc. And in this specification, the above discs are defined as follows.

(1) DVD: An ordinary DVD having the aforementioned DVD physical format, the volume space construction of FIG. 3 and the directory structure of FIG. 4.

(2) DSD disc: A disc including the above-described TOC in conformity with the DVD physical format and containing tracks where entire actual data recorded in its data area is formed into DSD data.

(3) DSD/DVD composite disc: A disc including the TOC in conformity with the DVD physical format and containing tracks where actual data recorded in its data area is formed into DSD data. This disc further has a recording area for ordinary DVD data in the directory structure of FIG. 4.

(4) DSD/CDEX composite disc: Relative to (2) DSD disc or (3) DSD/DVD composite disc described above, this disc is so contrived that the data area managed by the TOC is divided substantially in the same manner as multi-sessions, so that a track area of DSD data and a CD-ROM data area are formed.

The discs represented by the embodiments of the present invention are concerned with (2) DSD disc, (3) DSD/DVD composite disc, and (4) DSD/CDEX composite disc, which will now be explained below in this order.

(4-A) DSD Disc

First an explanation will be given on the DSD disc.

The DSD (Direct Stream Digital) disc according to this embodiment contains high-speed 1-bit digital audio data (Direct Stream Digital data: DSD data) recorded through $\Delta\Sigma$ modulation.

In this embodiment, as will be described later in connection with DSD sectors, main data used as "DSD data" is composed of high-speed 1-bit "digital audio" data obtained through $\Delta\Sigma$ modulation, and further various data not limited to such digital audio data can also be included as subcode data. It is a matter of course that the main data is not limited to "digital audio" data alone.

The notation of "DSD data" in this specification connotes both main data and sub data.

FIG. 16A shows an image of recording and reproducing DSD data; FIG. 16B shows, for comparison, an image of recording and reproducing ordinary DVD data; and FIG. 16C shows an image of recording and reproducing data in a CD-DA over-sampling method. Each block in these diagrams represents a process.

In the CD-DA, over-sampling shown in FIG. 16C is carried out to realize enhancement of the tone quality. According to this method, an analog audio signal Asig is processed through a $\Delta\Sigma$ modulator and 1-bit A/D converter 11 to be thereby converted into 1-bit digital audio data of a sampling frequency nfs. In this example, fs is 44.1 kHz, and nfs is a very high frequency such as 64 fs for example, whereby the tone quality can be enhanced.

However, since 16-bit digital audio data of a sampling frequency fs is handled in the CD-DA, the data is first processed through a decimation filter 12 to be turned into multi-bit data of a lower fs, and after conversion into 16-bit data of a sampling frequency fs, the data is processed through EFM/CIRC and so forth via an encoder 13 and then is recorded on a disc 14.

At the time of reproduction, the data is read out from the disc 14 and then is decoded in a decoder 15 to be thereby converted into 16-bit digital audio data of a sampling frequency fs. The data thus obtained is processed through an interpolation filter 16 and is over-sampled to become 1-bit digital audio data of a sampling frequency nfs. And subsequently the data is processed through a $\Delta\Sigma$ modulator and 1-bit D/A converter 17, whereby the original analog audio signal Asig is reproduced.

In the CD-DA that adopts such a over-sampling method, desired enhancement of the tone quality can be realized to a certain degree due to the nfs/1-bit data conversion, but generation of some calculation errors is unavoidable in the digital filtering executed by the decimation filter 12 and the interpolation filter 16.

In the case of a DVD, as shown in FIG. 16B, an analog audio signal Asig is processed through an A/D converter 6 at a high sampling frequency of, e.g., 48 kHz or 96 kHz and with at least 16 bits for quantization, such as 16 bits/20 bits/24 bits. And the data processed through an encoder 7 according to the MPEG2 system is recorded on a disc 8.

And at the time of reproduction, the data read out from the disc 8 and processed through a decoder 9 according to the MPEG2 system is processed through a D/A converter 10 in conformity with the sampling frequency and the number of quantization bits in the recording mode, whereby the original analog audio signal Asig is reproduced.

In the case of a DSD disc in this embodiment, the analog audio signal Asig is processed through a $\Delta\Sigma$ modulator and 1-bit A/D converter 1, as shown in FIG. 16A.

In this stage, three modes are prepared with regard to the sampling frequency, such as 32 fs, 64 fs and 128 fs.

Regarding the number of audio data channels, there are prepared two modes, i.e., 2-channel mode and 6-channel mode, as will be described in detail later.

For example, 64 fs/1 bit digital audio data is processed by the encoder 2 directly without being processed through down-sampling or multi-bit conversion, and the encoded data is recorded on a disc 3. In the encoding stage, sub-code data related or unrelated to the audio data is also added.

At the time of reproduction, the data is read out from the disc 3 and then is processed by a decoder 4 to become, e.g., 64 fs/1 bit digital audio data (and sub-code data). Subsequently, such digital audio data is processed through a ΔΣ modulator and 1-bit A/D converter 5, whereby the original analog audio signal Asig is reproduced.

In this DSD system, the tone quality can be enhanced at a very high sampling frequency, and there is caused no deterioration of the tone quality as no filtering process is existent unlike in the CD-DA, so that more remarkable enhancement of the tone quality can be realized than in the prior art.

Further, since this DSD system is not based on the MPEG2 that handles both audio and video data compositely, it is adequate particularly for recording and reproduction of audio data alone.

Figure 17:
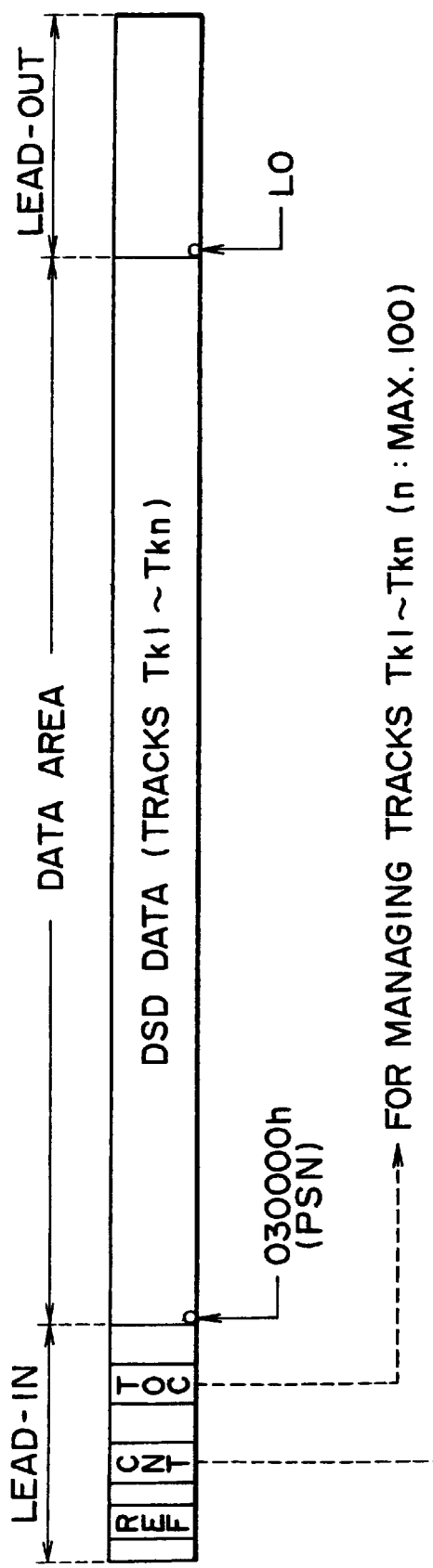
FIG. 17 is an explanatory diagram showing a DSD disc with a single layer in the embodiment.

FIGS. 17, 18A and 18B show the structures of DSD discs where DSD data is recorded in the image mentioned.

FIG. 17 shows an example of a single layer disc.

First, as control data CNT recorded in its lead-in area, a book type (see FIGS. 8A–8C and 9) in physical format information is set to "1000" which denotes a DSD disc. Further, TOC is formed in the lead-in area.

In the data area ranging from a physical sector number "030000h" to a position (LO−1) immediately before a lead-out area, tracks TK1–TKn are recorded as DSD data. As obvious from the method of management in the TOC sectors, it is possible to record a maximum of 100 tracks.

FIGS. 18A and 18B show exemplary dual layer discs, in which FIG. 18A represents a disc with parallel track paths, and FIG. 18B represents another disc with opposite track paths.

In the disc of FIG. 18A with parallel track paths, a layer 0 and a layer 1 are formed independently of each other. More specifically, in the layer 0, a book type in control data CNT recorded in its lead-in area is set to "1000" which denotes a DSD disc, and further TOC is formed in the lead-in area. And tracks TK1–TKn composed of DSD data to be managed by the TOC are recorded in the data area of the layer 0.

Similarly in the layer 1 also, a book type in control data CNT recorded in its lead-in area is set to "1000" which denotes a DSD disc, and further TOC is formed in the lead-in area. And tracks TK1–Tkn composed of DSD data to be managed by the TOC are recorded in the data area of the layer 1. In each of the layers, a maximum of 100 tracks are recordable.

In the disc of FIG. 18B with opposite track paths, a layer 0 and a layer 1 are regarded as one continuous layer via a middle area.

And in a lead-in area of the layer 0 in the innermost portion of the disc, a book type included in control data CNT is set to "1000" which denotes a DSD disc, and further TOC is formed in the lead-in area. And tracks TK1–TKx composed of DSD data to be managed by the TOC are recorded in the data area of the layer 0. Furthermore, tracks from TKx+1 to TKn are recorded in the data area of the layer 1.

The number of recordable tracks is a maximum of 100.

DSD discs may be classified into the three kinds mentioned above. And in a reproducing apparatus loaded with any of such discs, tracks TK1–TKn can be reproduced by first recognizing the existence of the TOC in response to the book type "1000" included in the control data CNT and then reading the TOC.

Further, characters corresponding to any reproduced track can be displayed by using the text information in the TOC sectors 1 and 3, and a part scanning operation for each track is rendered possible by the use of the scan address in the TOC sector 4.

(4-B) DSD Data (4-B-1) DSD data sector

In this embodiment, main data in DSD data will be explained as digital audio data, but it is a matter of course that video data or computer data can be recorded as main data in DSD data.

Figure 19:
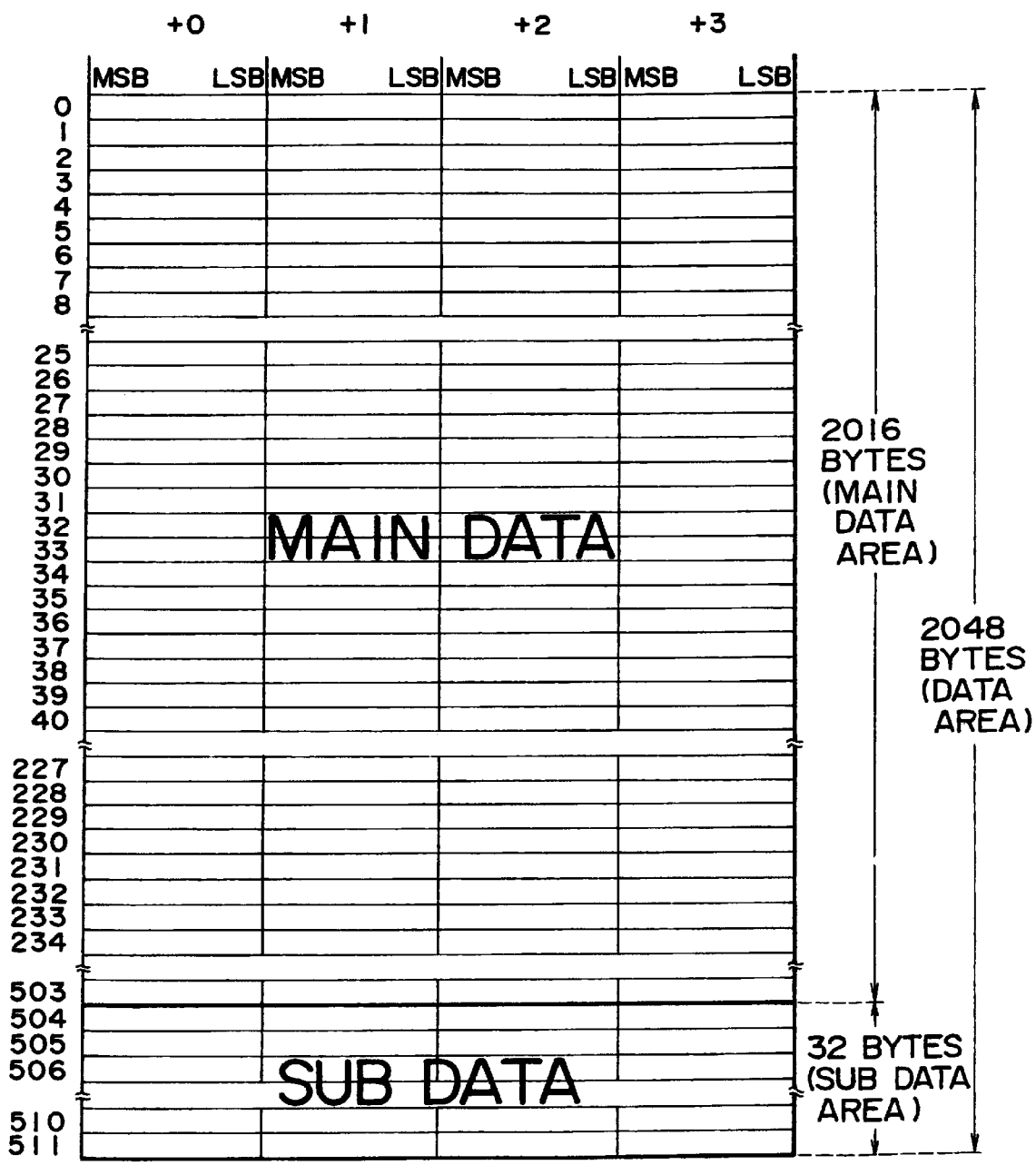
FIG. 19 is an explanatory diagram showing a data sector in the DSD disc of the embodiment.

FIG. 19 shows a data area (2048 bytes) in a sector where DSD data is recorded in conformity to the sector format in the DVD system.

In a sector (hereinafter referred to as data sector) for recording DSD data, 2016 bytes constitute a main data area, where DSD data including actual audio data and so forth are recorded. And the remaining 32 bytes constitute a sub data area where subcode data can be recorded. Subcode data may be information related to the main data, such as time information required when reproducing audio data and so forth recorded in the main data area, or may be graphic information related or unrelated to the main data, or application data such as MIDI data.

To the 2048 bytes constituting the main data area and the sub data area, there are added an ID of 4 bytes, an ID error detection code IED of 2 bytes, dummy data (reserve) of 6 bytes, and an error detection code EDC of 4 bytes. And the DSD data recorded in the main data area is scrambled in a predetermined manner, so that a data sector of 2064 bytes is constituted in the sector format of FIG. 6.

ECC (PO (208, 192, 17), PI (182, 172, 11)) is added to each unit composed of 16 data sectors, whereby an ECC block is constituted. The PO code is interleaved per column and is disposed in the last column of each sector, so that 16 recording sectors are formed. Further a sync code is added thereto and, after EFM plus modulation, the data is recorded in units of 16 physical sectors on a disc.

(4-B-2) 2-ch Audio DSD Data Sector

FIG. 20 shows a format of a data sector where the main data in the DSD data is 2-channel digital audio data. In FIG. 20, a main data area of only 2016 bytes is shown out of the entire data area of 2048 bytes in the data sector.

The audio data of left (L) and right (R) channels is grouped in units of 8 bits in each channel. And data of 1008 bytes in the individual channels is recorded alternately in the order of L0, R0, L1, R1, . . . , L1007, R1007 as shown.

As described above, 32 bytes out of 2048 bytes in the data area are allocated to subcode data. In such 2-channel mode, the data transfer rate is 11200 bytes/second which is higher than the known subcode transfer rate of 7200 bytes/second adopted in the current CD-DA.

Consequently, in the DSD, there is realized a possibility that the function with subcode data can be fulfilled more properly than in the CD-DA.

Since 2-channel data is completed per sector, 1 second corresponds to 350 sectors. Therefore, in skipping per sector during a reproducing operation, a skip with a precision of 1/350 second is rendered possible, so that a higher precision is attainable in comparison with the known skip precision of 1 second=75 frames in the current CD-DA.

(4-B-3) 6-ch Audio DSD Data Sector

FIG. 21 shows a format of a data sector where the main data in the DSD data is 6-channel digital audio data. In FIG. 21, a main data area of only 2016 bytes is shown out of the entire data area of 2048 bytes in the data sector.

Figure 24:
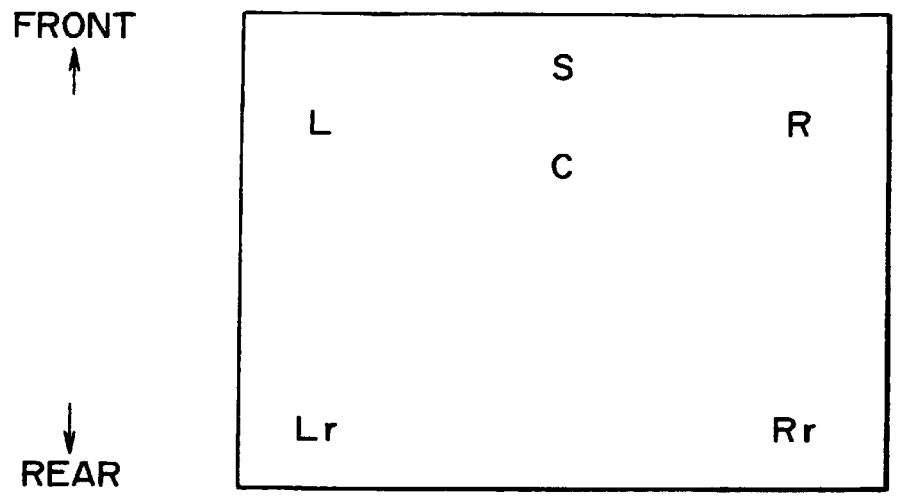
FIG. 24 is an explanatory diagram showing 6-channel audio.

The audio data of 6 channels is so arranged as illustrated in FIG. 24 where, in addition to L and R channels, an S channel and a C channel are disposed at front center positions, and further an Lr (L rear) channel and an Rr (R rear) channel are disposed at rear positions.

The audio data of such L, R, C, S. Lr and Rr channels are grouped in units of 8 bits in each channel. And data of 336 bytes in the individual channels is recorded, as shown, in the order of L0, R0, C0, S0, Lr0, Rr0, L1, R1, C1, S1, Lr1, Rr1, . . . , L335, R335, C335, S335, Lr335, Rr335.

As shown in FIG. 19, 32 bytes out of 2048 bytes in the data area are allocated to subcode data. In such 6-channel mode, the data transfer rate is 16800 bytes/second which is higher than the known subcode transfer rate of 7200 bytes/second adopted in the current CD-DA.

Consequently, in the DSD disc, there is realized a possibility that the function with subcode data in both 2-channel and 6-channel modes can be fulfilled more properly than in the CD-DA. It is of course possible to generate time code and so forth by the use of subcode data.

Since 6-channel data also is completed per sector, 1 second corresponds to 525 sectors. Therefore, in skipping per sector during a reproducing operation, a skip with a precision of 1/525 second is rendered possible, so that a higher precision is attainable in comparison with the known skip precision of 1 second=75 frames in the current CD-DA.

(4-C) DSD Disc Reproducing Apparatus

FIG. 22 shows the structure of a reproducing apparatus adapted for a DSD disc.

A DSD disc 90, where DSD data is recorded, is loaded in the reproducing apparatus in a manner to be driven and rotated by a spindle motor 31. And the DSD disc 90 is irradiated with a laser beam emitted from an optical head 32 at a reproduction time.

The optical head 32 detects the reflected beam of its laser output from the disc 90. For this purpose, the optical head 3 is equipped with a laser diode as a laser output means, an optical system consisting of a polarized beam splitter and an objective lens, and a detector for detecting the reflected beam. The objective lens 32a is held by a dual axis mechanism 33 in a manner to be displaceable in the radial direction of the disc and also in the directions toward or away from the disc.

The whole optical head 32 is shiftable by a slide mechanism 34 in the radial direction of the disc.

The reflected beam information detected from the DSD disc 90 by the optical head 32 in the reproducing operation is converted into an electric signal, which is then supplied to an RF amplifier 35. Subsequently the RF amplifier 35 calculates the information supplied thereto and extracts a reproduced RF signal, a tracking error signal, a focus error signal and so forth.

The reproduced RF signal thus extracted is supplied to a DSD decoder 38. Meanwhile the tracking error signal and the focus error signal are supplied to a servo circuit 36.

The servo circuit 36 consists of a servo driving signal generator and a servo driver for executing a servo action in accordance with a servo driving signal outputted from the servo driving signal generator. Then the servo driving signal generator generates focus and tracking servo driving signals from the tracking error signal and the focus error signal supplied thereto, and also from a track jump command and an access command obtained from a system controller 41 which consists of a microcomputer. The servo driver supplies power to a focus coil and a tracking coil of the dual axis mechanism 33 in accordance with the focus servo driving signal and the tracking servo driving signal.

The servo driving signal generator generates also a slide servo driving signal, and in response to this signal, the servo driver supplies driving power to a slide motor of the slide mechanism 34. Further the servo driving signal generator generates a CLV servo driving signal which controls the spindle motor 2 at a constant linear velocity (CLV) in accordance with rotation velocity detection information and so forth relative to the spindle motor 2, and the servo driver supplies driving power to the spindle motor 31 in response to the CLV servo driving signal.

The reproduced RF signal is processed in a DSD decoder 38 which executes predetermined demodulation such as binary coding, EFM plus demodulation and error correction decoding, so that the RF signal is decoded into the form of DSD data. More specifically, the main data is formed into high-speed 1-bit data of a predetermined sampling frequency (64 fs/32 fs/128 fs) as 2-channel or 6-channel audio data. The subcode data is also decoded simultaneously. Then the decoded subcode data is supplied to the system controller 41 to be used for various control actions and an output operation.

The 2-channel or 6-channel audio data, which is main data in the DSD data, is supplied to a digital audio processor 39 where a required process is executed, and then such audio data is supplied to a 1-bit D/A converter 40 to be processed through $\Delta\Sigma$ modulation/1-bit D/A conversion to become a 2-channel or 6-channel analog audio signal. Thereafter this signal is amplified in an audio amplifier 42 and then is delivered (AUout) to audio output circuits inclusive of speakers, amplifiers and so forth.

The output audio signal AUout thus reproduced from the DSD disc is demodulated from the digital data where superior tone quality is realized due to a very high sampling frequency of 64 fs for example, and none of the filtering process for down-sampling or over-sampling is existent to consequently achieve remarkably high tone quality without causing any deterioration thereof.

The reproduced RF signal obtained from the RF amplifier 35 is supplied also to a management information decoder 37. Although this management information decoder 37 is formed integrally with the DSD decoder 38 in many cases, it is described here as a separate circuit block for the convenience of explanation.

The management information decoder 37 is a stage for decoding the management information read out from the disc 90, i.e., for decoding the control data in the lead-in area or the TOC data and supplying the decoded data to the system controller 41.

The system controller 41 consisting of a microcomputer executes overall control of the whole reproducing apparatus, and it is necessary, for control of reproducing the disc 90, to previously read in various management information recorded on the disc 90.

For this purpose, the system controller 41 is so contrived that the management information including the control data and the TOC data is read out from the disc 90 with execution of an operation to reproduce the lead-in area when the disc 90 is loaded in the apparatus, and the management information thus read out is stored in an internal memory so that such information can be referred in the subsequent reproduction of the disc 1.

As for the process regarding the DSD disc 90 which is one form of the DVD, the system controller 41 first makes a decision, on the basis of the book type in the control data, as to whether the loaded disc is a DSD disc or not. And if the result of such decision signifies a DSD disc, the system controller 41 reads in the TOC recorded at a predetermined position in the lead-in area, and then the TOC data is stored for management of the reproduction.

For reproducing the disc, the address of each track can be grasped according to the aforementioned TOC sector 0, and also a partial address of the track such as its introduction or motif can be grasped by acquiring the data of the TOC sector 4, whereby a part scanning operation for reproducing only a portion of the desired track can be performed.

A manipulator 53 is equipped with various keys to be manipulated by the user. For example, such keys include a play key, a stop key, an AMS key, a cue key, a review key and a special play key. Information of each manipulation is supplied to the system controller 41.

A display unit 52 consists of a liquid crystal display or the like and serves to display thereon an operation state, a track number and time information under control of the system controller 41.

Since the information of track name and disc name is recorded in the TOC sector 1 and sector 3 as described, the system controller 41 is capable of executing proper control to display the track name on the display unit 52 in conformity to the track being reproduced.

When any data of characters or graphics is added to be used as subcode data for display, the system controller 41 is capable of controlling the display unit 52 on the basis of the subcode data extracted by the DSD decoder 38. It is of course possible in the reproducing apparatus to perform further various operations and control actions if the apparatus is so constituted as to comply with the format and use of the subcode data.

Moreover, since the copyright information relative to each track can be obtained from the aforementioned TOC sector 2, the system controller 41 is enabled to execute a proper control action (e.g., to inhibit reproduction of any specified track) in accordance with the copyright information when the TOC has been read out.

The structure of this reproducing apparatus shown in the diagram is based on an assumption that audio data is recorded on the DSD disc. However, in case video data is recorded on the DSD disc, it is a matter of course that the apparatus is equipped with a video processor for the data extracted by the DSD decoder 38, a 1-bit D/A converter for the video data, and a video amplifier in an output stage.

Figure 23A:
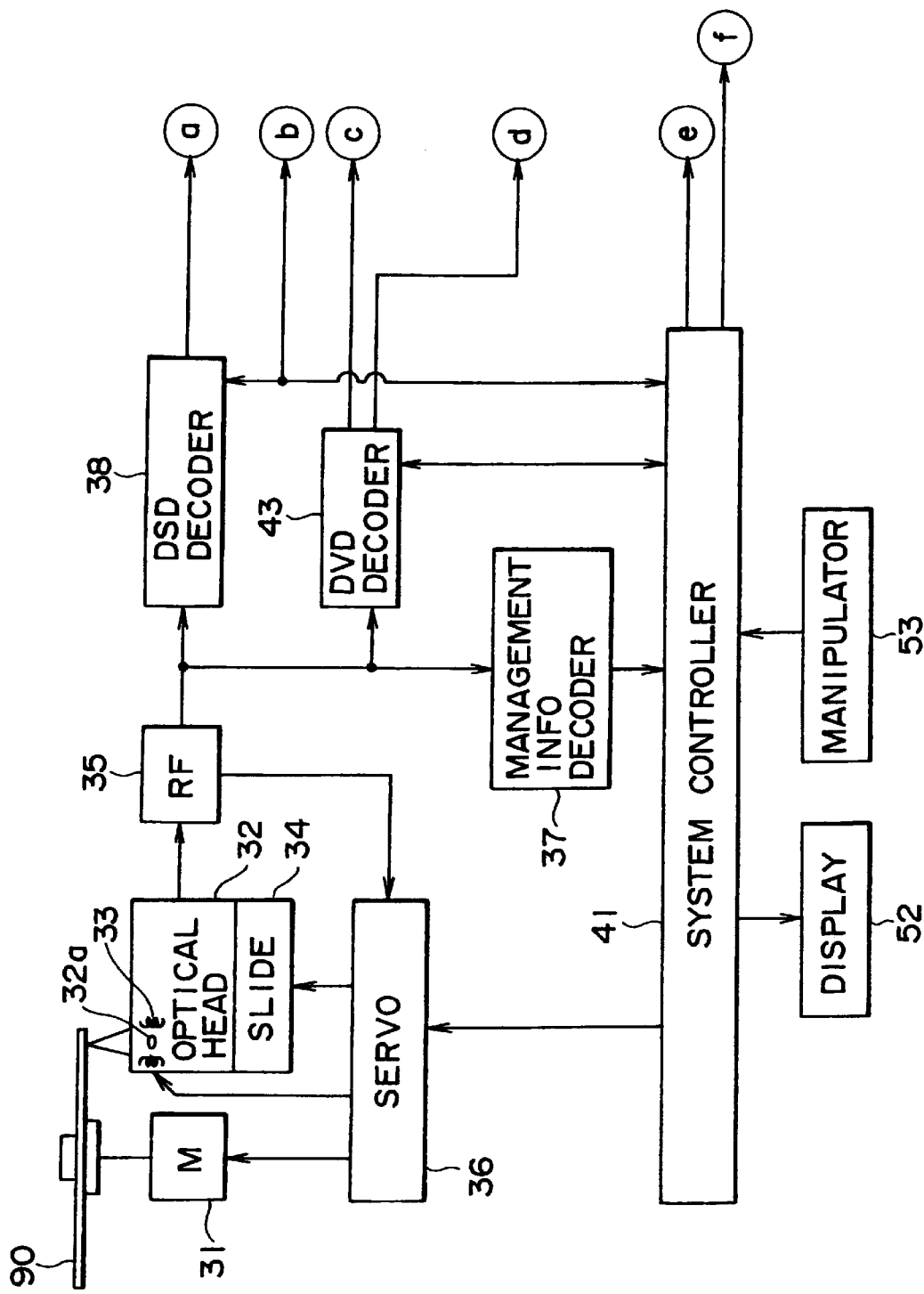

The reproducing apparatus of FIG. 22 described above is designed merely for a DSD disc. FIG. 23 shows another reproducing apparatus which is adapted for an ordinary DVD as well.

In this diagram, any function blocks corresponding to those employed in FIG. 22 are denoted by like reference numerals, and a repeated explanation thereof is omitted.

In the apparatus of FIG. 23, a reproducible disc 90 is a DVD or DSD disc. And in addition to the same function blocks as those in FIG. 22 employed for a DSD disc, there are provided a DVD decoder 43, an audio processor 44, a D/A converter 45, a video processor 46 and a D/A converter 47 so as to be adapted for an ordinary DVD. And a selector 48 is provided for selectively switching the components to a DVD or a DSD disc. Further a video amplifier 49 is provided for outputting a DVD video signal.

Upon completion of loading a disc 90, the system controller 41 first acquires the necessary data by execution of reading out the control data in the lead-in area and, on the basis of the book type, makes a decision as to whether the loaded disc is a DSD disc or an ordinary disc (or a DSD/DVD composite disc which will be described later).

When the loaded disc 90 is a DSD disc, the system controller 41 reads the TOC from the lead-in area and instructs execution of reproducing the disc in accordance with the TOC data. Subsequently the reproduced audio signal is demodulated by the operation of the digital audio processor 39 and the 1-bit D/A converter 40. At this time, the system controller 41 controls the selector 48 to supply the output of the 1-bit D/A converter 40 to the audio amplifier 42.

When the loaded disc 90 is a DVD, the system controller 41 controls the reproduction in conformity to the management format of FIGS. 3 and 4. Regarding the information (reproduced RF signal) read out from the disc, a decoding process based on the MPEG2 is executed in the DVD decoder 43, and then the audio data is supplied to the audio processor 44, while the video data is supplied to the video processor 46.

The data processed in the audio processor 44 and the video processor 46 is converted into an analog audio signal and an analog video signal respectively in the D/A converters 45 and 47 where predetermined sampling frequencies and predetermined numbers of quantization bits are set.

At this time, the system controller 41 controls the selector 48 for supplying the output of the D/A converter 45 to the audio amplifier 42 and supplying the output of the D/A converter 47 to the video amplifier 49. In this manner, a DVD is also rendered reproducible.

(4-D) 6-ch Data Recording/Reproduction

As described, a DSD disc is adapted for 6-channel audio data as well as for 2-channel audio data.

Hereinafter an explanation will be given on a recording format relative to 6-channel audio data, reproduction of such 6-channel audio data in a 6-channel mode, and reproduction of 6-channel audio data in a 2-channel mode.

Figure 25:
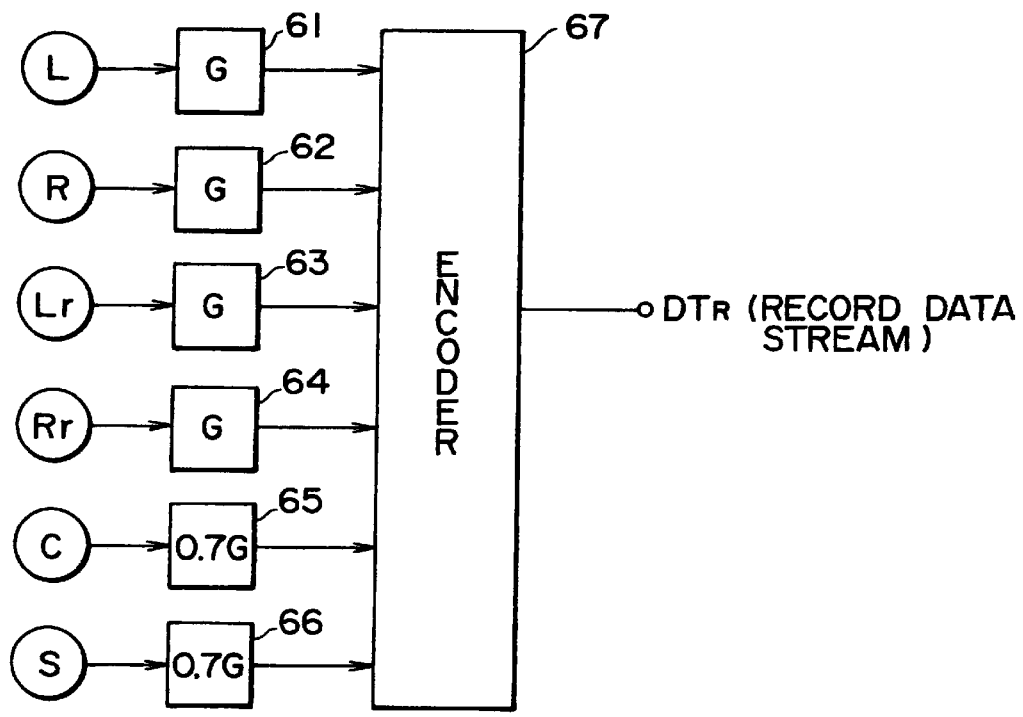
FIG. 25 is an explanatory diagram showing how 6-channel data is recorded in the embodiment.

As mentioned above, six channels correspond to such sound fields as illustrated in FIG. 24. In the DSD disc according to this embodiment, when the data of such 6 channels L, R, S, C, Lr and Rr are recorded in the sector format of FIG. 21, the data is processed in the manner shown in FIG. 25.

More specifically, when a certain gain G is given to the data of channels L, R, Lr and Rr by amplifiers 61, 62, 63 and 64 respectively, the gain given to the data of two channels S and C by amplifiers 65 and 66 is set to "0.7G". In this manner, the gain for the two channels S and C is reduced to 0.7 times as compared with the gain for any other channel, and the data is sector-encoded in an encoder 67 to become data of FIG. 21. And further the aforementioned various processes are executed to form a recorded data stream DTR.

Thus, on the DSD disc, the data is recorded in a state where the gain for merely two channels S and C is set to 0.7 times in comparison with any other channel.

Figure 26A:
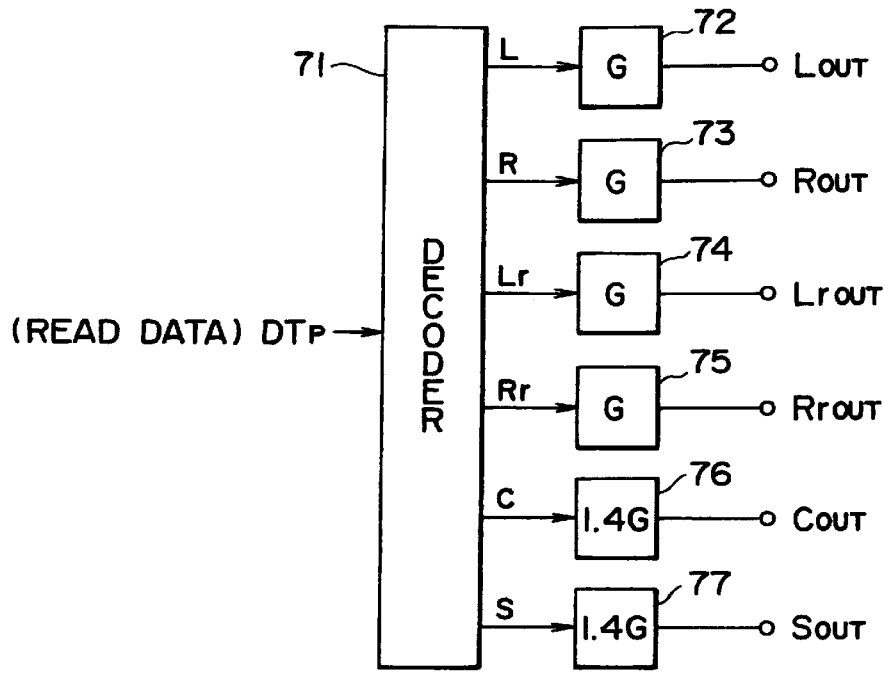
FIGS. 26A and 26B are explanatory diagrams showing how 6-channel data is reproduced in the embodiment.
Figure 26B:
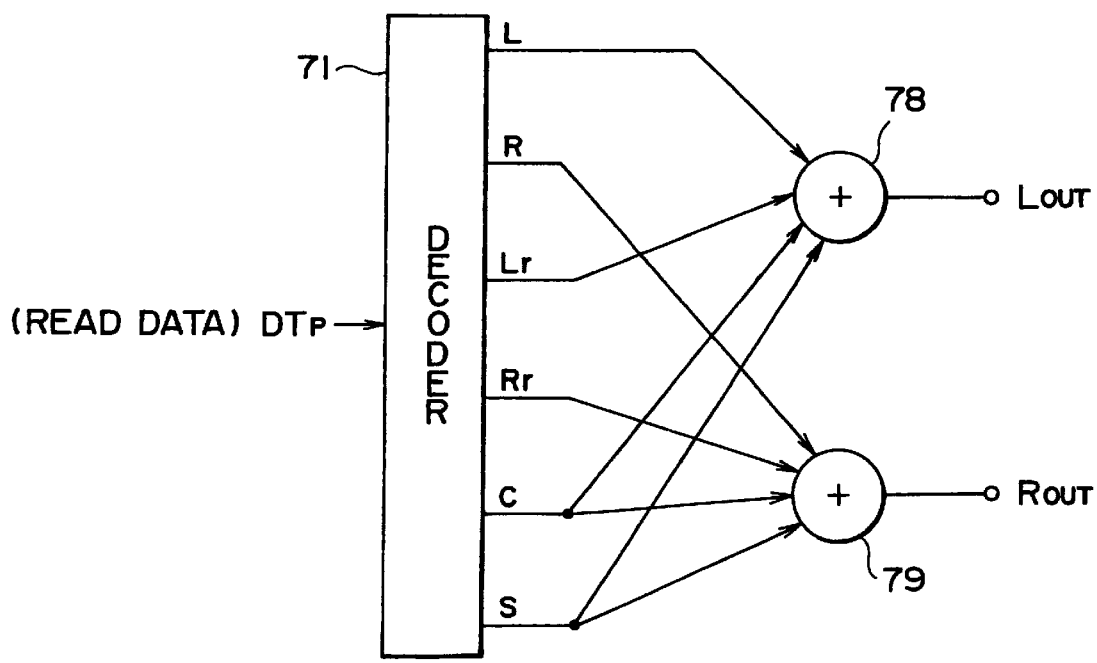

In reproducing the 6-channel data thus recorded, a process of FIG. 26A or 26B is executed.

FIG. 26A represents an exemplary case relative to reproduction of 6-channel data. In this case, read data DTP (reproduced RF signal) read out from the DSD disc is supplied to a decoder 71 (equivalent to the DSD decoder 38 in FIG. 22 or 23) which extracts the audio data of 6 channels L, R, S, C, Lr and Rr.

As one process executed in the digital audio processor 39 in FIG. 22 or 23 for example, the data of the individual channels in FIG. 26A is processed by amplifiers 72, 73, 74, 75, 76 and 77 respectively. Since the data is recorded in a state where the gain for merely the 2 channels S and C is set to 0.7 times in comparison with any other channel, the gain in the amplifiers 76 and 77 for the 2 channels S and C is set to "1.4G" as compared with the gain G in the amplifiers 72, 73, 74, and 75 for the other channels.

Accordingly, 6-channel audio data $L_{out}$, $R_{out}$, $Lr_{out}$, $Rr_{out}$, $C_{out}$, and $S_{out}$ outputted via the amplifiers 72, 73, 74, 75, 76 and 77 respectively are equivalent to the former 6-channel audio signals having the original gain balance, whereby proper reproduction of the data is performed.

The audio data recorded in 6 channels can be reproduced and outputted as audio signals of 2 channels L and R. For outputting 6-channel signals, it becomes naturally necessary to provide a 6-channel amplifier and speaker system of a relatively large scale, which may be effective in a theater or the like. However, in general home and so forth, a 2-channel output might be preferred in some cases. In view of such circumstances, there has been considered heretofore a method of generating 2-channel (L, R) signals from 6-channel data.

According to the above method, the signals of L and R channels are generated by calculating the audio data of 6 channels L, R, S, C, Lr and Rr as follows.

$$L=L+Lr+0.7S+0.7C$$

$$R=R+Rr+0.7S+0.7C$$

In the known method, the signals of L and R channels are generated through the above processing.

Meanwhile in this embodiment, the data of the S channel and C channel are processed to be 0.7 times the data of any other channel in the recording mode. Therefore, it is supposed that calculations of "0.7S" and "0.7C" have already been executed for the audio data of L, R, S, C, Lr and Rr channels obtained by processing, in the decoder 71 (equivalent to the DSD decoder 38 in FIG. 22 or 23), the read data $DT_P$ (reproduced RF signal) read out from the DSD disc.

Consequently, in generating the data of L and R channels through calculations of L=L+Lr+0.7S+0.7C and R=R+Rr+0.7S+0.7C, the requirement can be satisfied in this embodiment merely by executing simple additions of $$L=L+Lr+S+C$$

$$R=R+Rr+S+C$$

It follows that the desired result is obtained by processing the data of L channel in an adder 78 of FIG. 26B and processing the data of R channel in an adder 79.

Assuming that the above processing is executed in the digital audio processor 39 of FIG. 22 or 23 (although each addition may be executed in an analog audio signal processor after digital-to-analog conversion of the data), the structure necessary for such processing does not require any multiplication to eventually realize an extremely simplified circuit configuration.

In this embodiment where the digital audio signal is composed of 1-bit data, it is possible to further simplify the circuit configuration which executes simple additions to generate 2-channel (L, R) signals from 6-channel data.

In the case of a 6-channel output mentioned above, the gain for the data of S channel and C channel needs to be 1.4 times the gain for the data of any other channel. However, the requisite in this case is only to change the gain and therefore causes no complication of the circuit configuration. Accordingly, simplification of the circuit configuration for converting 6-channel data into 2-channel data and outputting the same as in this embodiment brings about further simplification of the whole structure.

[5] DSD/DVD Composite Disc

Figure 27:
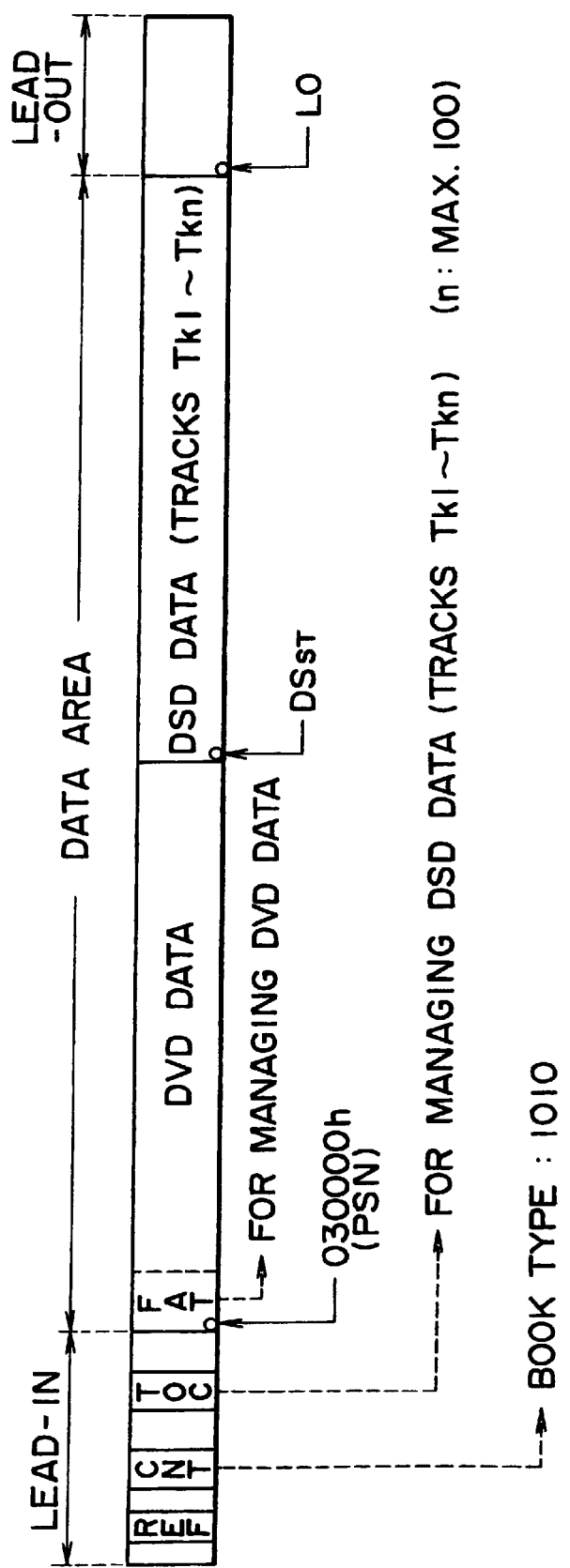
FIG. 27 is an explanatory diagram showing a DSD/DVD composite disc with a single layer of the embodiment.

Referring now to FIGS. 27, 28A and 28B, an explanation will be given on a DSD/DVD composite disc which is regarded, in a broad sense, as a DSD disc having TOC based on the DVD physical format with tracks of DSD data existing as real data to be recorded in its data area, wherein an ordinary DVD data recording area is also formed with the directory structure of FIG. 4.

Each of FIGS. 27, 28A and 28B shows the structure of a DSD/DVD composite disc.

First, FIG. 27 represents an example of a single layer disc.

As for control data CNT recorded in a lead-in area, a book type (see FIGS. 8A–8C and 9) in the physical format information is set to "1010" to indicate a DSD/DVD composite disc. Further, TOC is formed in the lead-in area.

In a data area ranging from a physical sector number "030000h" to a position (LO-1) immediately before a lead-out area, an area is formed for recording DVD data, and tracks TK1–TKn (n being a maximum of 100) are recorded as DSD data.

In the area for recording DVD data, management information for managing DVD data file is included as FAT (File Allocation Table) for example, and a volume space is formed as shown in FIG. 3.

Tracks TK1–TKn of the DSD data are managed according to the TOC.

If the disc 90 loaded in the reproducing apparatus of FIG. 23 for example is discriminated as a DSD/DVD composite disc, it is possible to select, in response to a manipulation of the user, either a DVD data reproducing mode based on the control data and the FAT, or a DSD data track reproducing mode based on the TOC.

In a DSD/DVD composite disc, the content of DVD data and the content of DSD data may be identical with each other. For example, ten specified programs are recorded as a DVD data file and also as DSD data tracks.

As for audio data, a higher tone quality is achievable in DSD data. Therefore, in the reproducing apparatus of FIG. 22 or 23 adapted for a DSD disc, audio of a higher tone quality can be enjoyed by reproducing the DSD data track. Also in a DVD reproducing apparatus not adapted for a DSD disc, the same audio can be reproduced from the DVD file as well. Thus, the disc is rendered interchangeable in different reproducing apparatus.

FIGS. 28A and 28B show examples of a dual layer disc produced as a DSD/DVD composite disc, in which FIG. 28A represents a disc with parallel track paths, and FIG. 28B represents a disc with opposite track paths.

In the disc of FIG. 28A with parallel track paths, a layer 0 and a layer 1 are formed independently of each other. And, for example, the layer 0 is allocated to a DVD while the layer 1 to a DSD disc respectively.

In the layer 0, a book type included in the control data CNT in the lead-in area is set to "0000" to indicate an ordinary DVD disc, and a data file as DVD data and management information (FAT) are recorded in the data area ranging from a physical sector number "030000h" to a position ($LO_0-1$) immediately before the lead-out area in the layer 0, whereby a volume space is formed as in FIG. 3.

Meanwhile in the layer 1, a book type included in the control data CNT in the lead-in area is set to "1000" to indicate a DSD disc, and tracks TK1–TKn (n being a maximum of 100) as DSD data are recorded in a data area ranging from a physical sector number "030000h" to a position ($LO_1-1$) immediately before the lead-out area in the layer 1.

In the case of such a disc, it is possible in the reproducing apparatus of FIG. 23 for example to select, in response to a manipulation of the user or the like, either a DVD data reproducing mode (to reproduce the layer 0) based on the control data and the FAT, or a DSD data track reproducing mode (to reproduce the layer 1) based on the TOC.

The content of DVD data (layer 0) and the content of DSD data (layer 1) may be identical with each other to provide an interchangeable disc, so that the layer 1 can be reproduced in an apparatus adapted for reproducing a DSD disc, while the layer 0 can be reproduced in a DVD reproducing apparatus not adapted for a DSD disc.

In each example of FIGS. 28A and 28B, a book type included in the control data of the layer 0 is set to "0000", and a book type of the layer 1 to "1000", respectively. However, both book types may be set to "1010" to indicate a DSD/DVD composite disc.

In a dual-layer DSD/DVD composite disc for example, if a layer 0 is standardized as DVD and a layer 1 as DSD respectively, it is preferred that book types of both layers 0 and 1 be set to "1010" so that the reproducing apparatus can identify the DSD/DVD composite disc immediately.

In another case where a DSD/DVD composite disc is realized with opposite track paths of FIG. 28B, a layer 0 and a layer 1 are regarded as a single continuous layer via a middle area, wherein the management thereof is roughly similar to that of the single-layer disc shown in FIG. 27.

In a lead-in area of the layer 0 on the outermost side of the disc, a book type in control data CNT is set to "1010" to indicate a DSD/DVD composite disc, and TOC is formed therein.

DVD data is recorded in a data area ranging from a physical sector number "030000h" to a specific position ($DS_{ST}-1$) which may be either before or after passage of a middle area, and tracks TK1–Tkn (n being a maximum of 100) as DSD data are recorded in a data area ranging from a certain position (DSST) to another position ($LO_1-1$) immediately before the lead-out area.

Management information such as FAT (File Allocation Table) for managing a DVD data file is provided in an area used to record DVD data, and a volume space is formed as shown in FIG. 3.

Tracks TK1–TKn of the DSD data are managed according to the TOC.

In this case also, if the disc 90 loaded in the reproducing apparatus of FIG. 23 for example is discriminated as a DSD/DVD composite disc, it is possible to select, in response to a manipulation of the user, either a DVD data reproducing mode based on the control data and the FAT, or a DSD data track reproducing mode based on the. TOC. And in a DSD/DVD composite disc, the content of DVD data and the content of DSD data may be identical with each other, so that the disc is rendered interchangeable in different kinds of reproducing apparatus.

[6] DSD/CDEX Composite Disc (6-A) CDEX

Hereinafter an explanation will be given on a DSD/CDEX composite disc which is regarded, in a broad sense, as a DSD disc having TOC based on the DVD physical format with tracks of DSD data existing as real data to be recorded in its data area, wherein a data area managed according to the TOC is divided into so-called multi-sessions, and there are formed a track area of DSD data and a CD-ROM data area.

A DSD/CDEX composite disc is so composed that a CD-ROM data area recordable in the second session in a so-called CD-EXTRA is provided in a DSD disc.

In a CD-EXTRA, there exists a concept of a session. A session signifies a group consisting of a lead-in area, a program area and a lead-out area independently. And a disc having a plurality of such sessions is termed a multi-session disc.

Figure 29:
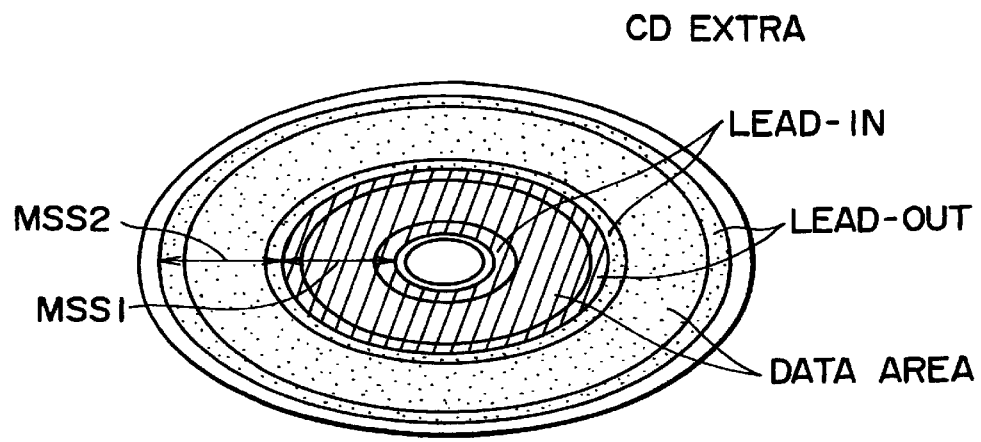
FIG. 29 is an explanatory diagram illustrating an image of a multi-session disc.

The image of a disc as a CD-EXTRA is illustrated in FIG. 29, where the disc is divided into a first session MSS1 and a second session MSS2. Each of the two sessions (MSS1, MSS2) includes a program area, a lead-in area and a lead-out area independently. Audio data tracks are recorded in the first session of a CD-EXTRA, and CD-ROM:XA data is recorded in the second session MSS2 thereof.

Since a CD-EXTRA has two sessions as described above, it is termed a multi-session disc.

In the DSD/CDEX composite disc of this embodiment, the same function as that realized by the concept of a session in a CD-EXTRA is realized in the form of division of the DSD data area. However, division of the DSD data area in this DSD/CDEX composite disc is not carried out in conformity with the concept of a session. More specifically, it is not that each of the divided regions has a lead-in area and a lead-out area independently. Therefore, conceptually, this disc cannot be called a multi-session disc, but it is capable of performing an operation like a multi-session disc. (Hereinafter the form of the DSD/CDEX composite disc according to this embodiment will be referred as a multi-division disc.)

For the convenience of explanation, it is defined here that, in a DSD/CDEX composite disc, a region corresponding to the first session MSS1 in a CD-EXTRA is termed a first region SS1, and a region corresponding to the second session MSS2 is termed a second region SS2. And in the DSD/CDEX composite disc, tracks are recorded as DSD data in the first region SS1, and CD-ROM:XA data is recorded in the second region SS2, as in the CD-EXTRA.

Figure 30:
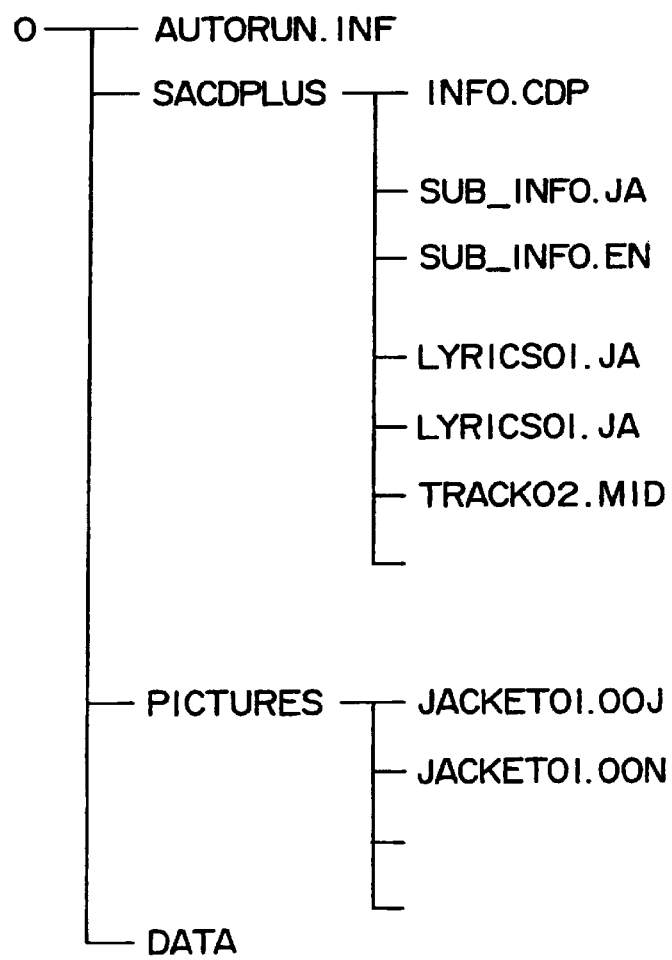
FIG. 30 is an explanatory diagram showing a directory structure in a DSD/CDEX composite disc of the embodiment.

The directory structure in the second region SS2 for recording CD-ROM data may be substantially the same as the directory structure of the CD-EXTRA, as shown in FIG. 30 for example.

For a route, a file of "AUTORUN. INF" and directories of "CD PLUS" and "PICTURES" are required.

(6-B) Examples of DSD/CDEX Composite Disc

Structural examples of a DSD/CDEX composite disc will now be described below.

An explanation will be given on an example where a DSD disc is made into a multi-division disc, and another example where a DSD area in a DSD/DVD composite disc is divided to make a multi-division disc.

Figure 32:
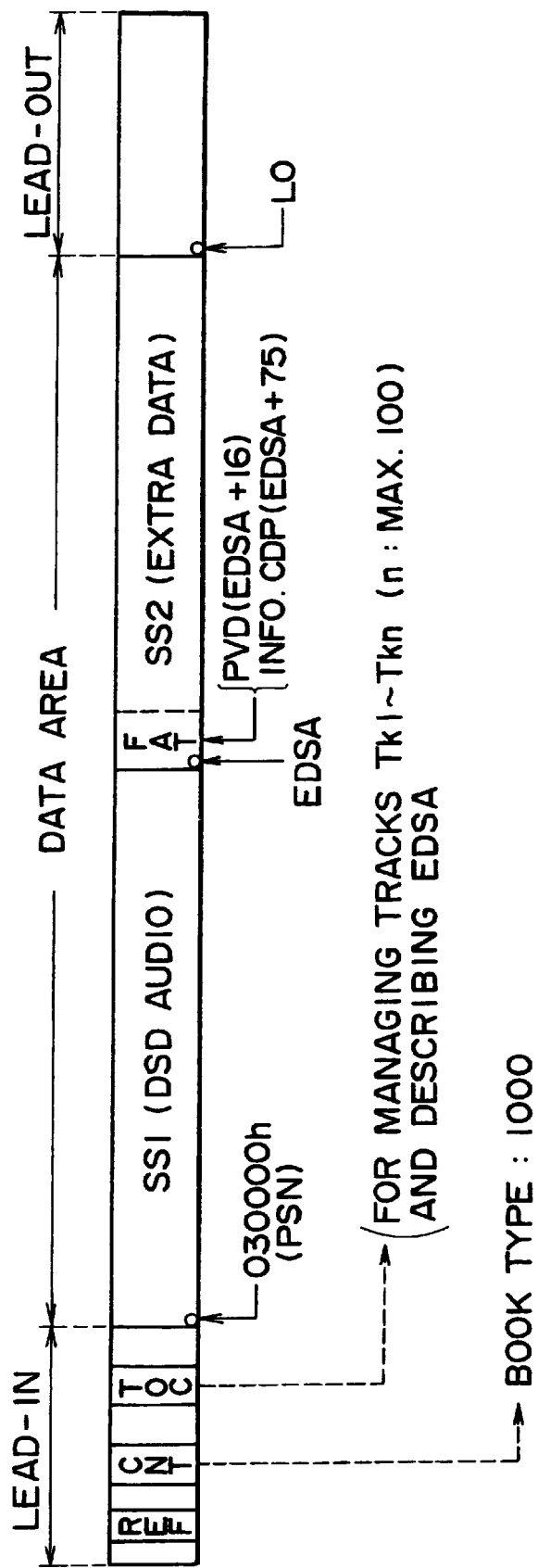
FIG. 32 is an explanatory diagram showing a DSD/CDEX composite disc with a single layer of the embodiment.

FIG. 32 shows a DSD disc formed into a multi-division disc with a single layer.

First, as control data CNT in a lead-in area, a book type (see FIGS. 8A–8C and 9) included in physical format information is set to "1000" to indicate a DSD disc. Further, TOC is formed in the lead-in area.

A first region SS1 ranges from a physical sector number "030000h" to a position immediately before a top address EDSA of a second region SS2, and tracks TK1–TKn (n being a maximum of 100) are recorded as DSD data managed according to the TOC.

The top address of the second region SS2 is managed as an extra data start address EDSA in TOC sector 0 (see FIG. 11).

In the second region SS2, there are recorded a CD-ROM data file and management information denoted as FAT for managing the data file in the second region SS2, where FAT signifies PVD (Primary Volume Descriptor) and "INFO. CDP" (i.e., information for managing an operation to reproduce the data file) in the directory structure of FIG. 30.

The PVD is recorded at a fixed position such as sector address 16 for example in the second region SS2, i.e., at a position of EDSA+16 as a physical sector number. And "INFO. CDP" is recorded at a fixed position of EDSA+75 for example.

FIGS. 33A and 33B show dual-layer discs, in which FIG. 33A represents an example with parallel track paths, and FIG. 33B represents an example with opposite track paths.

In the disc of FIG. 33A with parallel track paths, a layer 0 and a layer 1 are formed independently of each other. That is, in the layer 0, a book type included in control data CNT in a lead-in area is set to "1000" to indicate a DSD disc, and TOC is formed in the lead-in area. And tracks TK1–TKn of DSD data to be managed according to the TOC are recorded in a first region SS1 of the layer 0.

A second region SS2 begins with an extra data start address EDSA described in the TOC, and a so-called CD-ROM data file is recorded therein together with FAT (PVD and INFO. CDP) used as information for managing such data file. The PVD is recorded at a fixed position of "EDSA+16", and the INFO. CDP at a fixed position of "EDSA+75", respectively.

Similarly in the layer 1 also, a book type included in control data CNT in a lead-in area is set to "1000" to indicate a DSD disc, and TOC is formed in the lead-in area. And tracks TK1–TKn of DSD data to be managed according to the TOC are recorded in a first region SS1 of the layer 1. A maximum of 100 DSD data tracks are recordable in each of the two layers.

In the layer 1, a second region SS2 begins with an extra data start address EDSA described in the TOC, and a so-called CD-ROM data file is recorded therein together with FAT (PVD and INFO. CDP) used as information for managing such data file. The PVD is recorded at a fixed position of "EDSA+16", and the INFO. CDP at a fixed position of "EDSA+75", respectively.

In the example of FIG. 33B with opposite track paths, a layer 0 and a layer 1 are regarded as one continuous layer via a middle area.

And in a lead-in area of the layer 0 on the innermost side of the disc, a book type included in control data is set to "1000" to indicate a DSD disc, and TOC is formed therein. And tracks TK1–TKn (n being a maximum of 100) of DSD data to be managed according to the TOC are recorded in a first region SS1. A boundary between the first region SS1 and the second region SS2 may be a middle area for example, and the layer 0 may be used as the first region SS1 while the layer 1 as the second region ss2 respectively, or, as shown in the diagram, a predetermined position before or after passage of the middle area may be defined as a boundary.

Anyway the boundary, which is the start position of the second region SS2, is at the point indicated by the extra data start address EDSA in TOC sector 0.

The second region SS2 ranges from the extra data start address EDSA to a position immediately before the lead-out area, and a so-called CD-ROM data file is recorded therein together with FAT (PVD and INFO. CDP) used as information for managing such data file. The PVD is recorded at a fixed position of "EDSA+16", and the INFO. CDP at a fixed position of "EDSA+75", respectively.

FIG. 34 shows a single-layer multi-division disc produced through division of a DSD area in a DSD/DVD composite disc.

As control data CNT in its lead-in area, a book type included in physical format information is set to "1010" to indicate a DSD/DVD composite disc. And further TOC is formed in the lead-in area.

An area for recording DVD data is included in a data area which ranges from a physical sector number "030000h" to a position immediately before a certain address DSST, and a DVD data file is recorded in the data area together with information denoted as FAT for managing the DVD data file, wherein a volume space is formed as shown in FIG. 3.

Regions posterior to the address DSST are managed according to the TOC, and tracks TK1–TKn (n being a maximum of 100) of DSD data are recorded in the first region SS1. The second region SS2 ranges from the position indicated by an extra data start address EDSA in TOC sector 0 to the position immediately before the lead-out area, and a so-called CD-ROM data file is recorded therein together with management information denoted as FAT (PVD and INFO. CDP) for managing such data file. The PVD is recorded at a fixed position of "EDSA+16", and the INFO. CDP at a fixed position of "EDSA+75", respectively.

FIGS. 35A and 35B show dual-layer multi-division discs each produced through division of a DSD area in a DSD/DVD composite disc, in which FIG. 35A represents an example with parallel track paths, and FIG. 35B represents another example with opposite track paths.

In the disc of FIG. 35A with parallel track paths, a layer 0 and a layer 1 are formed independently of each other. In this example, the layer 0 is allocated to a DVD while the layer 1 to a DSD disc respectively.

In the layer 0, similarly to the aforementioned example of FIG. 28A, a book type included in the control data CNT in the lead-in area is set to "0000" (or "1010"), and a data file as DVD data and management information (FAT) are recorded in the data area ranging from a physical sector number "030000h" to a position ($LO_0-1$) immediately before the lead-out area in the layer 0, whereby a volume space is formed as in FIG. 3.

Meanwhile in the layer 1, a book type included in the control data CNT in the lead-in area is set to "1000" (or "1010"), and a data area for recording DSD data is formed in a range from a physical sector number "030000h" to a position ($LO_1-1$) immediately before the lead-out area in the layer 1. This layer 1 is divided to produce a multi-division disc.

More specifically, tracks TK1–TKn (n being a maximum of 100) to be managed directly according to the TOC are recorded in a first region SS1 which begins with the physical sector number "030000h" in the layer 1, and a second region SS2 ranges from the position indicated by an extra data start address EDSA in TOC sector 0 to a position immediately before the lead-out area, and a so-called CD-ROM data file is recorded therein together with FAT (PVD and INFO. CDP) used as information for managing such data file.

The PVD is recorded at a fixed position of "EDSA+16", and the INFO. CDP at a fixed position of "EDSA+75", respectively.

In the example of FIG. 35B with opposite track paths, a layer 0 and a layer 1 are regarded as one continuous layer via a middle area, wherein the management thereof is roughly similar to that of the single-layer disc shown in FIG. 34.

In a lead-in area of the layer 0 on the outermost side of the disc, a book type included in control data CNT is set to "1010" to indicate a DSD/DVD composite disc, and TOC is formed therein. An extra data start address EDSA is described in the TOC.

DVD data is recorded in a data area ranging from a physical sector number "030000h" to a specific position ($DS_{ST}-1$) which may be either before or after passage of a middle area. Management information such as FAT for managing a DVD data file is provided in an area used to record the DVD data, and a volume space is formed as shown in FIG. 3.

A data area ranging from a certain position ($DS_{ST}$) to a position ($LO_1-1$) immediately before the lead-out area is used as a DSD disc area, which is divided into a first region SS1 and a second region SS2 with the extra data start address EDSA serving as a boundary therebetween.

Tracks TK1–TKn (n being a maximum of 100) of DSD data to be managed directly according to the TOC are recorded in the first region SS1.

Meanwhile in the second region SS2, a CD-ROM data file is recorded together with FAT (PVD and INFO. CDP) as information for managing such data file. The PVD is recorded at a fixed position of "EDSA+16", and the INFO. CDP at a fixed position of "EDSA+75", respectively.

In each of the six structural examples of a DSD/CDEX composite disc described above, the DSD disc area is divided to produce a multi-division disc, where an extra data region is formed. And the position (EDSA) of its second region is managed according to the TOC.

Therefore, if any specific effective value is recorded instead of "000000h" as the extra data start address EDSA in the TOC sector 0. the disc can be identified as a DSD/CDEX composite disc.

In the second region SS2, the PVD and INFO. CDP required for management of data reproduction are recorded at fixed positions with reference to the extra data start address EDSA, so that no complicated address calculation and so forth is necessary at all for access of the reproducing apparatus to the second region SS2, and such access is rendered extremely easy.

(6-C) DSD/CDEX Composite Disc Reproducing Apparatus

FIG. 31 shows an exemplary structure of a reproducing apparatus adapted for such a DSD/CDEX composite disc described above. In this diagram, any function blocks corresponding to those employed in the aforementioned apparatus of FIGS. 22 and 23 are denoted by like reference numerals, and a repeated explanation thereof is omitted.

In the apparatus of FIG. 31, a reproducible disc 90 is a DVD or DSD disc. And in addition to the same function blocks as those in FIG. 22 employed for a DSD disc and those in FIG. 23 for a DVD, there are provided a CD-ROM decoder 50 and an SCSI controller 51 for reproducing a DSD/CDEX composite disc. The SCSI controller 51 serves to perform interface control in regard to a host computer.

Upon completion of loading a disc 90, a system controller 41 first acquires the necessary data by execution of reading out the control data in the lead-in area and, on the basis of the book type, makes a decision as to whether the loaded disc is a DSD disc or an ordinary disc (or a DSD/DVD composite disc which will be described later). When the loaded disc 90 is a DSD disc, the system controller 41 further reads the TOC from the lead-in area.

When the loaded disc 90 is a DSD disc of the multi-division type mentioned above, either a first region SS1 reproducing mode or a second region SS2 reproducing mode is selectively executed in accordance with a reproducing manipulation. For example, a control action may be so performed as to select a first region SS1 reproducing mode in response to a normal reproducing manipulation from a manipulator 53, or to select a second region SS2 reproducing mode in response to a reproduction request from an external host computer connected to the apparatus.

In the first region SS1 reproducing mode, the system controller 41 enables execution of a reproducing operation according to the TOC data. Then the reproduced audio signal is demodulated by the operations of a DSD decoder 38, a digital audio processor 39 and a 1-bit D/A converter 40. At this time, a selector 48 is so controlled as to supply the output of the 1-bit D/A converter 40 to an audio amplifier 42.

Meanwhile in the second region SS2 reproducing mode, the system controller 41 refers to the extra data start address EDSA described in the TOC and enables access to the PVD and INFO. CDP recorded at fixed positions with reference to the EDSA position. And the reproducing operation is controlled in conformity to the directory structure of FIG. 30.

The information (reproduced RF signal) read out from the disc is decoded in a CD-ROM decoder 50, and the decoded data is supplied to an SCSI controller 51. Subsequently the SCSI controller 51 transmits to the host computer the data read out from the disc 90.

Thus, such reproducing apparatus is adapted to reproduce a DSD/CDEX composite disc to consequently realize extended usage of discs.

[7] Modifications

Besides the above preferred embodiments representing the discs and the reproducing apparatus of the present invention, a variety of modifications may also be contrived in addition thereto.

For example, the book type set to "1000" for a DSD disc or to "1010" for a DSD/DVD composite disc is merely exemplary, and it may be set to any other value. And the other specific data included in the management information may also be changed as well.

Preferably the book type data conforms with a coding scheme which is suited to discriminate among the above-described five kinds or definitions of discs such as (1) DVD, (2) DSD disc, (3) DSD/DVD composite disc, (4) DSD/CDEX composite disc, and (5) DSD/DVD/CDEX composite disc explained as DSD/CDEX composite disc and produced in the form of a multi-division disc from DSD/DVD composite disc.

Therefore, the book type data may be so defined as (1) "0000" for DVD, (2) "1000" for DSD disc, (3) "1010" for DSD/DVD composite disc, (4) "1100" for DSD/CDEX composite disc, and (5) "1110" for DSD/DVD/CDEX composite disc. (These values of book type data are mere examples.)

Further, the book type coding scheme may be so structured as to identify the kind of a single layer, a dual layer, or opposite track paths and parallel track paths of a dual layer.

Particularly in the case of FIG. 28A or 35A where one of the dual layers with parallel track paths contains DVD data while the other layer thereof contains DSD data, it is preferred that the other layer be detectable when the book type data of one layer is read.

Although some exemplary structures of the discs have been described with reference to the embodiments of FIGS. 17, 18, 27, 28, 32, 33, 34 and 35, other structures may also be contrived. For example, when a DSD/DVD composite disc has parallel track paths as shown in FIG. 28A, there may be contrived a form where both a DSD region and a DVD region are coexistent in each layer.

Figure 36A:
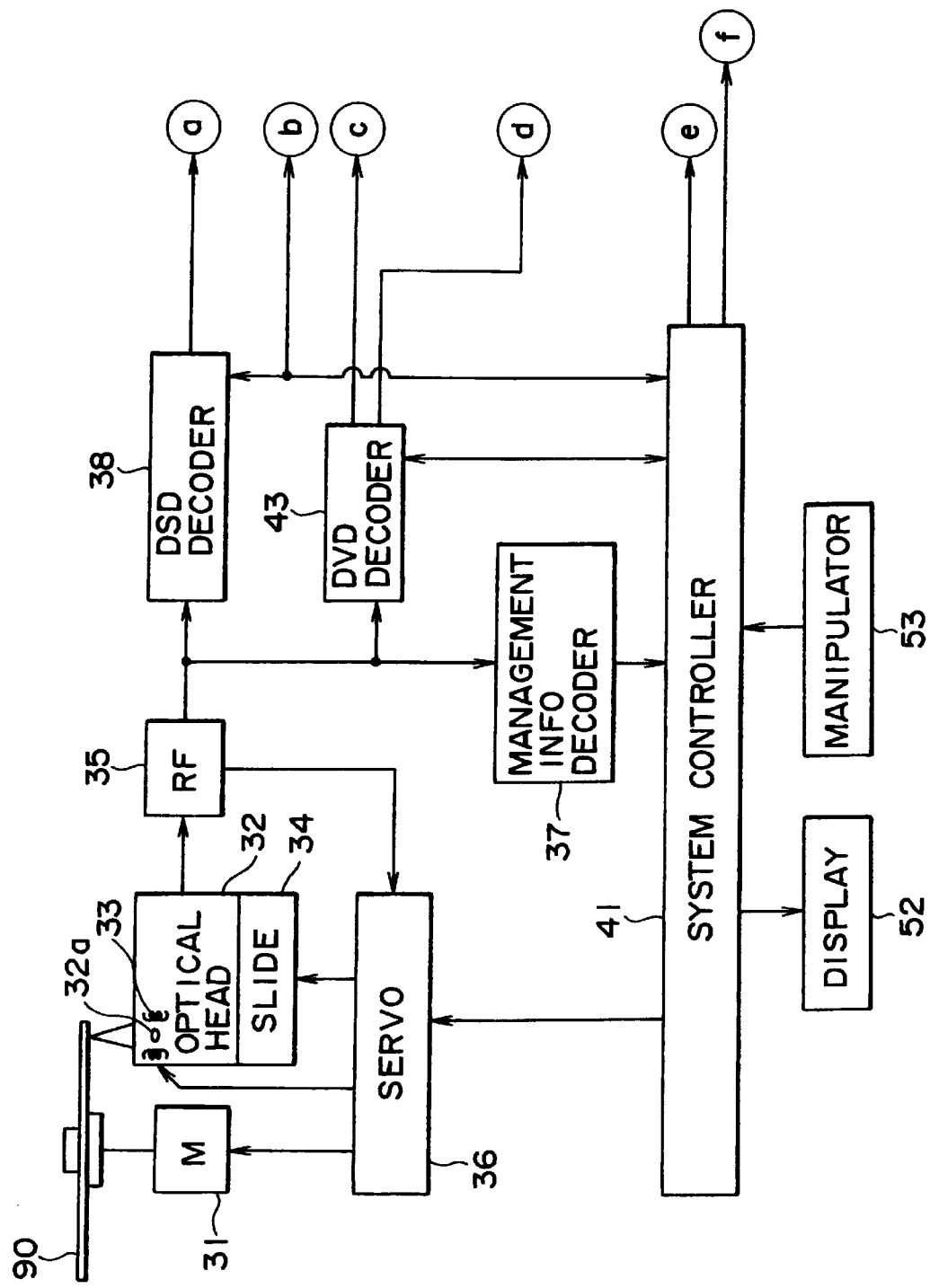

Further, in addition to the embodiments of the reproducing apparatus shown in FIGS. 22, 23 and 31, modifications of FIGS. 36 and 37 may be contrived as reproducing apparatus adapted for both a DSD disc and a DVD, i.e., the apparatus of FIGS. 23 and 31.

FIG. 36 is a block diagram of a modification of the reproducing apparatus shown in FIG. 23, wherein like blocks are denoted by like reference numerals. In this case, there is not provided a D/A converter (D/A converter 45 in FIG. 23B) for DVD audio data obtained from a DVD decoder 43, and a 1-bit D/A converter 40 for DSD audio data is used in common for the DVD audio data as well.

Therefore, the output of an audio processor 44 is first converted into 1-bit digital data via a decimation filter 54 and then is supplied to the 1-bit D/A converter 40.

In a sampling frequency (64 fs/32 fs/128 fs) for DSD data, fs is 44.1 kHz, while fs for DVD data is 48 kHz for example. For this reason, it is necessary to selectively switch the basic clock signal in the 1-bit D/A converter 40 in conformity to a DVD data reproducing mode or a DSD data reproducing mode. Consequently, a system controller 41 executes control of switching the basic clock signal in accordance with the reproducing operation.

FIG. 37 is a block diagram of a modification of the reproducing apparatus shown in FIG. 31, wherein like blocks are denoted by like reference numerals. In this case also, there is not provided a D/A converter (D/A converter 45 in FIG. 31B) for DVD audio data obtained from a DVD decoder 43, and a 1-bit D/A converter 40 for DSD audio data is used in common for the DVD audio data, as in the foregoing example of FIG. 36.

Thus, the circuit configuration in the reproducing apparatus can be simplified by such common use of the 1-bit D/A converter 40 as in FIG. 36 or 37.

In the present invention, as obvious from the explanation given above, the following various advantageous effects are achievable to consequently realize a remarkably useful recording medium and a reproducing apparatus adapted to play such a recording medium.

In the recording medium, identification data signifying that data of a second data format different from the first data format is included in the physical format management information. And data of the second data format is recorded in the data area in conformity with the physical format management information, and further second data management information is recorded at a predetermined position to manage reproduction of the data of the second data format. The recording medium thus realized conforms with the first format and still contains data of another different data format, whereby the medium is rendered applicable to recording of high tone quality data and so forth. In this manner, there is attained an effect of flexibly utilizing the recording medium having a specific physical format.

Particularly due to defining the second management information (TOC), the data of the second data format can be developed directly on the recording medium, and access thereto is facilitated as well.

Since the second data management information is recorded in the lead-in area, access to the second data management information is also rendered easy.

The data area has a region where the data of the first data format and the first data management information are recorded, and another region where at least the data of the second data format is recorded. And the physical format management information includes identification data to signify that the data of both the first and second data formats are recorded in this medium, whereby a composite recording medium can be realized with advantages of extended usage and enhanced interchangeability.

The second data management information includes recording position information per data unit (track) of the second data format, so that access thereto per track is rendered random and free.

The second data management information also includes additional information corresponding to each data unit (track) of the second data format, such as character information or copyright information, whereby the recording medium is furnished with a variety of information relative to each unit of the recorded data.

The second data management information further includes, correspondingly to each data unit (track) of the second data format, merely partial recording position information thereof so as to be suited for a special operation such as partial reproduction.

The second data management information may be so arranged as to manage a maximum of 100 data units with regard to the data of the second data format, hence realizing a convenient form of product planning. For example, it is adequate for electronic publication such as "Hyakunin Isshu" (100 Poems by 100 Poets) or "100 Best Music Works".

In the second data management information, there is included positional information of the region where the data of a third data format different from the first and second data format is recorded. And in the data area, there are recorded the data of the third data format and the third data management information for managing reproduction of such data. Therefore, it becomes possible to realize a novel recording medium which is equivalent to a so-called multi-session disc similar to the aforementioned multi-division disc, hence further widening the usage of the recording medium of the present invention.

Particularly it is possible to carry out diversified use of recording, for example, simple text data in the second management information while additionally recording text data of a great capacity as data of the third data format.

The third data management information is recorded at a specific position which is based on the position indicated by the positional information of the region where the data of the third data format included in the second data management information is recorded, so that a remarkably advantageous effect is attainable in facilitating access to the second region when the recording medium is functionally equivalent to a multi-session disc.

In the recording medium of the present invention, the data of the second data format is composed of a ΔΣ modulated 1-bit audio signal. Consequently, superior data recording is realized with higher tone quality in the recording medium having the specific physical format. In particular, any tone quality deterioration due to filtering is not caused at all, as the data of a high-speed 1-bit audio signal is recorded without execution of over-sampling or down-sampling. Since neither over-sampling nor down-sampling is executed, a recording apparatus and a reproducing apparatus adapted for the above recording medium can be structurally simplified while superior tone quality is realized.

The data of at least the second data format is formed into sectors, wherein each sector includes a main data region allocated to a ΔΣ modulated 1-bit audio signal and a sub data region allocated to sub data. Accordingly, various provisions of information can be realized in such manners that the sub data is used correspondingly to the main data of a 1-bit audio signal or is used in an unrelated state thereto, or various additional information is given to the main data contained in the recording medium, or such information is used independently of the main data.

A data area of 2048 bytes is formed in each sector, wherein a main data region is composed of 2016 bytes and a sub data region is composed of 32 bytes.

The data of the second data format consisting of a ΔΣ modulated 1-bit audio signal is converted into 2-channel audio data, and the respective channel data is allocated alternately, in units of 8 bits, to 2016 bytes in each recording sector. In another case, the data of the second data format consisting of a ΔΣ modulated 1-bit audio signal is converted into 6-channel audio data, and the respective channel data is allocated in a predetermined order, in units of 8 bits, to 2016 bytes in each recording sector.

As a result, the sub code transfer rate is raised to be higher than the known rate of 7200 bytes/second adopted in the current CD-DA, so that in both 2-channel and 6-channel modes, the function with sub code data can be fulfilled more properly than in the CD-DA. Further in each of the 2-channel and 6-channel modes, the data is completed per sector, and 1 second corresponds to 350 sectors in the 2-channel mode or to 525 sectors in the 6-channel mode. Therefore, in skipping per sector during a reproducing operation, a higher precision is attainable in comparison with the known skip precision of 1 second=75 frames in the current CD-DA.

In the 6-channel audio data of the second data format consisting of ΔΣ modulated 1-bit audio signal, the data corresponding to a plurality of specific channels out of the entire 6 channels is given a predetermined gain different from the value relative to any other channel, so that convenience is ensured in the process of converting the number of channels in reproduction.

The reproducing apparatus comprises a read means capable of executing an operation to read out information from the loaded recording medium; a decision means for making a decision as to whether the data of the second data format is recorded or not, on the basis of the physical format management information read out from the loaded recording medium; a reproduction control means for enabling the read means to read out the second data management information when the result of the decision signifies that the data of the second data format is recorded, then acquiring the second data management information thus read out, and enabling the read means to read out the data of the second data format on the basis of the second data management information; and a second-format decode means for decoding the data of the second data format thus read out by the read means. Accordingly, it becomes possible to perform a proper operation of reproducing the recording medium which conforms with the first format and contains data of the second data format different from the first format. Moreover, since access is made to the data of the second data format directly from the second data management information, such access can be executed simply and quickly without depending on the system of the first format.

Further, the circuit configuration can be simplified since such access is executed with reference to the second data management information.

Upon loading of the recording medium where the second data management information is provided in the lead-in area, the reproduction control means enables the read means to read out the second data management information recorded at a specific position in the lead-in area of the recording medium, hence achieving efficient access to the second data management information.

When the output of the decision means signifies that the data of the first data format is recorded, the reproduction control means enables the read means to read out the data of the first data format on the basis of the first data management information read out by the read means. The reproduction control means has a first format decode means for decoding the data of the first data format read out by the read means, so that the apparatus can be completely adapted for a recording medium where the data of the essential first data format is recorded, and also for a composite recording medium where the data of both first and second data formats are recorded.

In response to the recording position information included per data unit in the second data management information, the reproduction control means enables the read means to read out each unit of the data of the second data format, hence realizing efficient access thereto.

The apparatus further has an information representing output means such as a display device, and the reproduction control means enables the information representing output means to deliver therefrom the additional information included per data unit in the second data management information, thereby realizing provision of diverse information for the user.

In response to merely partial recording position information included in the second data management information and related to the respective units of the data of the second data format, the reproduction control means enables the read means to read out the partial data of the required unit, hence performing reproduction of, e.g., the introduction or motif of the desired program with facility and accuracy.

When the acquired second data management information includes the position information of the region where data of the third data format is recorded, the reproduction control means enables the read means to read out the third data management information to manage the operation of reproducing the data of the third data format, and also enables the read means to read out the data of the third data format on the basis of the third data management information. The apparatus further comprises a third format decode means for decoding the data of the third data format. Therefore it becomes possible to perform a proper reproducing operation with regard to the recording medium of the present invention which is functionally equivalent to a multi-session disc such as the aforementioned multi-division disc.

For reading out the third data management information, the reproduction control means enables the read means under control to read out the specific position which is determined with reference to the position indicated by the positional information included in the second data management information and related to the region where the data of the third data format is recorded, so that no complicated address calculation is necessary for access thereto to consequently realize quick and simplified access.

The second format decode means consists of a decoder where no over-sampling is executed for the data of a $\Delta\Sigma$ modulated 1-bit audio signal, hence eliminating the necessity of an over-sampling filter to consequently simplify the circuit configuration.

The data of the second data format is arranged in sectors, each of which is so formed as to include a main data region allocated to the $\Delta\Sigma$ modulated 1-bit audio signal and a sub data region allocated to the sub data. Since the second format decode means has a decoder for decoding the sub data recorded in the sub data region of each sector, extraction and use of the sub data are rendered possible to eventually widen the extendability of an information output mode or control mode.

The second format decode means is capable of outputting 2-channel audio signals through decoding. And when 6-channel audio data is read out by the read means, required channel data is added to form data of each channel to constitute 2 channels while the same gain is maintained with regard to the 6-channel data, whereby the circuit configuration for converting 6-channel data into 2-channel data can be extremely simplified.

In particular, since the processing is executed with regard to the $\Delta\Sigma$ modulated 1-bit audio signal, the converter circuit can be constituted of a remarkably simplified 1-bit adding circuit to consequently realize further simplification of the circuit configuration.

Besides that the second format decode means is capable of outputting 6-channel audio signals through its decoding process, the data of a plurality of specific channels out of the entire 6-channel data is given a predetermined gain which is different from the value relative to the data of any other channel, and then the 6-channel audio signals are outputted in this state, so that a proper 6-channel output can be attained without causing any complication of the circuit configuration.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A recording medium for recording data of a plurality of formats, comprising:

a lead-in area for recording physical format management information including data relative to a physical format of the recording medium, the lead-in area including a table of contents (TOC) for managing a plurality of tracks of data of a Direct Stream Digital (DSD) format; and a first data area portion for recording first data of a Digital Versatile Disk (DVD) format and first data management information for managing reproduction of the first data in conformity with the physical format management information;

a second data area portion for recording the plurality of tracks of data of the DSD format; and a third data area portion for recording third data of a third data format different from the DSD format and different from the DVD format, wherein data of the DSD format is 1-bit digital stream data, identification data signifying that the third data of the third data format is recorded in the third data area portion is included in the TOC of the lead-in area, the identification data including a start address for the third data area portion, the third data of the third data format is recorded in conformity with the physical format management information, third data management information is recorded at a predetermined position in the third data area portion for managing reproduction of the third data of the third data format, and at least one of the TOC, the first data management information, and the third data management information includes copyright information used to prevent unauthorized copying of the plurality of tracks of data, the first data, and the third data, respectively.

2. The recording medium according to claim 1, wherein the TOC includes recording position information relative to each of the plurality of tracks of data of the DSD format.

3. The recording medium according to claim 1, wherein the TOC includes information corresponding to each of the plurality of tracks of data of the DSD format.

4. The recording medium according to claim 1, wherein the TOC includes partial recording position information respectively corresponding to the plurality of tracks of data of the DSD format.

5. The recording medium according to claim 1, wherein the TOC is formed so that a maximum of 100 tracks of data are managed.

6. The recording medium according to claim 1, wherein the third data management information is recorded at a predetermined position in the third data area portion with reference to a position indicated by position information included in the TOC.

7. The recording medium according to claim 1, wherein the plurality of tracks of data of the DSD format is composed of a $\Delta\Sigma$ modulated 1-bit audio signal.

8. The recording medium according to claim 7, wherein data of at least the DSD format is arranged in a plurality of sectors, and each of the plurality of sectors includes a main data region allocated to the $\Delta\Sigma$ modulated 1-bit audio signal and a sub data region allocated to sub data.

9. The recording medium according to claim 8, wherein a region of 2048 bytes is formed in each of the plurality of sectors, the main data region is composed of 2016 bytes, and the sub data region is composed of 32 bytes.

10. The recording medium according to claim 9, wherein each of the plurality of tracks of data of the DSD format consisting of the $\Delta\Sigma$ modulated 1-bit audio signal is converted into two-channel audio data, and the two-channel audio data is respectively allocated alternately, in a plurality of units of 8 bits, to 2016 bytes in each of the plurality of sectors.

11. The recording medium according to claim 9, wherein each of the plurality of tracks of data of the DSD format consisting of the ΔΣ modulated 1-bit audio signal is converted into six-channel audio data, and the six-channel audio data is respectively allocated in a predetermined order, in a plurality of units of 8 bits, to 2016 bytes in each of the plurality of sectors, and data corresponding to a plurality of specific channels of six channels is given a predetermined gain different from a value relative to data of any other of the plurality of specific channels.

12. A reproducing apparatus adapted for reproducing data from a recording medium on which is recorded data of a plurality of formats, the recording medium comprising a lead-in area for recording physical format management information including data relative to a physical format of the recording medium and for recording a table of contents (TOC) for managing a plurality of tracks of data of a Direct Stream Digital (DSD) format, a first data area portion for recording first data of a Digital Versatile Disk (DVD) format and first data management information for managing reproduction of the first data in conformity with the physical format management information, a second data area portion for recording the plurality of tracks of data of the DSD format, and a third data area portion for recording third data of a third data format different from the DVD format and different from the DSD format, wherein data of the DSD format is 1-bit digital stream data, identification data signifying that the third data is recorded in the third data area portion is included in the TOC of the lead-in area, the identification data including a start address for the third data area portion, the third data of the third data format is recorded in conformity with the physical format management information, and third data management information is recorded at a predetermined position in the third data area portion for managing reproduction of the third data of the third data format, the reproducing apparatus comprising:

read means for executing an operation to read out information from the lead-in area of the recording medium, the read means including means for reading the table of contents (TOC) for managing the plurality of tracks of data of the DSD format;

decision means for deciding whether the third data of the third data format is recorded on the recording medium based on the identification data included in the TOC and read out from the recording medium by the read means;

reproduction control means for enabling the read means to read out the third data management information recorded in the third data area portion when a decision by the decision means signifies that the third data of the third data format is recorded on the recording medium, and for enabling the read means to read out the third data of the third data format based on the third data management information, wherein the reproduction control means prevents copying of the third data based on copyright information included in the third data management information; and DSD format decode means for decoding the plurality of tracks of data of the DSD format read out by the read means.

13. The reproducing apparatus according to claim 12, wherein when a decision by the decision means signifies existence of the first data of the DVD format, the reproduction control means enables the read means to read out the first data of the DVD format on the basis of the first data management information read out by the read means, and wherein the reproducing apparatus further comprises DVD format decode means for decoding the first data of the DVD format read out by the read means.

14. The reproducing apparatus according to claim 12, wherein the reproduction control means includes means for enabling the read means to read out each of the plurality of tracks of data of the DSD format in response to recording position information included in the TOC for each of the plurality of tracks of data.

15. The reproducing apparatus according to claim 12, further comprising:

information representation output means enabled by the reproduction control means for delivering information included in the TOC corresponding to each of the plurality of tracks of data.

16. The reproducing apparatus according to claim 12, wherein the reproduction control means includes means for enabling the read means to read out partial data of one of the plurality of tracks of data in response to partial recording position information included in the TOC and respectively related to the plurality of tracks of data of the DSD format.

17. The reproducing apparatus according to claim 12, wherein when the TOC includes position information of the third data area portion where the third data of the third data format different from the DVD format and different from the DSD format is recorded, the reproduction control means enables the read means, in response to the position information, to read out the third data management information from the third data area portion for managing reproduction of the third data of the third data format and enables the read means, in response to the third data management information, to read out the third data of the third data format, and wherein the reproducing apparatus further comprises third data format decode means for decoding the third data of the third data format read out by the read means.

18. The reproducing apparatus according to claim 17, wherein, for reading out the third data management information, the reproduction control means includes means for enabling the read means to read out a position determined with reference to the position information included in the TOC and related to the third data area portion where the third data of the third data format is recorded.

19. The reproducing apparatus according to claim 12, wherein the DSD format decode means includes a decoder for decoding data of a ΔΣ modulated 1-bit audio signal.

20. The reproducing apparatus according to claim 19, wherein each of the plurality of tracks of data of the DSD format is arranged in a plurality of sectors such that each of the plurality of sectors includes a main data region allocated to the ΔΣ modulated 1-bit audio signal and a sub data region allocated to sub data, and the DSD format decode means includes a decoder for decoding the sub data recorded in the sub data region of each of the plurality of sectors.

21. The reproducing apparatus according to claim 12, wherein the DSD format decode means outputs two-channel audio signals through decoding such that when six-channel audio data is read out by the read means required channel data is added to the six-channel audio data to form data to constitute two channels while an equal gain is maintained with regard to the six-channel audio data in order to output the two-channel audio signals.

22. The reproducing apparatus according to claim 12, wherein the DSD format decode means outputs six-channel audio signals through decoding, and data of a plurality of specific channels are read out by the read means such that when six-channel audio data is read out the six-channel audio data is given a predetermined gain different from a value relative to data of any other of the plurality of specific channels in order to output the six-channel audio signals.

\* \* \* \* \*